(12) United States Patent
Stender

(10) Patent No.: US 7,343,310 B1
(45) Date of Patent: Mar. 11, 2008

(54) SYSTEM AND METHOD FOR PROVIDING WEB-BASED USER INTERFACE TO LEGACY, PERSONAL-LINES INSURANCE APPLICATIONS

(75) Inventor: Mark J. Stender, Avon, CT (US)

(73) Assignee: Travelers Property Casualty Corp., Hartford, CT (US)

( * ) Notice: Subject to any disclaimer, the term of this patent is extended or adjusted under 35 U.S.C. 154(b) by 959 days.

(21) Appl. No.: 09/843,841

(22) Filed: Apr. 30, 2001

Related U.S. Application Data

(60) Provisional application No. 60/200,491, filed on Apr. 28, 2000, provisional application No. 60/219,691, filed on Jul. 21, 2000.

(51) Int. Cl.
*G06Q 10/00* (2006.01)

(52) U.S. Cl. .................... 705/4; 705/2; 705/3

(58) Field of Classification Search ............... 705/2–4
See application file for complete search history.

(56) References Cited

U.S. PATENT DOCUMENTS

| | | | |
|---|---|---|---|
| 4,831,526 A * | 5/1989 | Luchs et al. ............... 705/4 |
| 5,182,705 A * | 1/1993 | Barr et al. ................. 705/11 |
| 5,191,522 A | 3/1993 | Bosco et al. .............. 364/401 |
| 5,262,940 A * | 11/1993 | Sussman .................. 705/28 |
| 5,493,105 A * | 2/1996 | Desai ...................... 235/375 |
| 5,523,942 A | 6/1996 | Tyler et al. |
| 5,655,085 A | 8/1997 | Ryan et al. |
| 5,701,451 A | 12/1997 | Rogers et al. ............. 395/600 |
| 5,754,830 A | 5/1998 | Butts et al. ................ 395/500 |
| 5,768,578 A | 6/1998 | Kirk et al. |
| 5,793,964 A | 8/1998 | Rogers et al. ........ 395/200.32 |
| 5,796,932 A | 8/1998 | Fox et al. |
| 5,870,719 A | 2/1999 | Maritzen et al. |
| 5,873,066 A | 2/1999 | Underwood et al. |
| 5,893,072 A | 4/1999 | Zizzamia |
| 5,926,817 A | 7/1999 | Christeson et al. |
| 5,956,691 A | 9/1999 | Powers |
| 5,974,430 A | 10/1999 | Mutschler et al. ........ 707/505 |
| 5,978,799 A | 11/1999 | Hirsch |
| 5,987,434 A | 11/1999 | Libman |
| 6,078,890 A | 6/2000 | Mangin et al. |
| 6,122,632 A | 9/2000 | Botts et al. ................ 707/10 |

(Continued)

OTHER PUBLICATIONS

"Finding Intranet Solutions at Comdex," *Communications Week*, No. 638, pp. 95(7), Nov. 18, 1996.

(Continued)

*Primary Examiner*—C. Luke Gilligan
*Assistant Examiner*—Vivek Koppikar
(74) *Attorney, Agent, or Firm*—Irah H. Donner; Wilmer Cutler Pickering Hale and Dorr LLP

(57) ABSTRACT

The present invention relates to a system and method for providing a web-based graphical user interface to a legacy insurance data process system to increase the functionality and ease of use in issuing insurance quotes and policies, providing insurance information and other insurance related services. The system and method integrate use of Internet technology in business work flows, provide dynamic data entry for insurance coverage packages and pricing programs, offer easy access to value-added products and services, and enable local printing of professional insurance applications, proposals and forms to facilitate immediate delivery of professional-quality proposals to customers.

60 Claims, 79 Drawing Sheets

U.S. PATENT DOCUMENTS

| | | | |
|---|---|---|---|
| 6,144,944 | A | 11/2000 | Kurtzman, II et al. |
| 6,144,990 | A | 11/2000 | Brandt et al. ............... 709/203 |
| 6,175,831 | B1 | 1/2001 | Weinreich et al. |
| 6,330,551 | B1* | 12/2001 | Burchetta et al. ............. 705/80 |
| 6,587,836 | B1* | 7/2003 | Ahlberg et al. ............... 705/26 |
| 6,615,253 | B1 | 9/2003 | Bowman-Amuah |
| 6,615,258 | B1* | 9/2003 | Barry et al. ................. 709/223 |
| 6,682,421 | B1* | 1/2004 | Rowe et al. .................. 463/25 |
| 6,922,720 | B2 | 7/2005 | Cianciarulo et al. |
| 2002/0002475 | A1 | 1/2002 | Freedman et al. |
| 2002/0024537 | A1 | 2/2002 | Jones et al. |
| 2002/0026334 | A1 | 2/2002 | Igoe |
| 2002/0042763 | A1 | 4/2002 | Pillay et al. |
| 2002/0091550 | A1 | 7/2002 | White et al. |
| 2002/0111725 | A1 | 8/2002 | Burge |
| 2002/0111835 | A1 | 8/2002 | Hele et al. |
| 2002/0116228 | A1 | 8/2002 | Bauer et al. |
| 2002/0188484 | A1 | 12/2002 | Grover et al. |
| 2003/0093302 | A1 | 5/2003 | Quido et al. |
| 2003/0144884 | A1 | 7/2003 | Mayaud |

OTHER PUBLICATIONS

"Solect Launches IAF 2.5, A Comprehensive Billing and Customer Care Solution; Software Infrastructure Enables Service Providers to Grow Their Internet Business," *Business Wire*, p. 3090284, Mar. 9, 1998.

"SiteBridge Corporation Launches CustomerNow for Real-Time Customer Service on the Web," *Business Wire*, p. 4271173, Apr. 27, 1998.

"MATRAnet Addresses Gap in Customer Relations, Enabling Companies to Maximize Web Sales," *M2 Presswire*, Jun. 9, 1999.

Grigonis, Richards, "App Gens: More Than Just IVR," *Computer Telephony*, vol. 7, No. 9, p. 54, Sep. 1999.

Yen, Jerome, et al., "Collaborative and Scalable Financial Analysis With Multi-Agent Technology," Proceedings of the 32$^{nd}$ Hawaii International Conference on System Sciences, Mar. 1999.

www.netquote.com.

www.prudential.com.

www.ehealthinsurance.com.

www.insureme.com.

U.S. Appl. No. 09/860,679, filed May 18, 2001.

U.S. Appl. No. 10/150,576, filed May 17, 2002.

U.S. Appl. No. 11/546,018, filed Oct. 10, 2006.

U.S. Appl. No. 09/909,866, filed Jul. 23, 2001.

Microsoft Press, Microsoft Corporation, Microsoft Press Computer Dictionary, 3rd Edition, c. 1997, pp. 268 and 305.

Savage, Terry. Web site lets you compare car insurance quotes. Chicago Sun-Times, Chicago, IL, p. 49 (Jul. 18, 1999).

Insure.com Announces October Launch of CARS(SM) by PR Newswire. pp. 1-3. New York (Sep. 28, 1999).

Technology Update. American Agent & Broker. 71:7 (Jul. 1999).

Money-Go-Round: Driving a Deal On-Line: The Internet Offers Cheap Quotes for Car Insurance. Daily Telegraph (Jul. 11, 1998).

Shopping For Car Insurance Online Doesn't Kill the Pain. Mixed Results: Digging For Quotes Can Be Frustrating, But It Beats Phone Tag With Agents. Atlanta Constitution (Feb. 7, 2000).

New Opportunities To Sell Insurance Products (Emerge For Banks). Bank Marketing. 32:10 (Oct. 2000).

Dual Strategy. (Company Business and Marketing). Insurance and Technology. 25:7 (Jul. 2000).

Commonwealth Bank Takes Net Honors. Retail Banker International. (Apr. 22, 1999).

Anthem Health of New York Brings Group Health Insurance To The Web: Anthem Site Gives Employers and Brokers Immediate Group Quotes Online. Business Wire (Apr. 8, 1999).

CitX Announces New Internet-Based E Commerce Platform for Insurance Companies to Automate Marketing, Underwriting, and Distribution of Insurance Products. PR Newswire (Sep 21, 1998).

A Powerful Offering. Distribution Management Briefing (Mar. 2000).

HomeCom and Progressive Auto Insurance Delivering Online Insurance; Automobile and Motorcycle Insurance Will be Available Using the Internet. Business Editors. Business Wire. pp. 1-3 (May 14, 1999).

* cited by examiner

ATLAS III Welcome Page

Customer Information

Agent Code: |0m6800|

Last Name: |Atlas3|

Street: |1 Main Street|

City: |Manchester|

State: 83

```
ALASKA
ALABAMA
ARKANSAS
ARIZONA
CALIFORNIA
COLORADO
CONNECTICUT
DISTRICT OF COLUMBIA
DELAWARE
FLORIDA
GEORGIA
```
834

Zip:

Phone:

Rating Results

Producer: 0a7890  Customer: PAULA APRILUPGRADE
RETAIL TEST - NO OUTPUT  Rating State: CT   IFS: ELIGIBLE   MVR:
Office Code: 940   Policy#/Type: AUTOMOBILE 101   IFS Rec Price:   CLUE:

```
Quote Date  05/17/00              Policy Effective Date: 04/21/00
Company: PHX Price : ECO COVERAGE OPTION         LIMIT OR      96JEEP
                        Deductible    CHEROKE C
  Split Limits (BI)     100/300         321.00
  UM & UND Conversion   100/300         241.00
  Property Damage        10,000          99.00
  Comprehensive          200  FG        126.00
  Collision              200  DED       312.00
  Medical Payments       500             23.00
                                     ----------
  Per Vehicle Total(s):                1122.00

12-Mo.Total:   $1122.00
```

FIG. 87A

Information to Close

| Effective Date | 04/21/2000 | Policy Term | 12 | Total Premium | 1122 |
| Bill Mailed Approximately | 06/01 | Payment Due On | 06/21 | Estimated Days Until Next Cycle | 15 |

| Payment Options | Current Cycle | | Next Cycle | |
|---|---|---|---|---|
| EFT BILLING | | | | |
| Installment Amount | $95.50 | 09 Installments | $95.50 | 08 Installments |
| EFT Charge | 2.00 | | | |
| INSTALLMENT PLAN | | | | |
| Minimum Downpayment | 284.50 | 25.00% Required | 377.96 | 33.33% Required |
| Installments | 97.50 | 09 Installments | 97.50 | 08 Installments |
| Installment Charge | 4.00 | | | |

[View IFS Information]  [View Pricing Details]  [Proceed to Issue]

SYSTEM AND METHOD FOR PROVIDING WEB-BASED USER INTERFACE TO LEGACY, PERSONAL-LINES INSURANCE APPLICATIONS

This application claims the benefit of U.S. Provisional Application No. 60/200,491 titled "TRAVNET," filed Apr. 28, 2000, and U.S. Provisional Application No. 60/219,691 entitled "SYSTEM AND METHOD FOR PROVIDING WEB-BASED USER INTERFACE TO LEGACY INSURANCE APPLICATIONS," filed Jul. 21, 2000, both of which are herein incorporated by reference in their entireties.

BACKGROUND OF THE INVENTION

1. Field of the Invention

The present invention relates to a system and method for providing web-based data processing services to insurance agents and customer service representatives. More specifically, the present invention relates to a system and method for providing a web-based interface to an insurance data processing system to increase the functionality and ease of use in providing information about personal-lines insurance policies to users, issuing personal-lines insurance quotes and policies, modifying policies, etc. As referred to herein, personal-lines insurance policies relate to insurance policies for individuals' needs, as opposed to commercial and/or business needs. Examples of personal-lines insurance are homeowner insurance, auto insurance, boat/yacht insurance, life insurance, health insurance, etc.

2. Description of the Related Art

Insurance companies have traditionally used large, centralized data processing systems that run on mainframe computers. Because of the large amounts of data that must be handled and because of the criticality of the system, mainframes have provided an economical way to provide the necessary performance and reliability. As insurance companies become more competitive, it is imperative that insurance agents be provided an easy-to-use, user-friendly interface with which to view policy information, issue insurance quotes and policies, and so on.

Since many insurance agents have the ability to issue policies from more than one insurance company, it is often ease-of-use that makes the sale when prices are relatively similar. Additionally, insurance companies have invested significant resources into legacy mainframe applications. It would be very costly to completely rewrite mainframe applications for another computing environment.

BRIEF SUMMARY OF THE INVENTION

There is a need for a web-based insurance data processing system and method that provide the necessary reliability, performance, and ease-of-use. There is also a need for a system and method that can provide a modern, user-friendly interface to a legacy insurance system, such as a mainframe system, to provide information about personal-lines insurance policies to users, issue personal-lines insurance quotes and policies, modify policies, etc.

Accordingly, the preferred embodiments of the present invention provide a system and method for a web-based graphical user interface (GUI) to an insurance data processing system (insurance system) that is fast and simple to navigate.

The preferred embodiments of the present invention also provide a system and method for a user-friendly interface to an insurance system that requires minimal training, increases productivity, and saves money.

The preferred embodiments of the present invention further provide a system and method for a web-based interface to an insurance system that integrates use of Internet technology in business work flows, provides dynamic data entry for insurance coverage packages and pricing programs that are most often used, and offers easy access to value-added products and services.

The preferred embodiments of the present invention also provide a system and method for a web-based interface to an insurance system that enables local printing of insurance applications, proposals and forms to facilitate immediate delivery of professional-quality proposals to customers and on-demand printing of applications, forms and binders.

The preferred embodiments of the present invention additionally provide a system and method for a web-based interface to an insurance system that includes intuitive graphical features such as trees, buttons, hyperlinks, navigation bars, drop-down boxes, and dynamic screen painting.

The preferred embodiments of the present invention also provide a system and method for a web-based interface to an insurance system that continues process flow based on data capture, prompts only for pertinent questions, and displays specific coverage and deductible options that apply to form, jurisdiction and market.

BRIEF DESCRIPTION OF THE DRAWINGS

The preferred embodiments are illustrated by way of example and not limited in the following figures, in which:

FIGS. 8A-D depict a Customer Information web page of the GUI for an insurance quote process, in accordance with an embodiment of the present invention;

FIGS. 10A-B depict a Basic Policy Information web page of the GUI for an insurance quote process, in accordance with an embodiment of the present invention FIGS. 1A-B depict a Policy Detail web page of the GUI for an insurance quote process, in accordance with an embodiment of the present invention;

FIGS. 20A-B depict a Policy Eligibility web page of the GUI for a process to issue an auto insurance policy, in accordance with an embodiment of the present invention;

FIGS. 22A-B depict a Vehicle—Subject web page of the GUI for a process to issue an auto insurance policy or an insurance quote, in accordance with an embodiment of the present invention;

FIGS. 23A-B depict a Operator Information web page of the GUI for a process to issue an auto insurance policy or an insurance quote, in accordance with an embodiment of the present invention;

FIGS. 27A-B depict a Rating Results web page of the GUI for a process to issue an auto insurance policy or an insurance quote, in accordance with an embodiment of the present invention;

FIG. 30 depicts a Determinants—Premium Level web page of the GUI for a process to issue a homeowner insurance policy, in accordance with an embodiment of the present invention;

FIG. 31 depicts a Determinants—Pricing Level web page of the GUI for a process to issue a homeowner insurance policy, in accordance with an embodiment of the present invention;

Figures 32A, 32B:
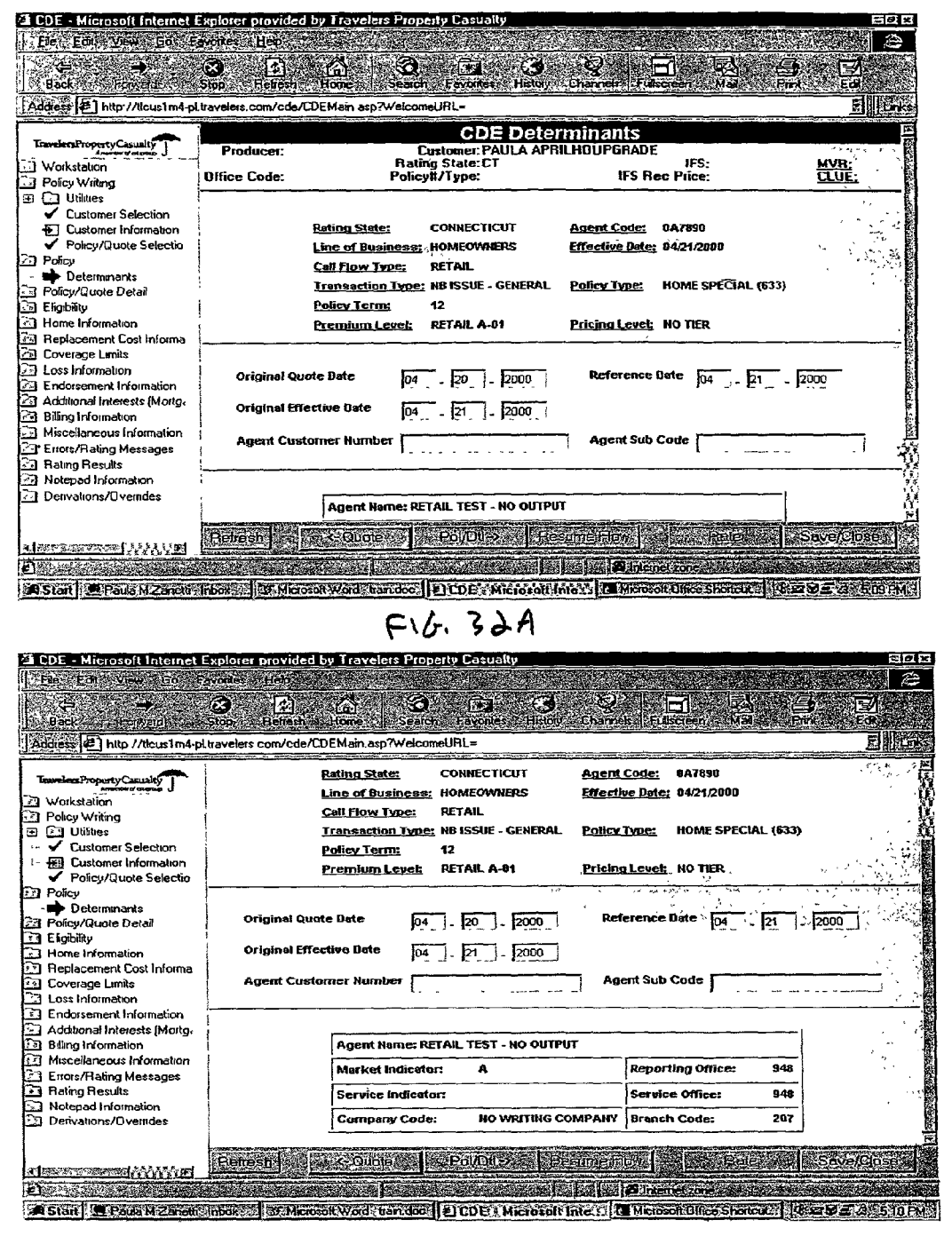

FIGS. 32A-B depict a Determinants web page of the GUI for a process to issue a homeowner insurance policy, in accordance with an embodiment of the present invention;

Figures 33A, 33B:
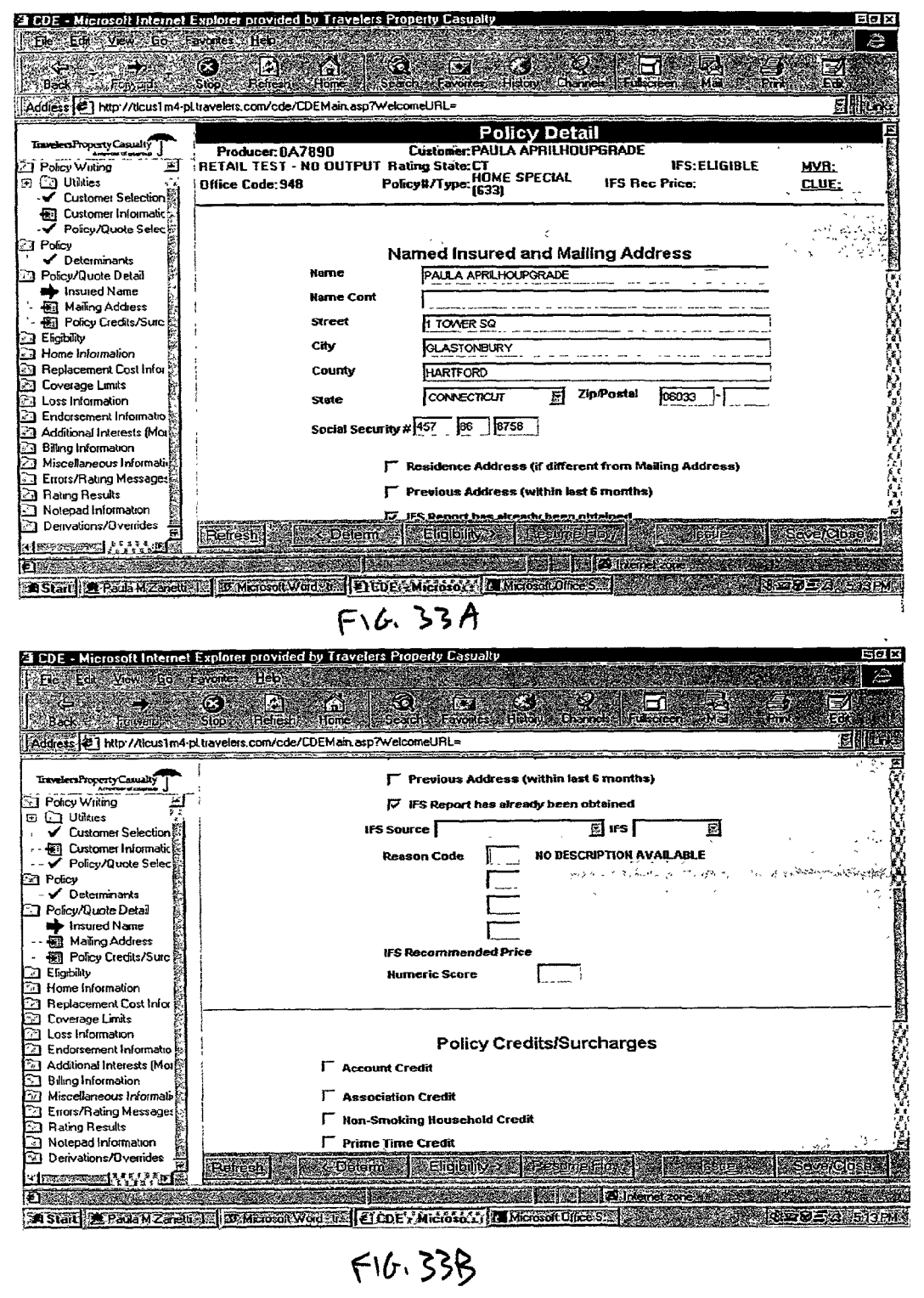

FIGS. 33A-C depict a Policy Detail web page of the GUI for a process to issue a homeowner insurance policy, in accordance with an embodiment of the present invention;

Figures 34A, 34B:
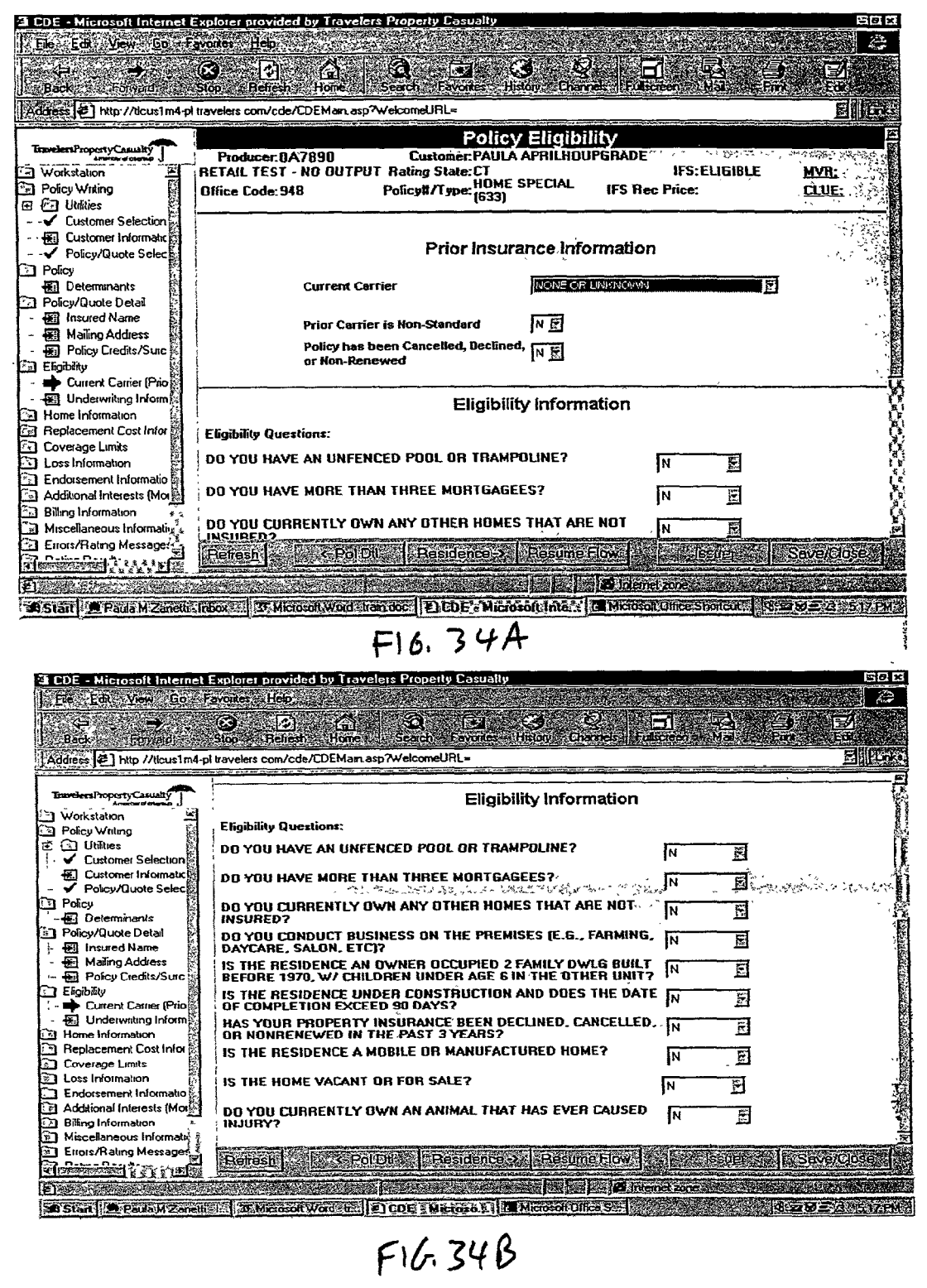

FIGS. 34A-B depict a Policy Eligibility web page of the GUI for a process to issue a homeowner insurance policy, in accordance with an embodiment of the present invention;

FIGS. 35A-B depict a Residence Information web page of the GUI for a process to issue a homeowner insurance policy, in accordance with an embodiment of the present invention;

Figure 41:
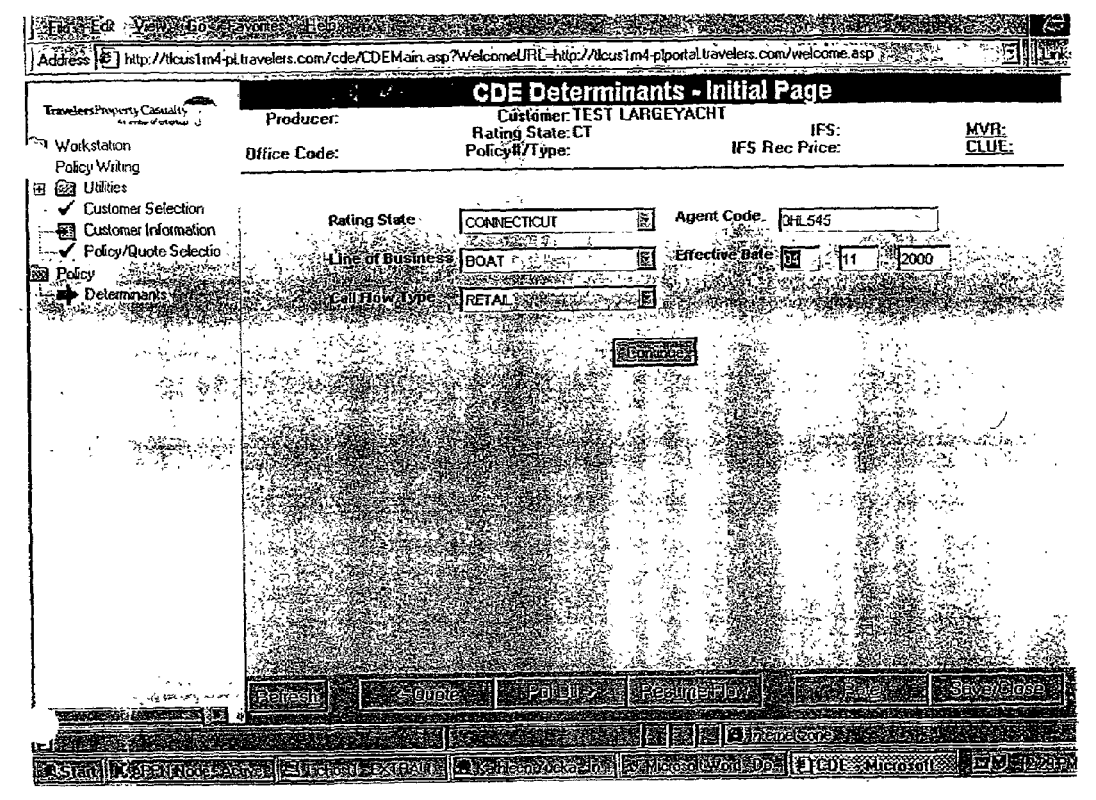

FIG. 41 depicts a CDE Determinant—Initial Page of the GUI for a process to issue an insurance policy for a water vessel, in accordance with an embodiment of the present invention;

Figure 42:
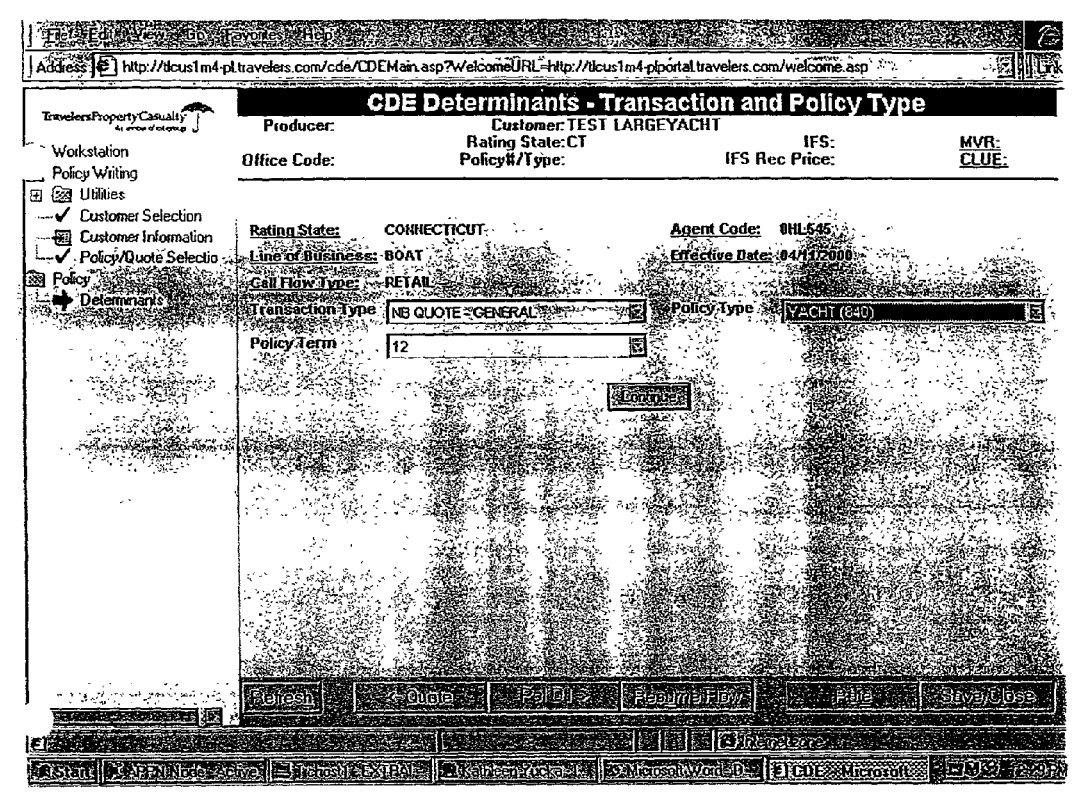

FIG. 42 depicts a CDE Determinant—Transaction and Policy Type page of the GUI for a process to issue an insurance policy for a water vessel, in accordance with an embodiment of the present invention;

Figure 45:
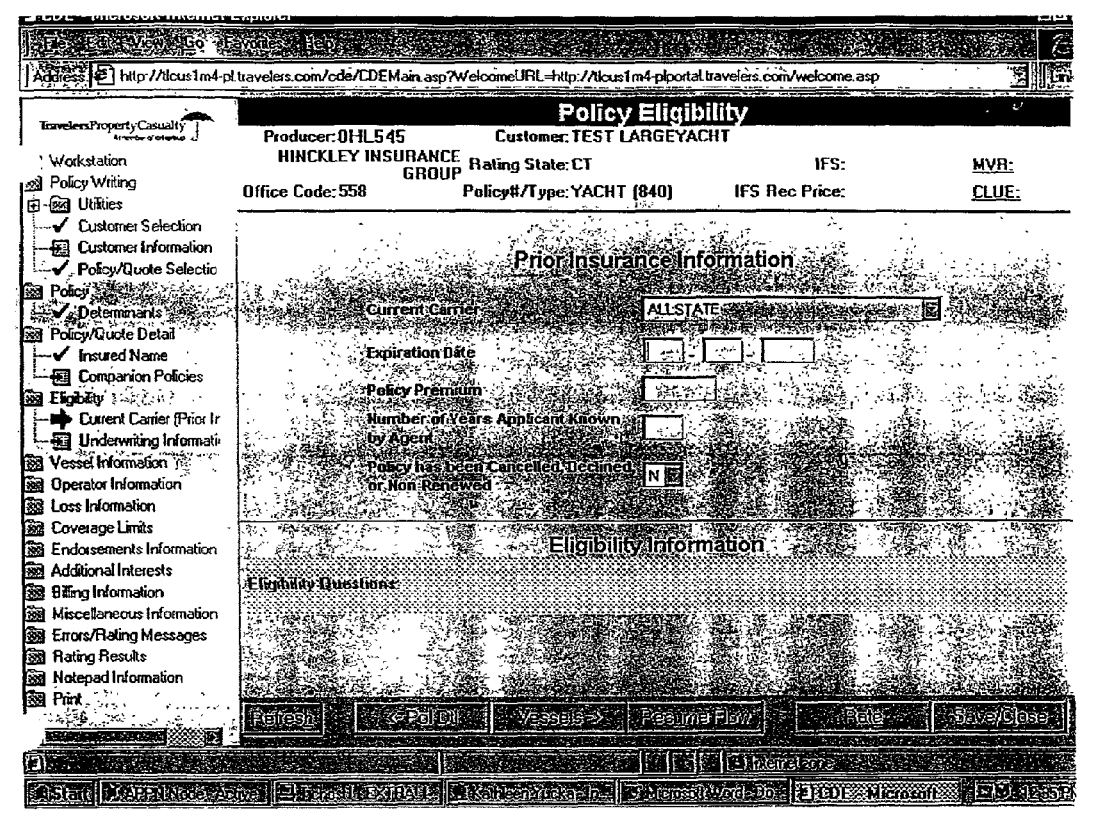

FIG. 45 depicts a Policy Eligibility page of the GUI for a process to issue an insurance policy for a water vessel, in accordance with an embodiment of the present invention;

Figure 47A:
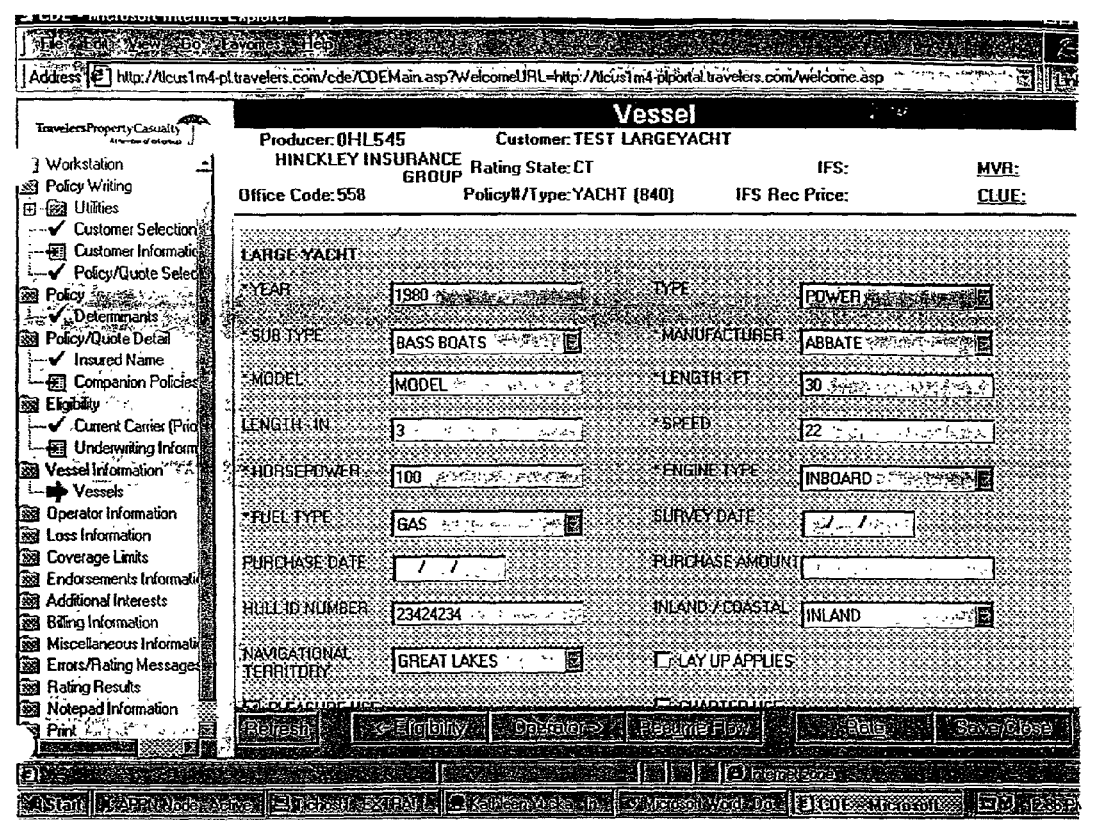
Figure 47B:
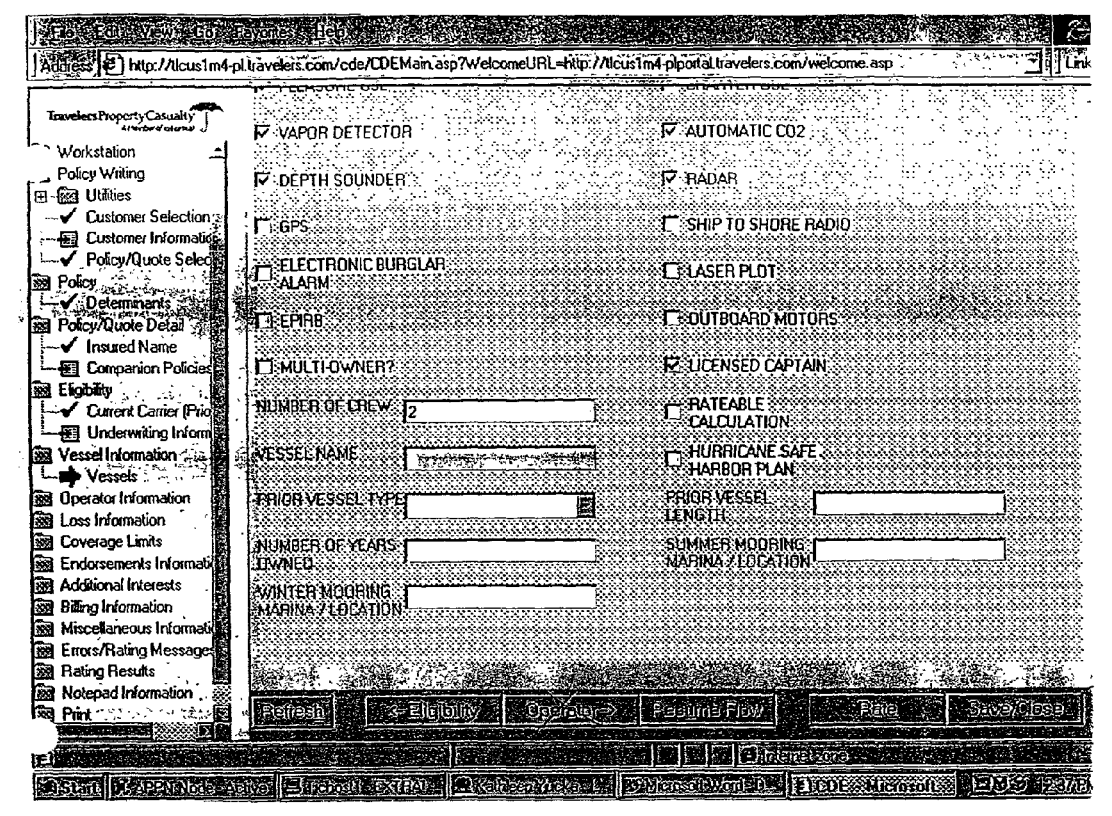
Figure 47C:
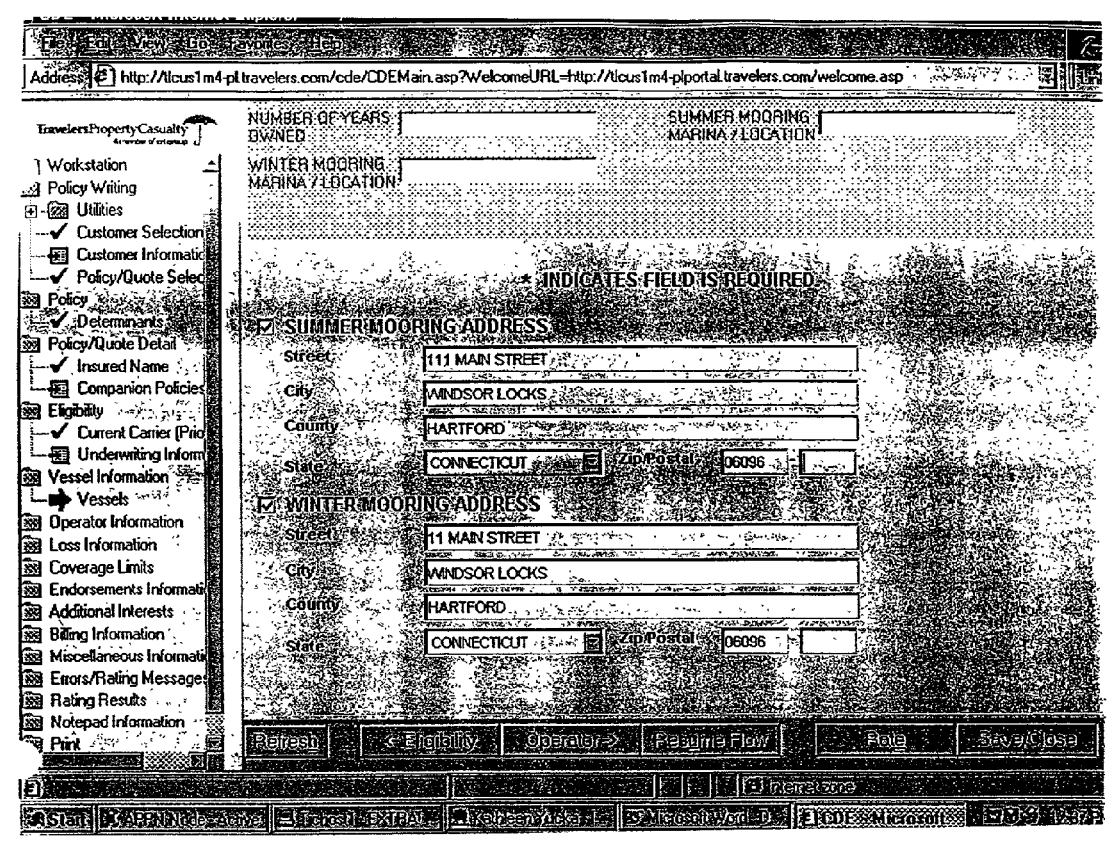

FIGS. 46 and 47A-C depict a Vessel page of the GUI for a process to issue an insurance policy for a water vessel, in accordance with an embodiment of the present invention;

Figure 48B:
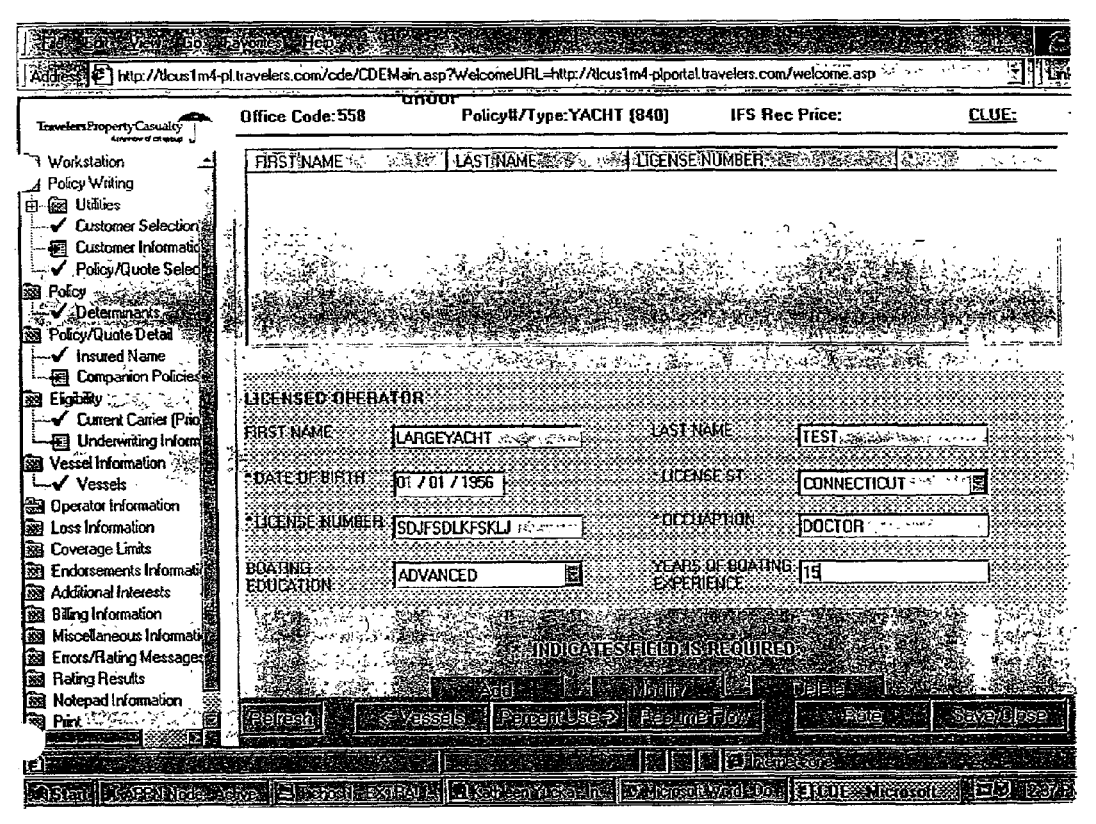

FIGS. 48A-B depict a Vessel Operator page of the GUI for a process to issue an insurance policy for a water vessel, in accordance with an embodiment of the present invention;

FIG. 50 depicts an Accidents/Violations and Inexperience page of the GUI for a process to issue an insurance policy for a water vessel, in accordance with an embodiment of the present invention;

Figure 55A:
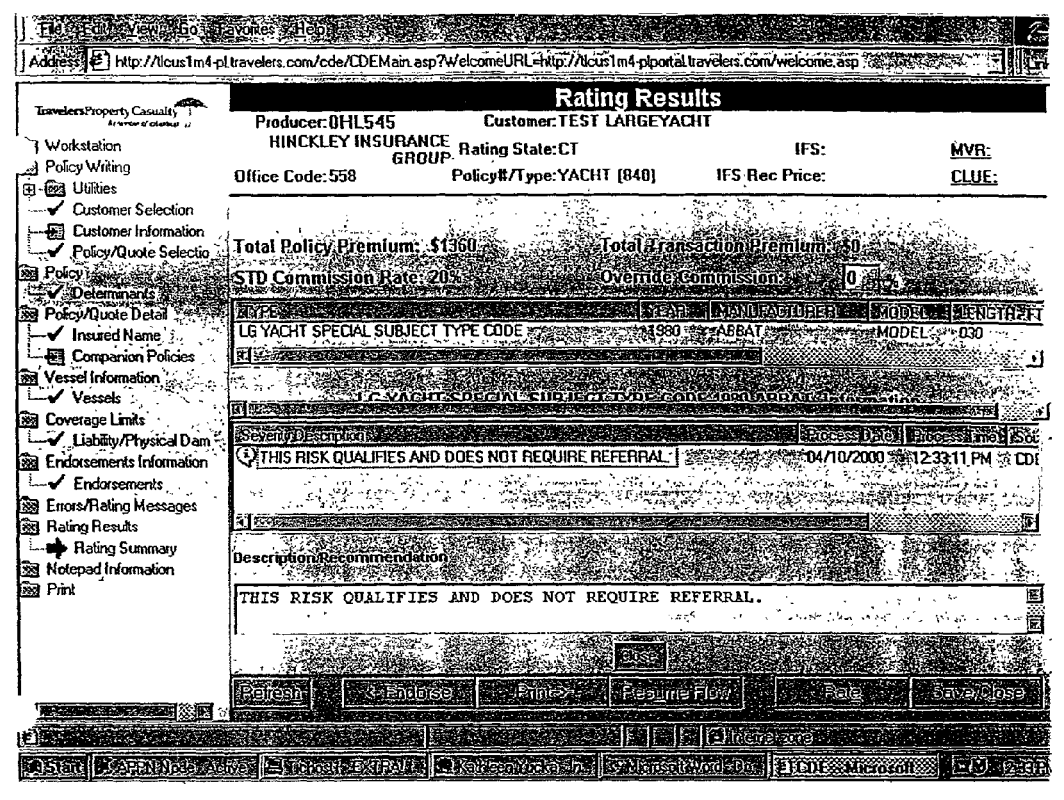
Figure 55B:
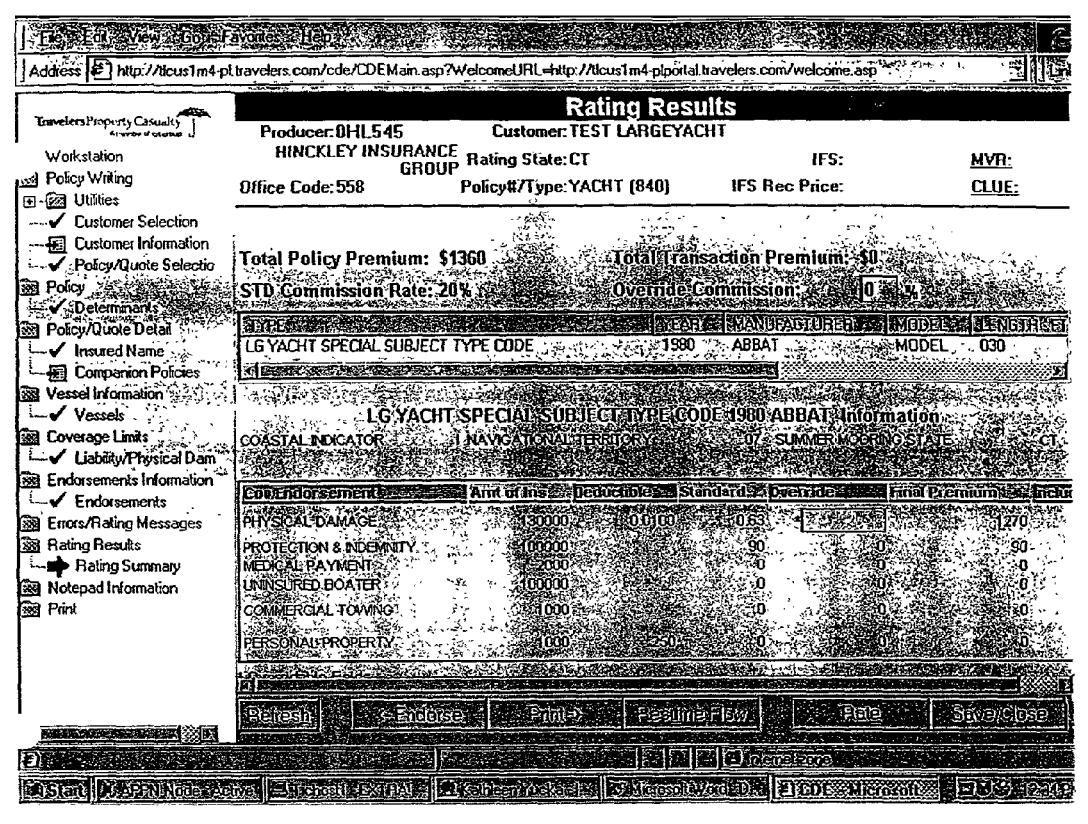
Figure 55C:
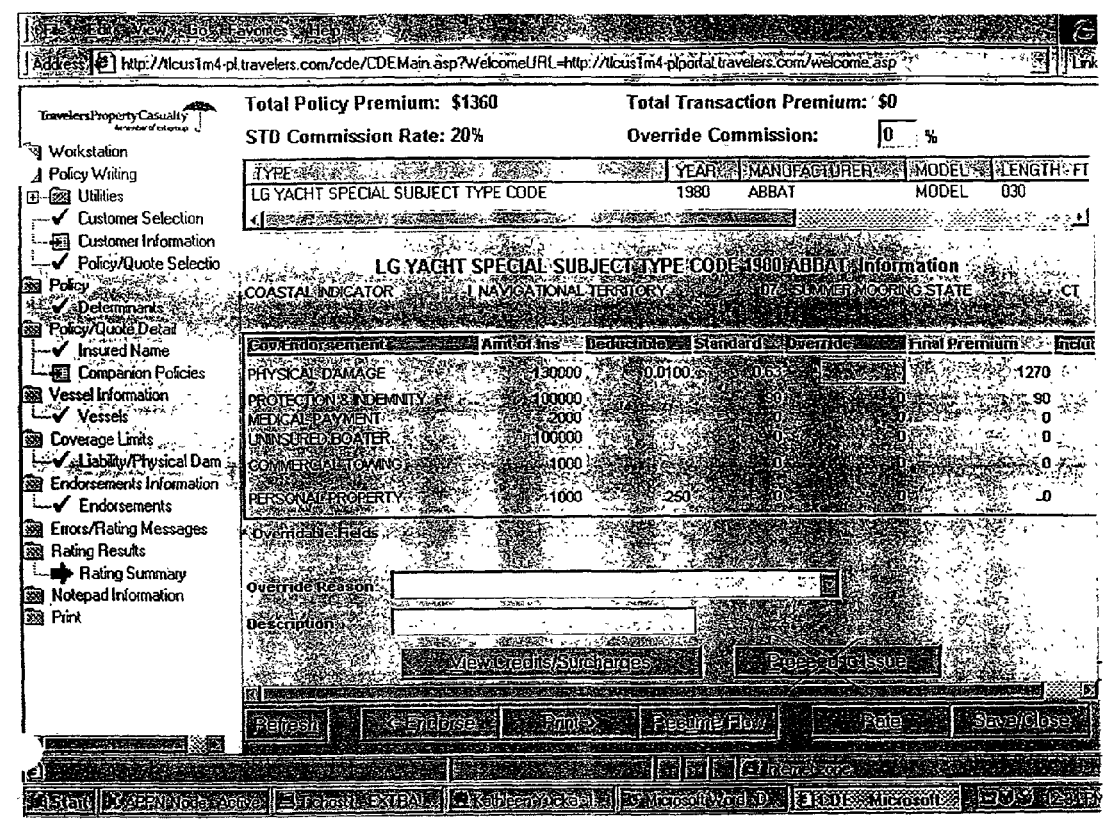

FIGS. 55A-D depict a Rating Results page of the GUI for a process to issue an insurance policy for a water vessel, in accordance with an embodiment of the present invention;

DETAILED DESCRIPTION OF THE INVENTION

The present invention provides users with web-based access to an insurance data processing system (insurance system), such as a legacy insurance mainframe system, for insurance information about insurance policies to users, issuance of insurance quotes and policies, modification of policies, etc. For example, an insurance agent at a remote location using a web browser such as Netscape Communicator or Microsoft Internet Explorer can access the insurance system via a web server across a public communication network such as the Internet or a private communication network. One private communication network commonly used by insurance agents is the Insurance Value Added Network (IVAN). One feature of this approach is that all remote locations can have access to a central system and uniform graphical experience without the need to distribute software to each and every individual remote location.

The present invention also provides a mechanism for building a Web-based graphical user interface (GUI) to legacy systems while leveraging the legacy applications by "wrapping" each legacy application in a web-based GUI and then hiding the legacy application behind that interface. According to one embodiment of the present invention, the web-based GUI comprises at least one website that is provided by one or more web server groups or farms, each including one or more web servers. Any web-based development platform, such as the Microsoft Windows Distributed Internet Architecture (WINDNA), may be used to build and deploy the web-based GUI. In other words, the GUI applications may be hosted by an Internet information server (IIS), such as the Microsoft IIS, and utilize a teleprocessing or transaction processing monitor (TP monitor), such as the Microsoft Transaction Server (MTS) to provide the web-based GUI and its website(s). The deployment of the web-based GUI of the present invention also includes server site replication to ensure that the server farms contain identical applications and information. Thus, legacy applications of the insurance system are hidden behind the web-based GUI, and users can access those legacy applications via the GUI and its website(s). The term "users" used throughout the present disclosure refers to insurance agents using the web-based GUI and insurance system to serve their insurance customers. Users can also refer to insurance customers themselves who are authorized to access the GUI website and the retrievable insurance applications therein. For website security, the GUI web servers can authenticate users with traditional Microsoft Windows-based authentication mechanisms such as lightweight directory access protocol (LDAP) or Active Directory. The GUI web server farms and their web servers therein can then communicate with the insurance system using message queue (MQ) over transmission control protocol/Internet protocol (TCP/IP).

Figure 1A:
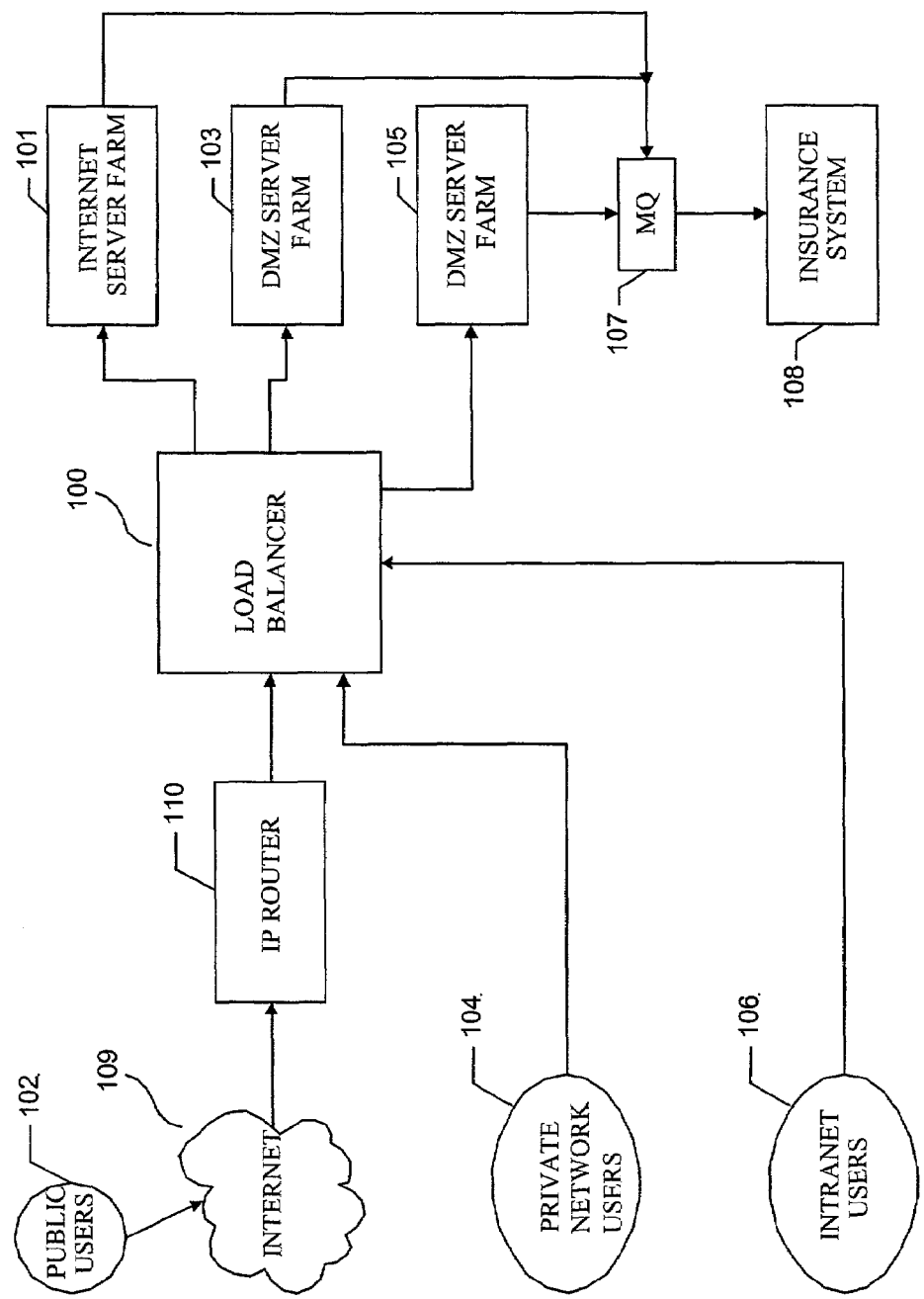
FIG. 1A depicts a high level architecture for a web-based graphical user interface (GUI) to a host insurance data process system (insurance system) and its insurance applications, in accordance with an embodiment of the present invention.

According to one embodiment of the present invention, there are provided three server farms for the web-based GUI to the insurance system as shown in FIG. 1A. One server farm 101 may be virtually set up at a public Internet hosting site and can be accessed by users 102 through the Internet 109 and IP router 110. Another server farm 103 may be virtually set up in a demilitarized zone (DMZ), i.e., a barrier between the intranet and the Internet, and can be accessed by users 104 through private networks such as the IVAN. The third server farm 105 may be virtually set up within an insurance host internal network and can be accessed by users 106 through the intranet of the internal network. The users 102, 104, and 106 all use the web-based GUI to access the various server farms. These server farms are in turn connected to the host insurance system 108, which is also located within the host internal network, via the MQ 107. Security features such as data encryption, user authentication, and firewalls are used with the server farms in the appropriate manner to define their virtual set-ups, even though they may be physically located in one location, to prevent unauthorized use of the GUI and its web servers and entry into the host insurance system 108.

According to an embodiment of the present invention, a software or hardware load balancer 100 such as the Cisco LocalDirector can be used to load balance between the web server farms 101, 103, and 105, with each web server in the server farms running Windows 2000. The LocalDirector 100 load balances between the server farms 101, 103, and 105. If one server farm goes down, the user's state is maintained and his or her session can be continued on one of the remaining server farms. Thus, the server farms back up one another. Likewise, as mentioned earlier, there may be provided more than one servers per server farm; thus, if one server goes down, the user's state is maintained and his or her session can also be continued on another server in the same server farm.

Some legacy applications of the insurance system embed business logic into their legacy screen programs for data entry. Because the web-based GUI of the present invention replaces those legacy screen programs, new code for the web-based GUI may be created to ask users the appropriate questions and to make sure that appropriate answers are given under the various circumstances of insurance. Some of these circumstances include the various jurisdictions or states for which the insurance products are requested, the various insurance products available to users from the insurance host and its system, the various insurance filings, etc. For instance, in an insurance quote transaction, the web-based GUI of the present invention can collect the necessary information from a user and then route such information to the insurance rating engines within the insurance system to generate an insurance quote for the user. If the user is interested in the quote, the insurance sale process continues whereby the GUI will prompt the user for additional information, such as billing information and other information pertinent to the insurance policy of interest. The additional information is then sent back to the issue engines of the insurance system where premium breakdowns are analyzed, statistical feeds and feeds for the general ledger and advanced function printing are created, etc.

Figure 1B:
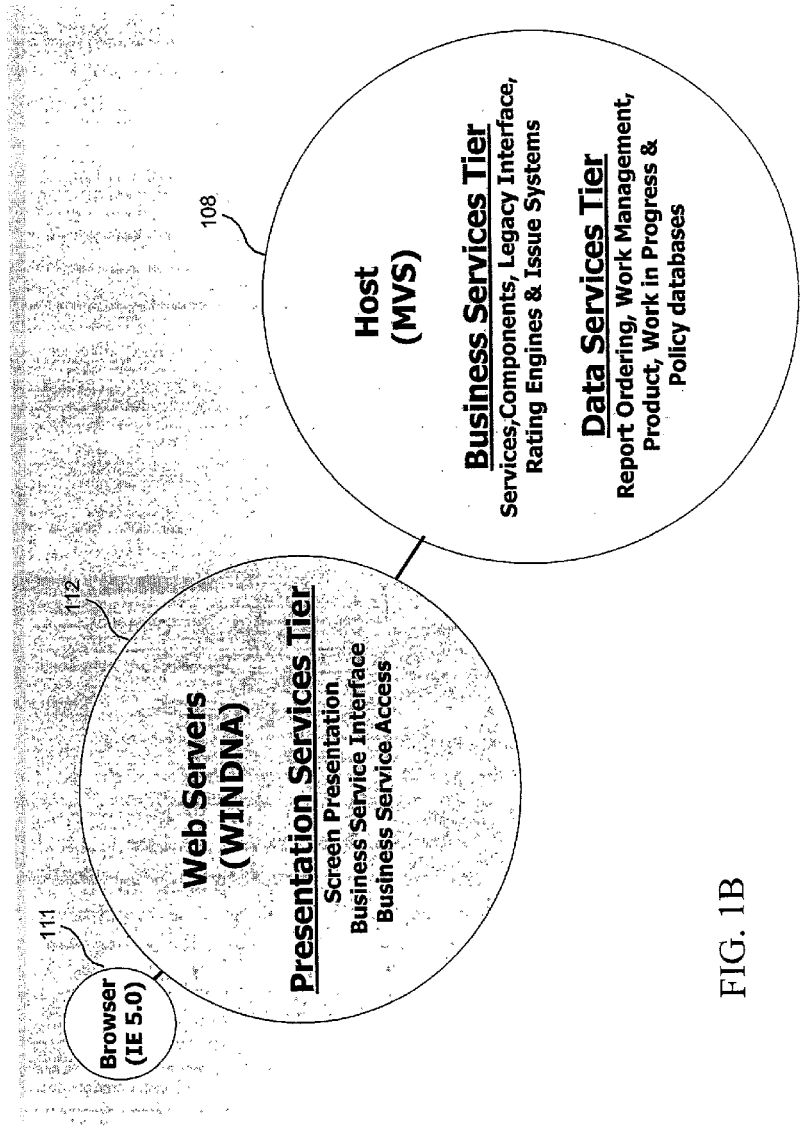
FIG. 1B depicts an application architecture showing a tier diagram for a web-based GUI to an insurance system and its insurance applications, in accordance with an embodiment of the present invention.

FIG. 1B shows an application architecture and a tier diagram for accessing the insurance system and its insurance applications via a web-based GUI of the present invention. The web-based GUI includes the web browser 111, such as Internet Explorer or Netscape Navigator, that users 102, 104, and 106 (FIG. 1A) use to access the host insurance system 108. As mentioned earlier, the web-based GUI also includes web servers 112, which are located in the server farms 101, 103, and 105 (FIG. 1A) and built and deployed by, for example, WINDNA. The web servers 112 provide a presentation service tier. The host insurance system 108 provides a business services tier and a data services tier. The presentation service tier of the web browsers 112 includes a screen presentation, a business service interface, and a business service access for: gathering information from the users by using an interview engine to guide them to relevant questions and allowable answers; sending users' information to the business services for processing; receiving the results of the business services processing; and presenting those results to the users. The business services tier of the host 108 includes services, components, a legacy interface, rating engines, and issue systems for: receiving input from the presentation services tier; interacting with the data services tier to perform the business operations that were designed to be automated (e.g., reporting ordering, issue processing, rating, etc.); and sending the processed results to the presentation services tier. The data services tier of the host 108 includes report ordering, work management, product, work in progress (WIP), and policy databases for: storing data; retrieving data; maintaining data; and assuring the integrity of data.

Figure 1C:
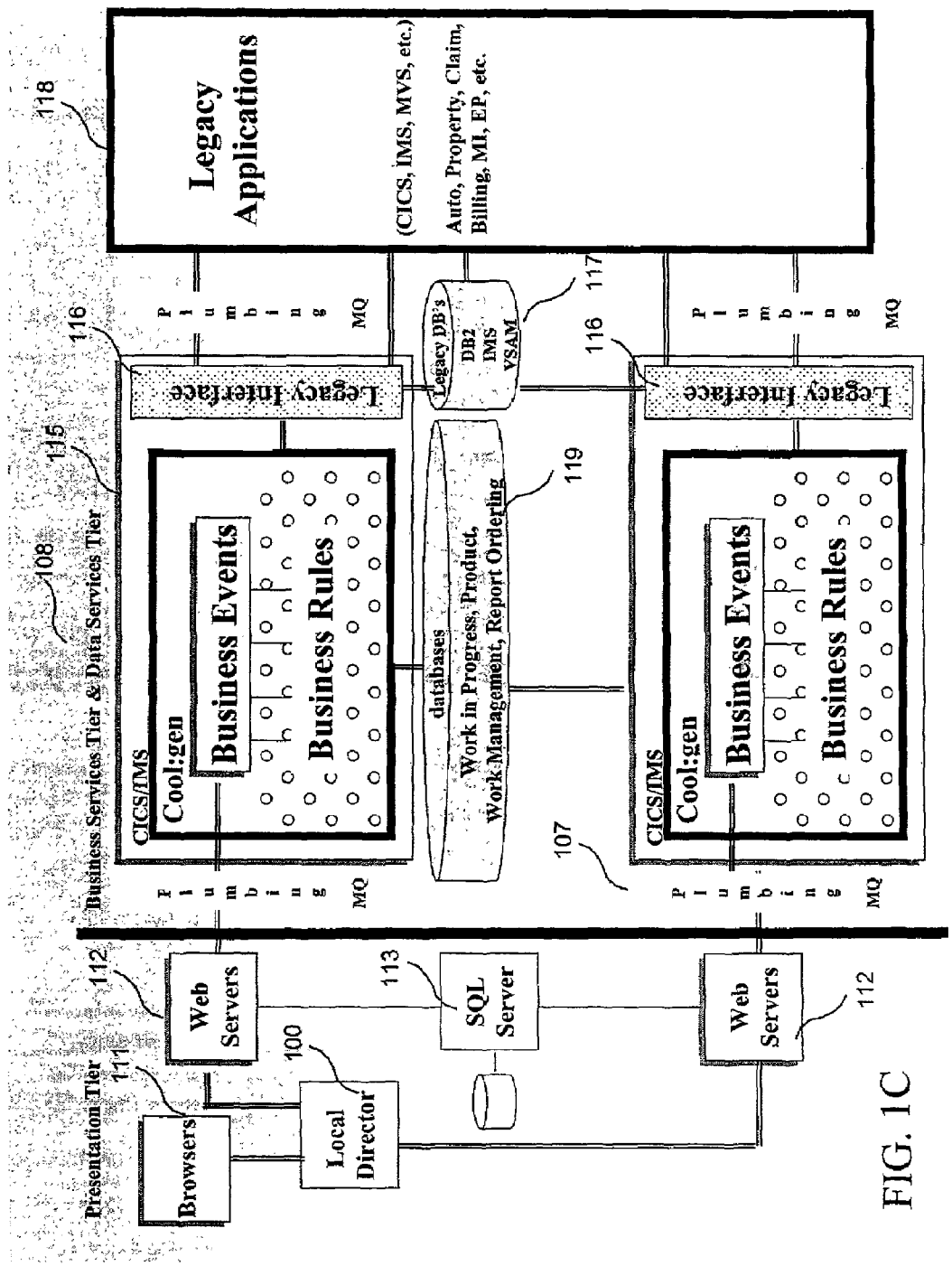
FIG. 1C depicts a technical architecture, with reference to FIG. 1A, of the application architecture and tier diagram shown in FIG. 1B, in accordance with an embodiment of the present invention.

FIG. 1C provides a technical architecture, with reference to FIG. 1A, of the application architecture and tier diagram shown in FIG. 1B, wherein like elements are labeled with like numbers. As shown, the presentation services tier includes the web browsers 111, the load balancer or local director 100, the web servers 112 with an associated structured query language (SQL) server 113 for maintaining the users' states in the web servers 112. Just as shown in FIG. 1A, FIG. 1C shows that the web servers 112 communicate with the host 108 using the MQ 107. The business services tier and the data services tier at the host 108 include: the business events and business rules for the business services tier and the various aforementioned databases 119 for the data services tier. The host 108 further includes legacy interfaces 116 and legacy database 117 for providing access to the legacy insurance applications 118.

According to one embodiment of the present invention, the application code for the business rules and events for the business services tier can be developed using Computer Associates Cool:Gen, which is a modeling tool and application generator. This product provides a mechanism for developing platform independent source code for the web-based system. Once an application code is developed in Cool:Gen, it can be deployed to in Unix, Windows 2000, or other operating systems. In this instance, the application code for the business rules and events is deployed in a Customer Information Control System and/or Information Management System (CICS/IMS) environment at the host 108.

Figure 1D:
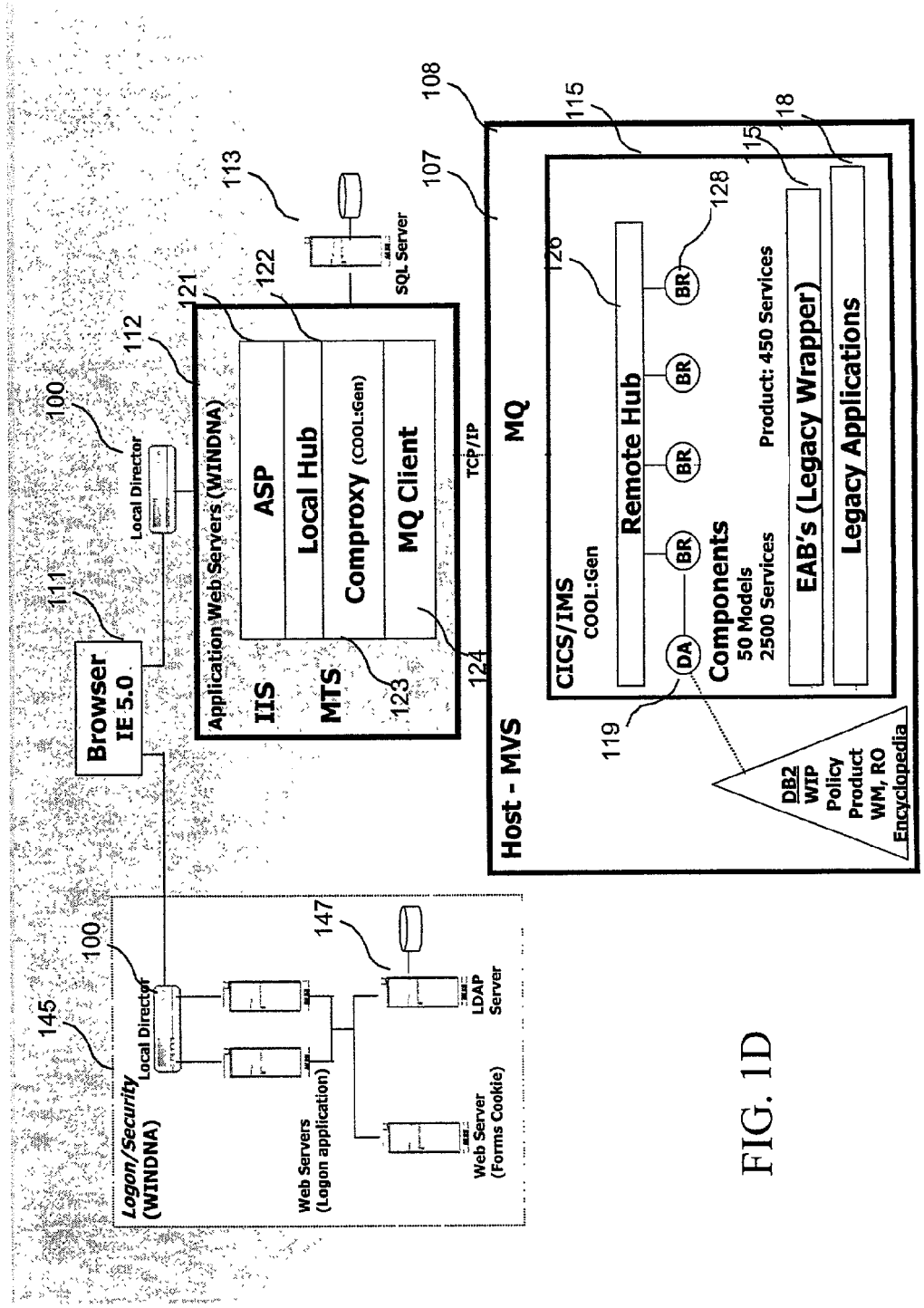
FIG. 1D depicts an infrastructure of the technical architecture shown in FIG. 1C, in accordance with an embodiment of the present invention.

FIG. 1D shows the infrastructure of the technical architecture in FIG. 1C, in accordance with one embodiment of the present invention, with like elements labeled with like numbers. As mentioned earlier, each web server 112 is built and deployed by WINDNA, which includes the IIS and the MTS. As is known in the art, the IIS provides the HTTP processing for the web server 112 and supports Active Server Pages (ASPs) 121 for dynamic processing of content from databases. The ASPs 121 retrieve functions through a local hub 122 at each web server 112. The local hub 112 provides a layer through which functions from the host insurance system or anywhere can be retrieved and used by the ASPs 121. The web server 112 further includes a Comproxy 123 developed through Cool:Gen, which is used to handle communication between the web server 112 and the host insurance system 108 by running the MQ client 124 for connection to the MQ 107 at the host insurance system 108. As mentioned earlier, the web server 112 provides the screen presentation of the presentation services tier. It also allows user personalization and customization of the screen presentation and implements business rules when applicable.

As mentioned earlier, user authentication and security for the web-based GUI of the present invention are provided to the web servers 112 using traditional Microsoft Windows-based authentication mechanisms such as lightweight directory access protocol (LDAP) or Active Directory. According to one embodiment of the present invention, authentication and security features are set up in at least one server farm 145, with an LDAP server 147, separate from the web servers 112. Again, where the authentication and security features are set up depend on whether the features are designed for users accessing the web-based GUI of the present invention via the Internet, Intranet, or a private data network.

According to one embodiment of the present invention, the host 108 comprises a multiple virtual storage (MVS) mainframe with the CICS/IMS environment 115. There is provided a remote hub 126 in the CICS/IMS 115 for accessing the business events and business rules (BR) functions 128 for the business services tier and the databases 119 for the data services tier. Like the local hub 122 in the web servers 112, the remote hub 126 provides a layer through which functions from the host insurance system or anywhere can be accessed by the web servers 112 and/or the host insurance system 108. Together, the business events and business rules 128 and the databases 119 trigger access to the legacy applications via an External Action Block (EAB) 116, which is the legacy wrapper or legacy interface. Thus, the CICS/IMS 115 implements the business rules, manage inventory of the business rules, extend the business rules to the web server 112, manage inventory of services, and provide wrapping of legacy applications.

According to one embodiment of the present invention, the business events and rules are set up in a component and services architecture, wherein each component comprises one or more services. Each component represents an insurance subject or product made available to the users by the host insurance system; whereas, each service corresponds to an action that a user can perform for a particular component. For example, FIG. 1G shows a components and services framework with components classified in eight different groups: references, product type, quotes, customers, activity type, correspondence type, activities, and correspondence. Descriptions of the components are found in Table 1, with the current number of public operations representing examples of the number of services for each of the components.

TABLE 1

Acceptance Package: This component holds information on the WIP needed for interface with the Electronic Publication application for a quote.
Current number of public operations: 5
Actions: This component holds data on the WIP relating to Underwriter Actions and Notations on a Quote.
Current number of public operations: 11
Additional Interests (Policy Participant): This component holds data on the WIP relating to various third parties associated with a quote.
Current number of public operations: 10
Agent: This component has services that wrap legacy programs for interfacing with the Agency Database.
Current number of public operations: 3
Common: This component has services that are common routines for such things as parsing names and addresses.
Current number of public operations: 8
Convert Score: This component has services having to do with the manipulation of credit scores, including the conversion between numeric and alpha scores. Some of the services wrap legacy programs.
Current number of public operations: 7
Coverage: This component holds data on the WIP about the coverages on a policy quote.
Current number of public operations: 23
Credit Surcharge Type: This component holds the product rules governing credits and surcharges that can be applied to policies. Used mainly by the Boat product.
Current number of public operations: 21
Customer: This component has services that wrap legacy programs for interfacing with the Personal Lines customer files.
Current number of public operations: 9
Endorsement: This component holds data on the WIP about the endorsements on a policy quote.
Current number of public operations: 11
Event: This component holds information about an event/activity entered into the Contact Management application.
Current number of public operations: 6
Event Type: This component holds information about the types of events/activities that can be entered in the Contact Management application.
Current number of public operations: 2
Installment Schedule: This component has services that wrap a legacy program for calculating installment payments.
Current number of public operations: 1
Location: This component holds data on states, and also has services for directly accessing the TAP City Database and PPC Table.
Current number of public operations: 5
Lookup: This component holds data for a myriad of different reference lookups.
Current number of public operations: 7
Loss: This component holds data on the WIP about losses, accidents, convictions, etc., associated with a quote.
Current number of public operations: 22
Outside Report: This component hold information in the Warehouse about requests for outside reports and the reports themselves that are received.
Current number of public operations: 31
Outside Report Type: This component holds information that defines the formats of outside report requests and outside report results.
Current number of public operations: 9
Personnel/Staff Member: This component holds data about personnel and organizations in the business service offices that are used for the contact management and work management applications.

TABLE 1-continued

Current number of public operations: 2
Policy: This component holds Policy/Quote level data on the WIP.
Current number of public operations: 80
Policy Subject: This component holds data on the WIP about the persons and things that are insured by a policy quote.
Current number of public operations: 27
Premium: This component holds information on the WIP about the premium charges for a quote, including credits and surcharges.
Current number of public operations: 11
Premium Type: This component holds the product rules governing premium charges for policies. Used only by the Boat product.
Current number of public operations: 20
Pricing Options: This component holds the product rules governing premium levels, pricing tracks and writing companies.
Current number of public operations: 4
Pricing Option TRV: This component has Travelers written services relating to Pricing Options.
Current number of public operations: 1
Problem Log: This component holds a log of error messages related to a quote on the WIP.
Current number of public operations: 5
Product Rules: This component contains product rules about Policy Types, Coverage Grant Options (Coverage and Endorsement Types), Coverage Dependencies, Limit Types, Deductible Types and Subject Types.
Current number of public operations: 33
Rate Type: This component holds product rules governing premium rates. Used only by the Boat product.
Current number of public operations: 20
Rating Results: This component holds data on the WIP that is returned from the policy rating systems when a quote is rated.
Current number of public operations: 3
Reinsurance Type: This component holds the product rules governing premium charges for reinsurance on policies. Used only by the Boat product.
Current number of public operations: 18
Script: This component holds script questions and answers for use in building dynamic facet screens.
Current number of public operations: 24
Symbol: This component has services that wrap legacy programs for accessing the automobile symbol database.
Current number of public operations: 3
Template: This component holds information about Templates, which are Quotes on the WIP that are not real customer quotes, but rather are contain default data used to create a new quote.
Current number of public operations: 4
Transaction Log: This component hold information on the WIP relating to transactions sent to the policy rating and issue applications for quotes on the WIP.
Current number of public operations: 11
Transaction Type: This component holds data that defines the allowable transaction and subtransaction type combinations by line of business, policy status and call type.
Current number of public operations: 3

Figure 1E:
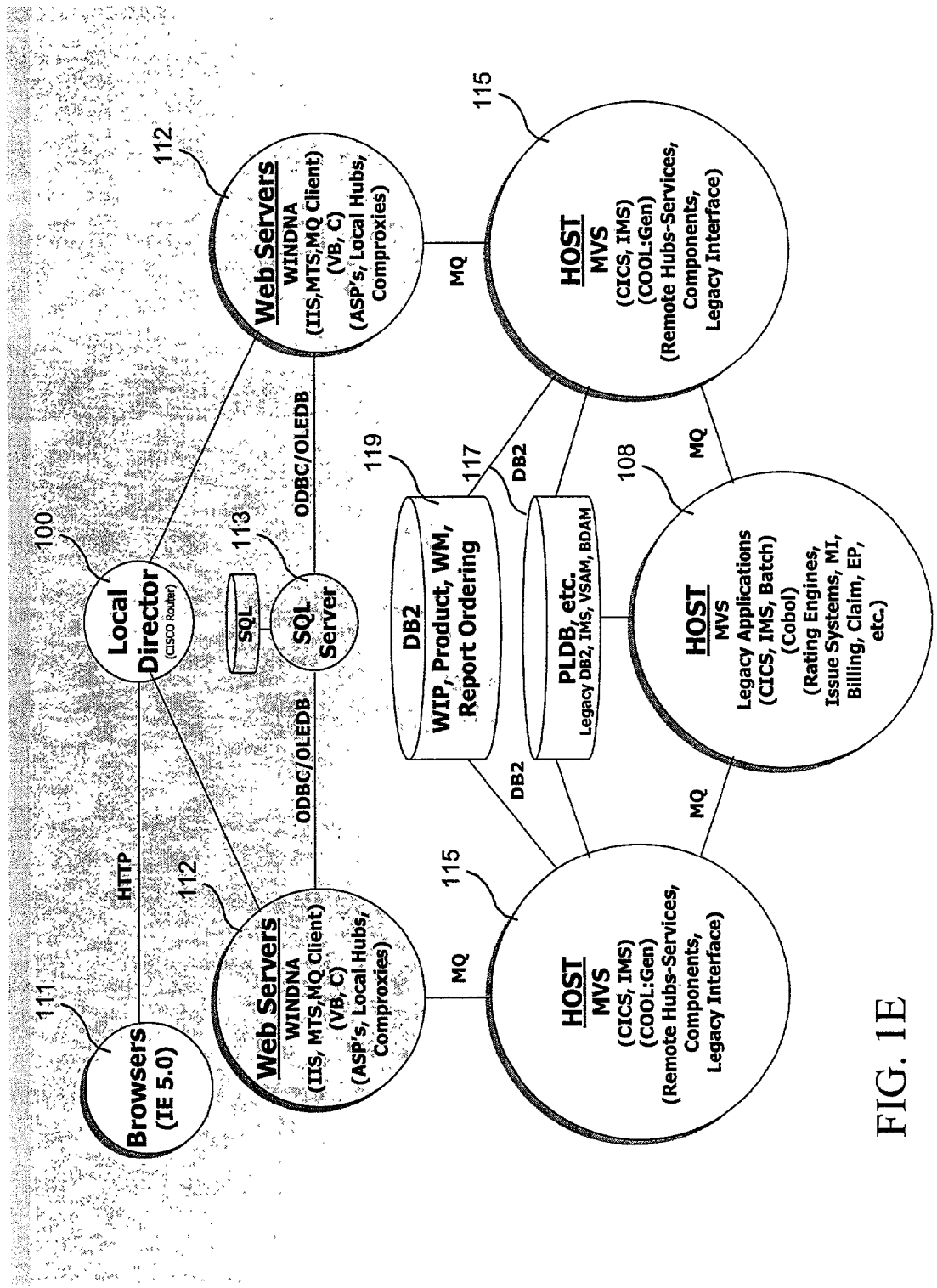
FIG. 1E depicts in general a redundancy aspect of the technical architecture shown in FIGS. 1B-D, in accordance with an embodiment of the present invention.

FIG. 1E shows in general the redundancy aspect of the technical architecture depicted in FIGS. 1B-D, with like elements labeled with like numbers. As explained earlier with reference to FIG. 1A, there are web servers 1112 located at different locations or server farms with a load balancer such as a LocalDirector 100 to load balance between the server farms. The web servers sites 112 are identical to one another through server site replication, and the states of the web servers sites 112 are maintained by the SQL server 113 through ODBC/OLEDB. Thus, the web servers sites are redundantly provided to serve as backups to one another as mentioned earlier. The web servers sites 112 communicate with the host insurance system 108 using MQ to access legacy insurance applications such as rating engines, issue systems, billing, claim. As shown in FIG. 1D, there is a CICS/IMS environment 115, complete with remote hubs for providing services and components and a legacy interface to the legacy insurance applications, corresponding to each of the web servers site 112. Because the web servers sites 112 are replicated, their corresponding CICS/IMS environments are also replicated.

Figure 1F:
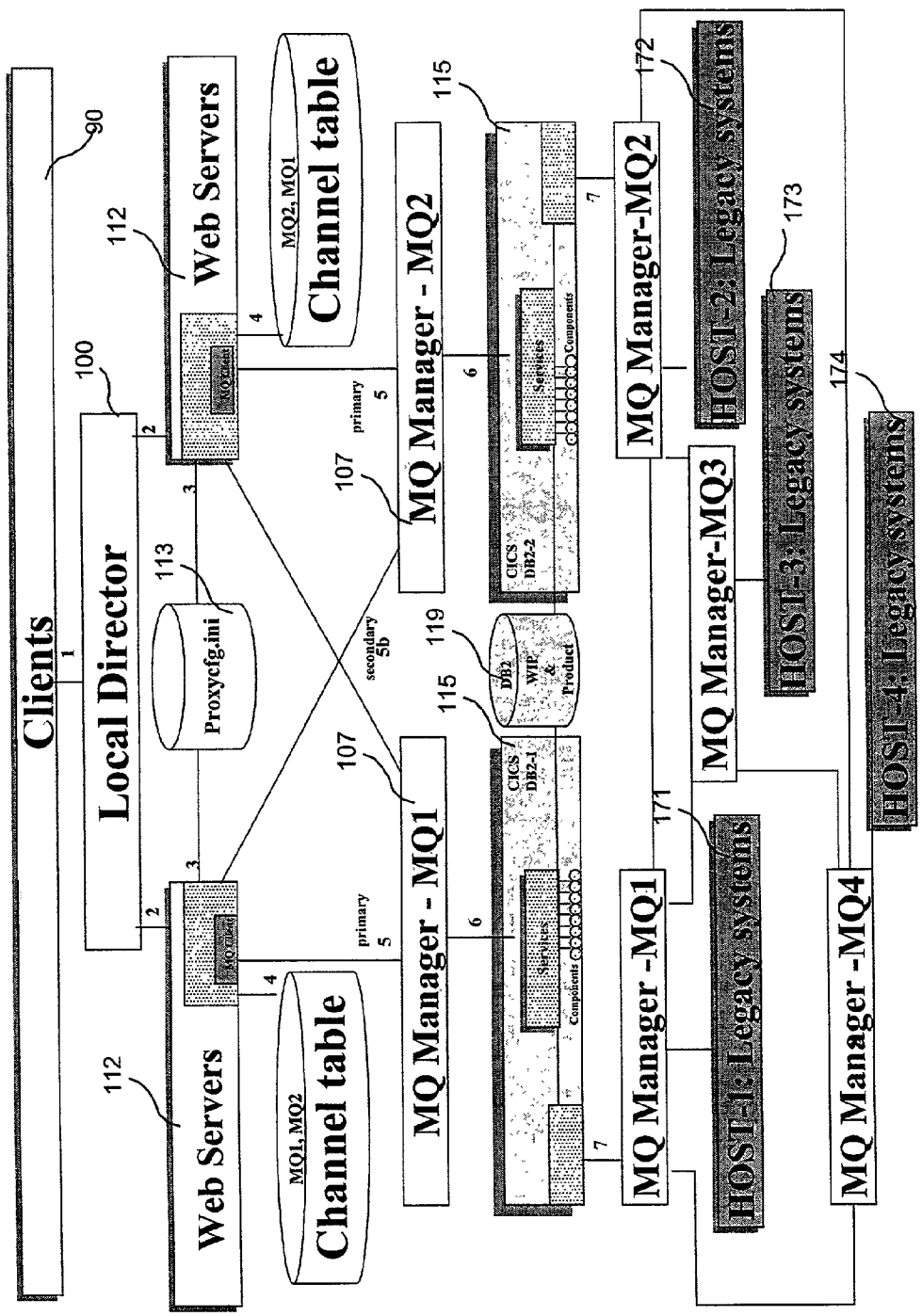
FIG. 1F depicts a particular redundancy architecture of FIG. 1E, in accordance with an embodiment of the present invention.
Figure 1G:
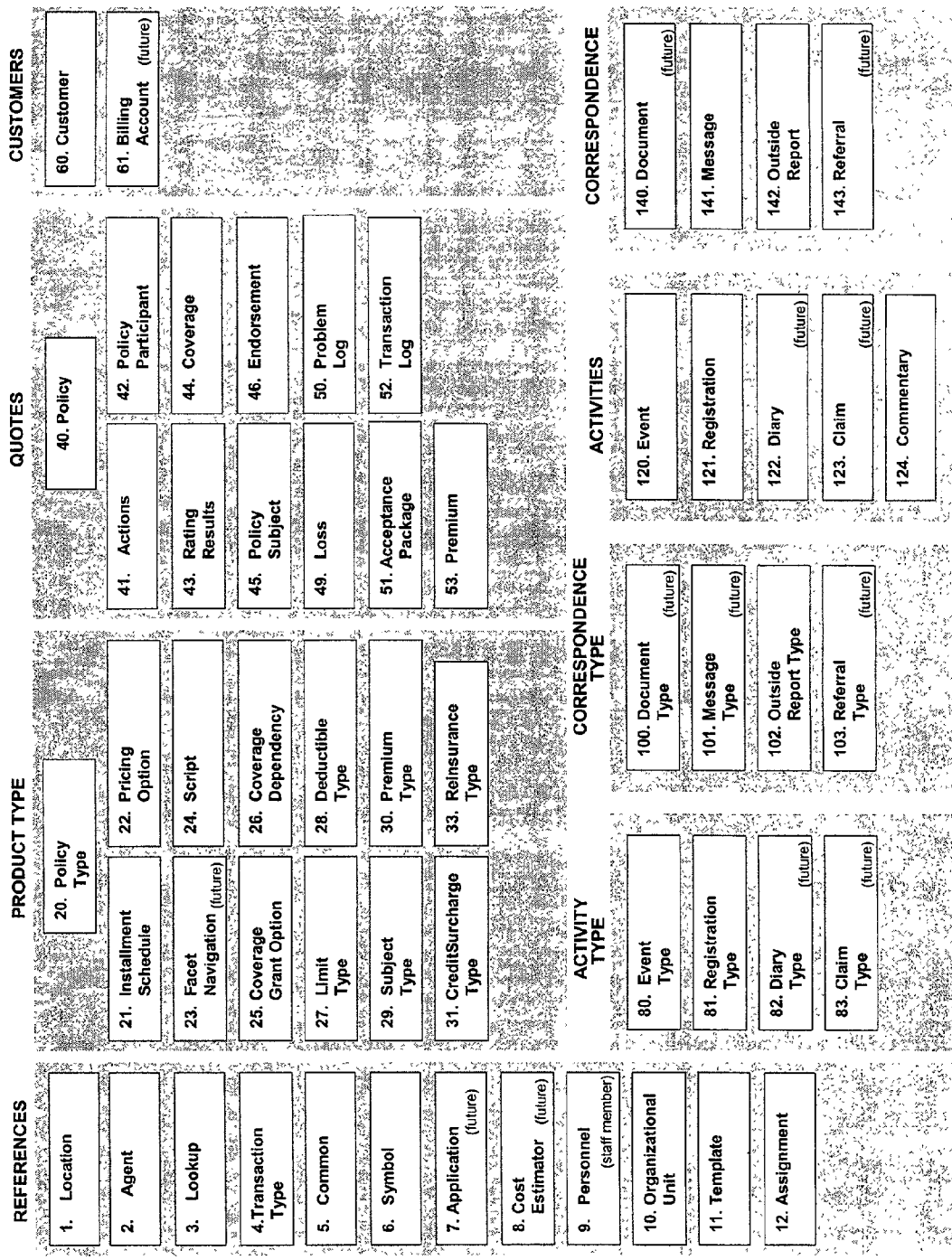
FIG. 1G depicts a components and services framework in accordance with an embodiment of the present invention.

FIG. 1F shows a particular redundancy architecture of FIG. 1E in accordance with an embodiment of the present invention, wherein like elements are labeled with like numbers. A user wishing to access the web-based GUI to the host insurance system must first access the web browser on his or her machine 90. The user's machine 90 then communicates to the load balancer or LocalDirector 100, which load balances user requests across multiple web servers sites 112. Which ever site 112 is selected to receive a user request from the LocalDirector 100 then accesses a proxycfg.ini file to determine the transmission type (i.e., MQ) and location (i.e., MQ name). Next, the selected web servers site 112 accesses a channel table to determine an MQ Manager 107, based on the determined transmission type and location, to communicate with the host insurance system. Both the channel table and the proxycfg.ini reside in each web servers site 112. The first entry in the channel table is designated the primary, and the second entry in the channel table is designated a secondary for fail over. The selected web server 112 then communicates to the host insurance system via MQ, which triggers a host transaction or service from the CICS/IMS 115. If the service requires information from another application, MQ is utilized as the communication interface. In this embodiment there are multiple legacy systems 171-174 which MQ can access via additional MQ managers.

Figure 2A:
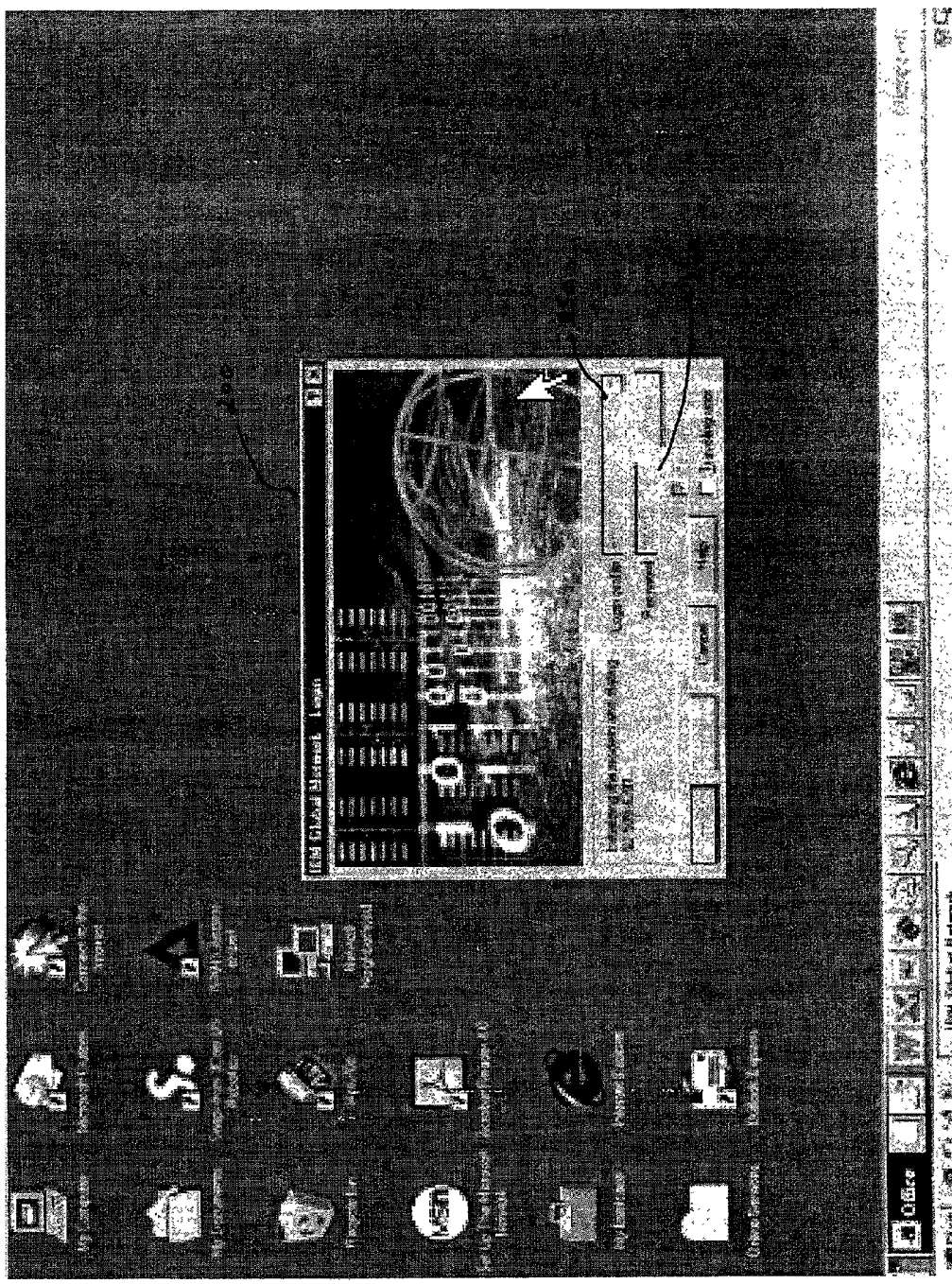
FIG. 2A depicts a user's desktop screen with a window opened for accessing a private network to gain entry to the GUI and insurance system, in accordance with an embodiment of the present invention.
Figure 2B:
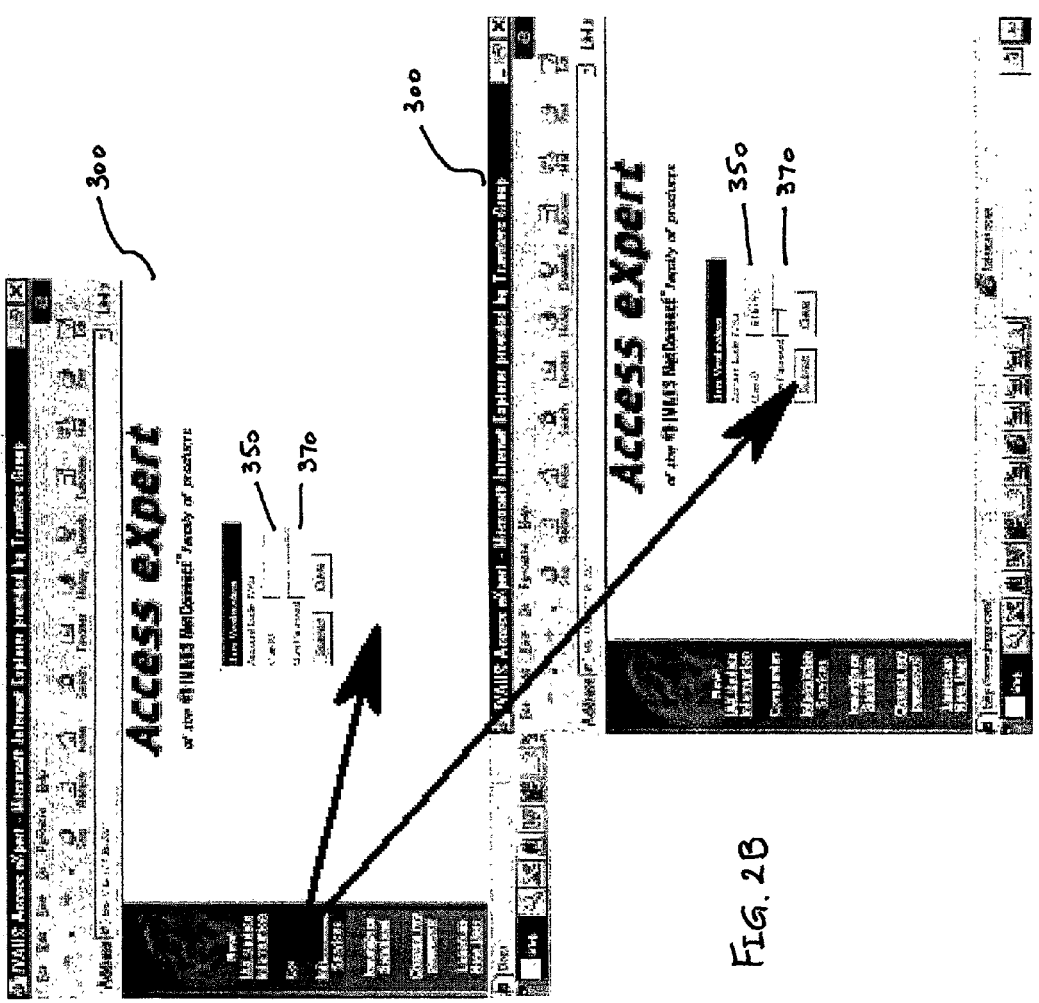
FIG. 2B depicts a screen for verifying the user login identification and password for the private network accessed by the screen in FIG. 2A, in accordance with an embodiment of the present invention.
Figure 2C:
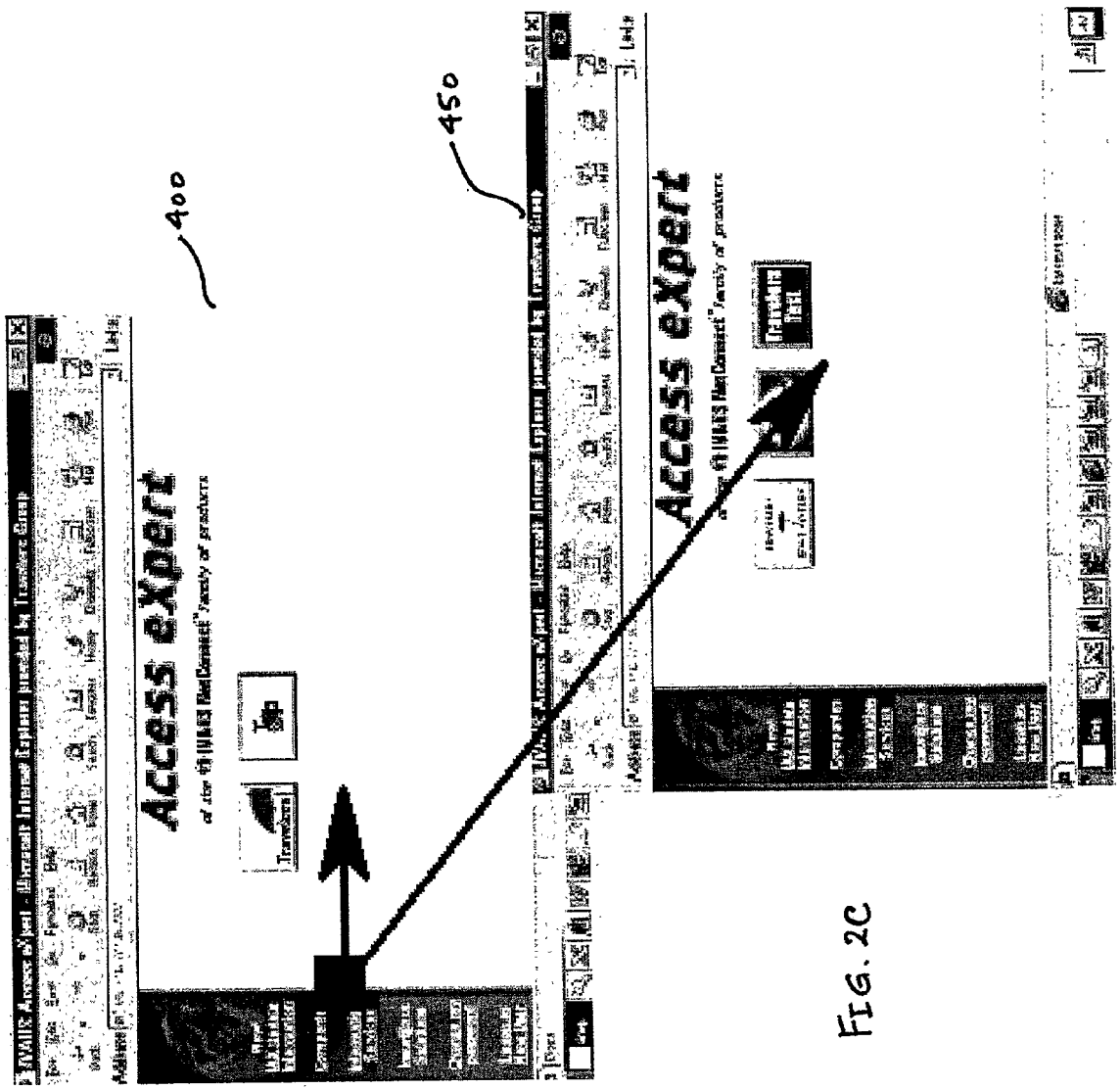
FIG. 2C depicts a screen for user selection of a web site for a desired insurance system after a successful logon to the private network, in accordance with an embodiment of the present invention.

Explanation is now made with regard to users accessing the insurance system with the web-based GUI of the present invention. FIG. 2A shows an access of the insurance system with the GUI via a private communication network such as IVAN, in accordance with an embodiment of the present invention. Here, the user must first access his or her private network account by opening up the logon screen 200 for such network. The "screen", referred throughout the present disclosure, displays any one of the web pages residing at the website of the web-based GUI. At the logon screen 200, the user must enter his or her login identification (ID) in the login profile box 250 and a password in the password box 270. Once the user is successfully connected to the private network, the user may also be required to validate the login ID and password again in the input fields 350 and 370 of screen 300, as shown in FIG. 2B. Once the user's ID and password are validated, the user is shown a screen 400, shown in FIG. 2C, where the user can choose to access a web site for an insurance system, such as that of Travelers Property Casualty Company, and its insurance applications in the next screen 450. A logon page for the insurance applications will then open up, such as screen 500 shown in FIG. 5, prompting the user to enter the logon ID and password for the insurance applications in the input field boxes 510 and 520. If the user is one of the Intranet users 106 (see FIG. 1A) of the insurance system, he or she will have an icon on his or her desktop which allows direct access to the logon screen of FIG. 5. Likewise, if the user is one of the Internet users 102 (see FIG. 1A), he or she may be provided an Internet address, such as a uniform resource locator (URL), to access a designated website with the screen shown in FIG. 5.

Figure 3A:
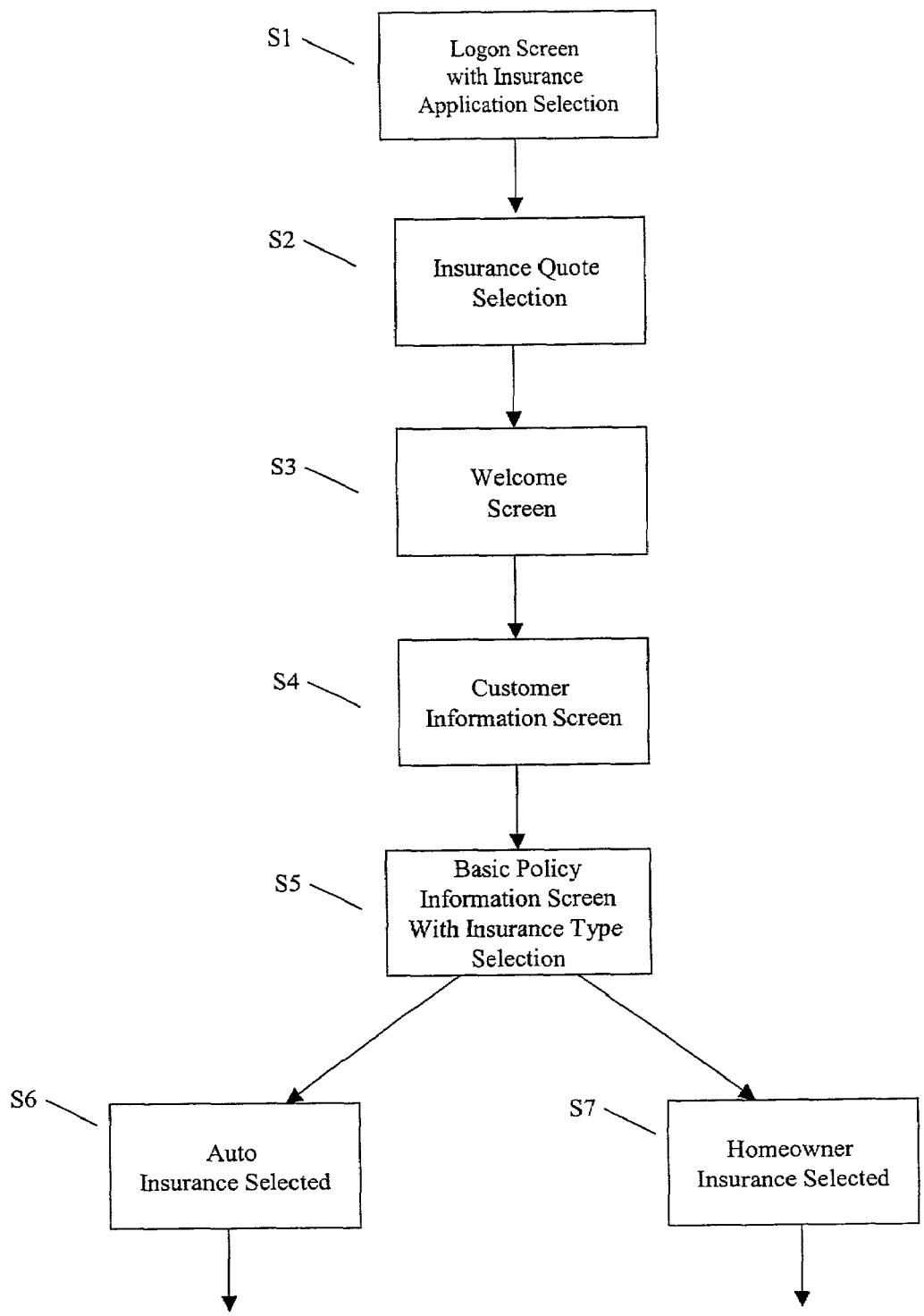
FIGS. 3A-C depict flowcharts for a process to issue an insurance quote, in accordance with an embodiment of the present invention.
Figure 3B:
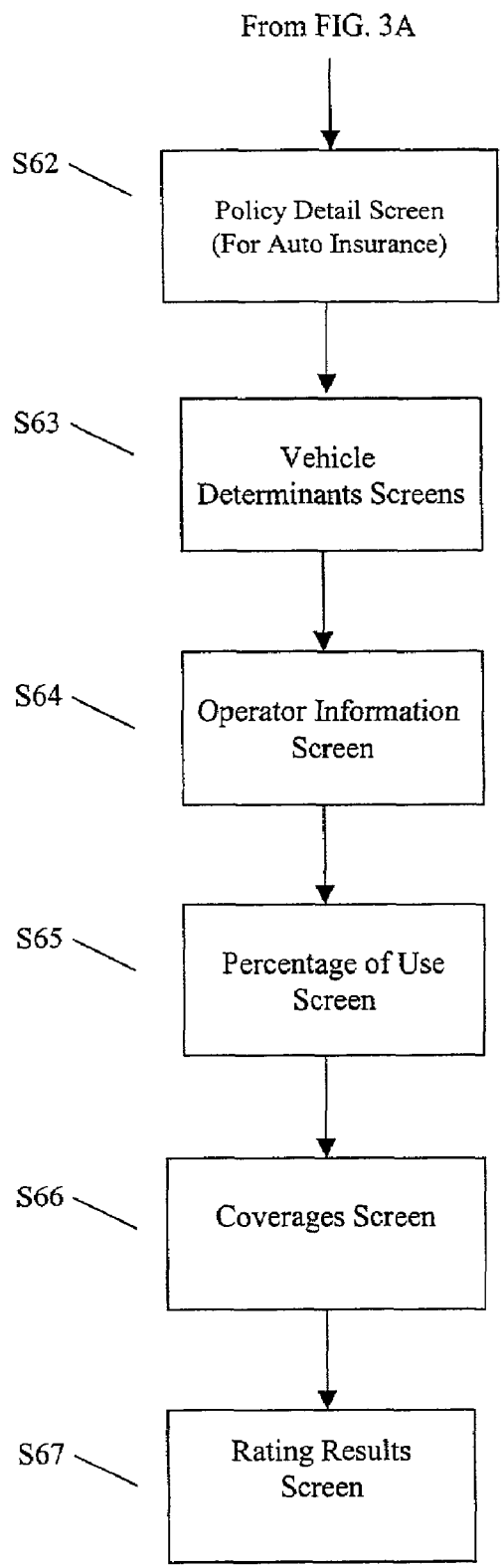
Figure 3C:
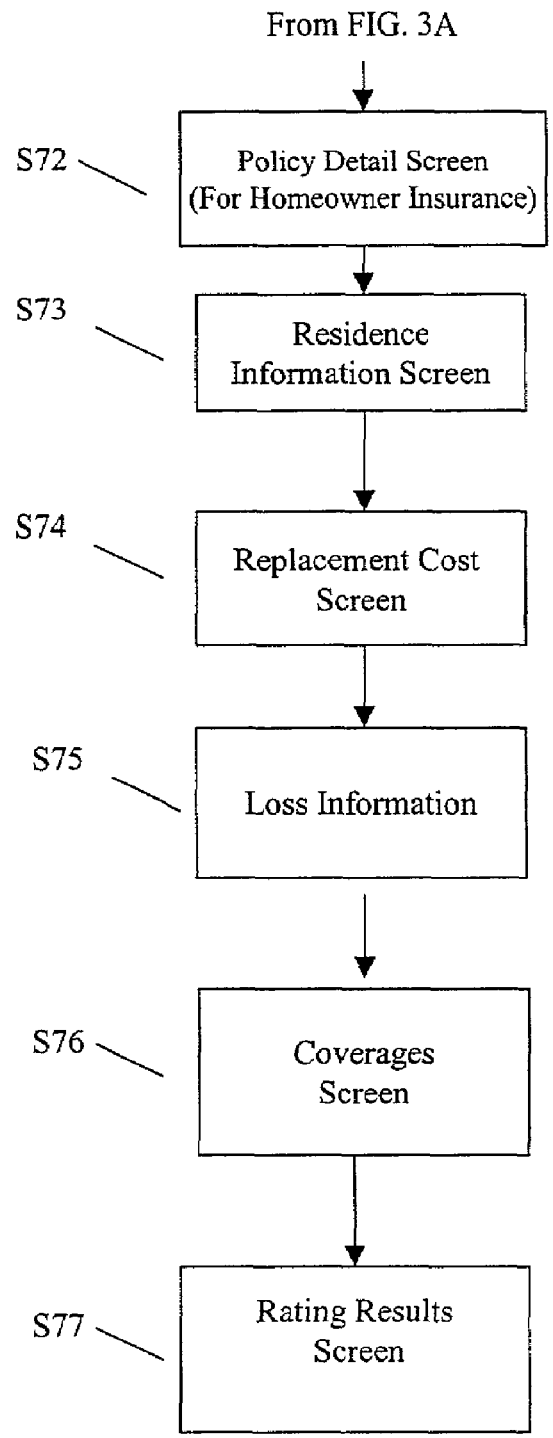
Figure 5:
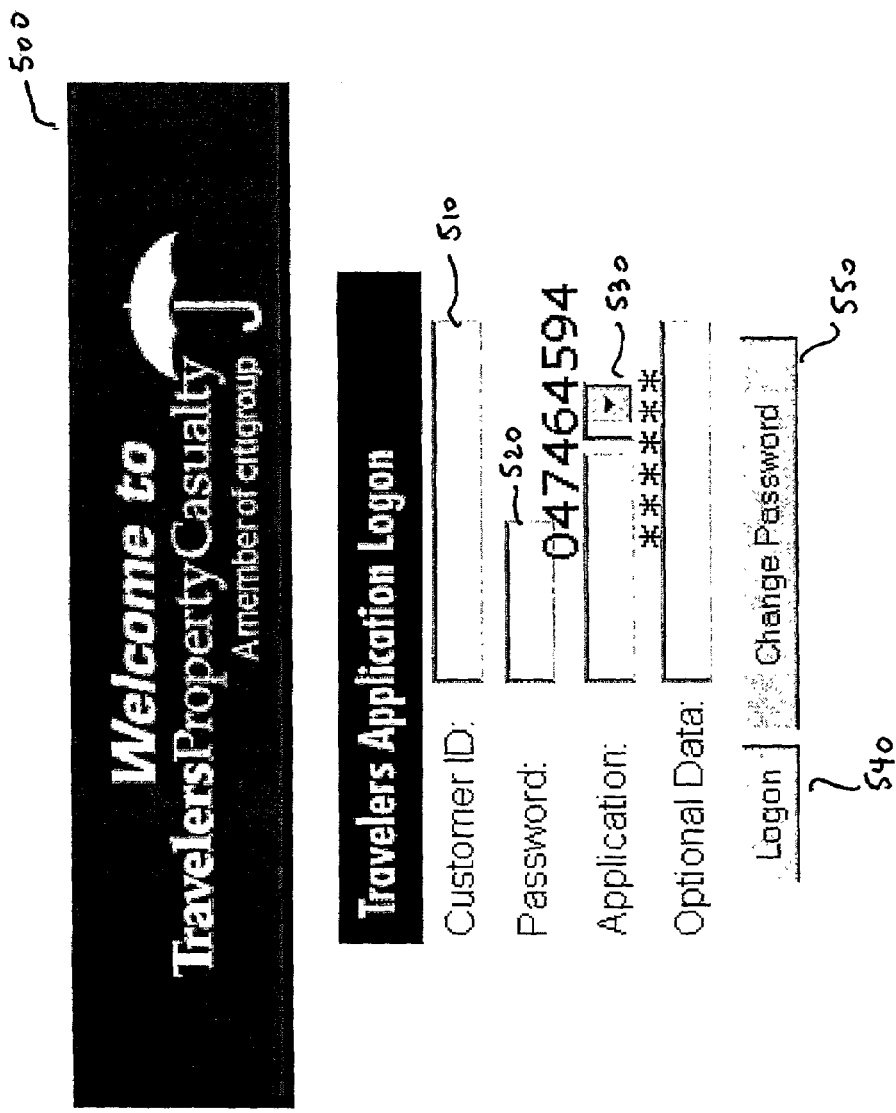
FIG. 5 depicts a logon screen for accessing insurance applications via a web-based GUI, in accordance with an embodiment of the present invention.
Figure 6A:
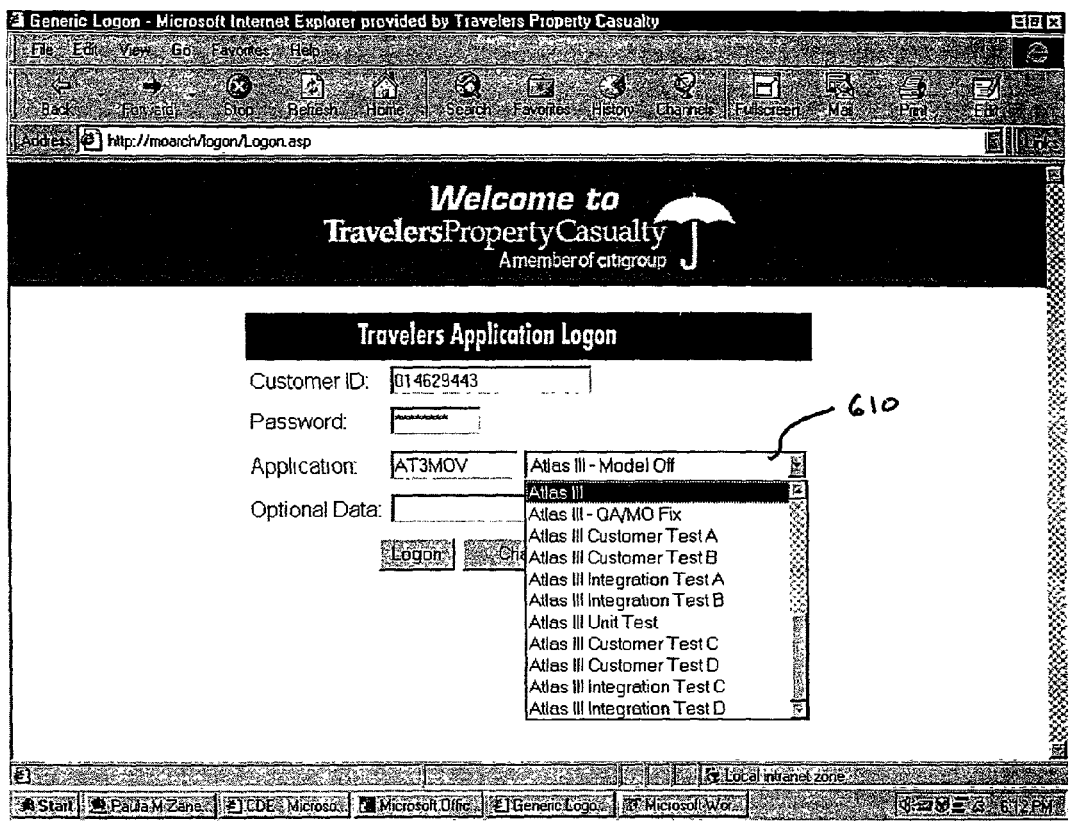
FIGS. 6A-B depict GUI logon screens for insurance applications, in accordance with an embodiment of the present invention.
Figure 6B:
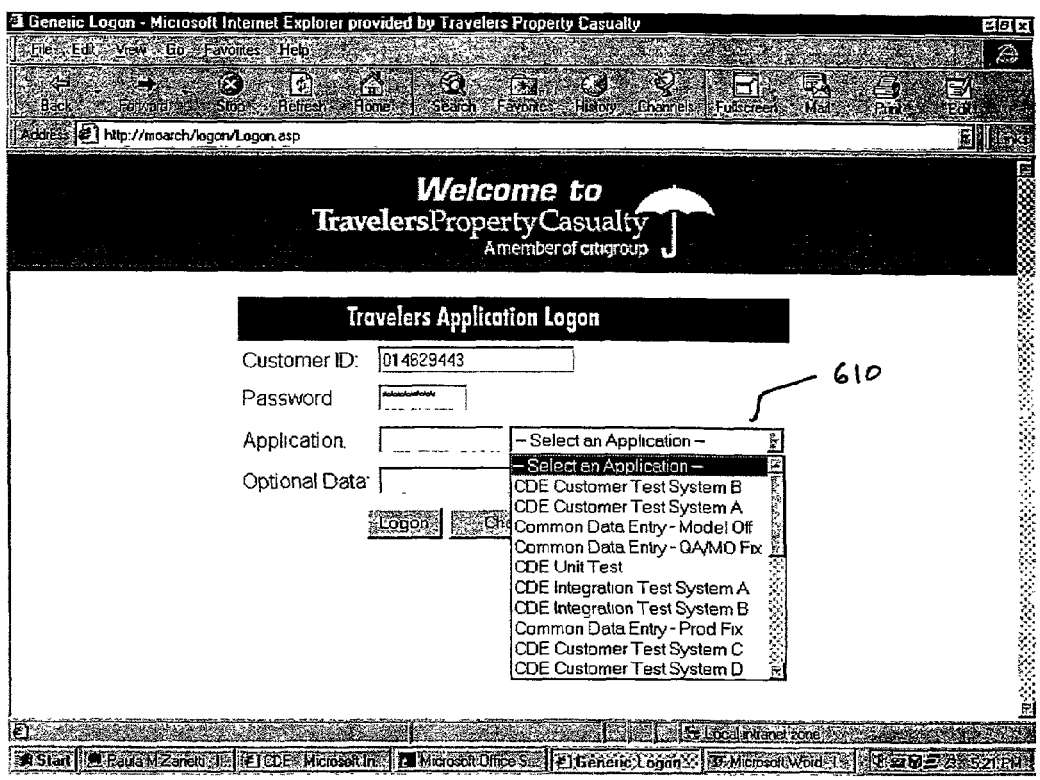

The rest of the process for accessing the insurance system via the web-based GUI of the present invention is now explained with reference to the flowcharts shown in FIGS. 3A-C. FIG. 5 shows entries of "047464594" and a six-character string denoted by six asterisks as examples for a customer ID and password. The user is also prompted to enter the desired application in the input field box 530. This is shown as S1 in FIG. 3A. Once appropriate information has been entered into boxes 510, 520, and 530, the user has the option to access the insurance applications by clicking on the Logon button 540 or to change the password by clicking on the Change Password button 550. If the user chooses the latter, he or she will then have the opportunity to change the password and to subsequently logon to access the insurance applications. If the user clicks on the Logon button 540 without entering anything into the input field box 530 or with the wrong information in the box, the GUI will return an Application pop up box to prompt the user for a correct entry. FIGS. 6A-B show an example of the pop up box 610 labeled "SELECT AN APPLICATION". The user can then select one of the listed applications by clicking on the down arrow, highlighting and clicking on the desired application. Upon the user's selection, the GUI will take the user into the appropriate application. According to an embodiment of the present invention, the user can access a process for issuing insurance quotes by highlighting the name "Atlas III" from the listed applications in the pop up box 610 as shown in FIG. 6A. This is shown as S2 in FIG. 3A.

Figure 7:
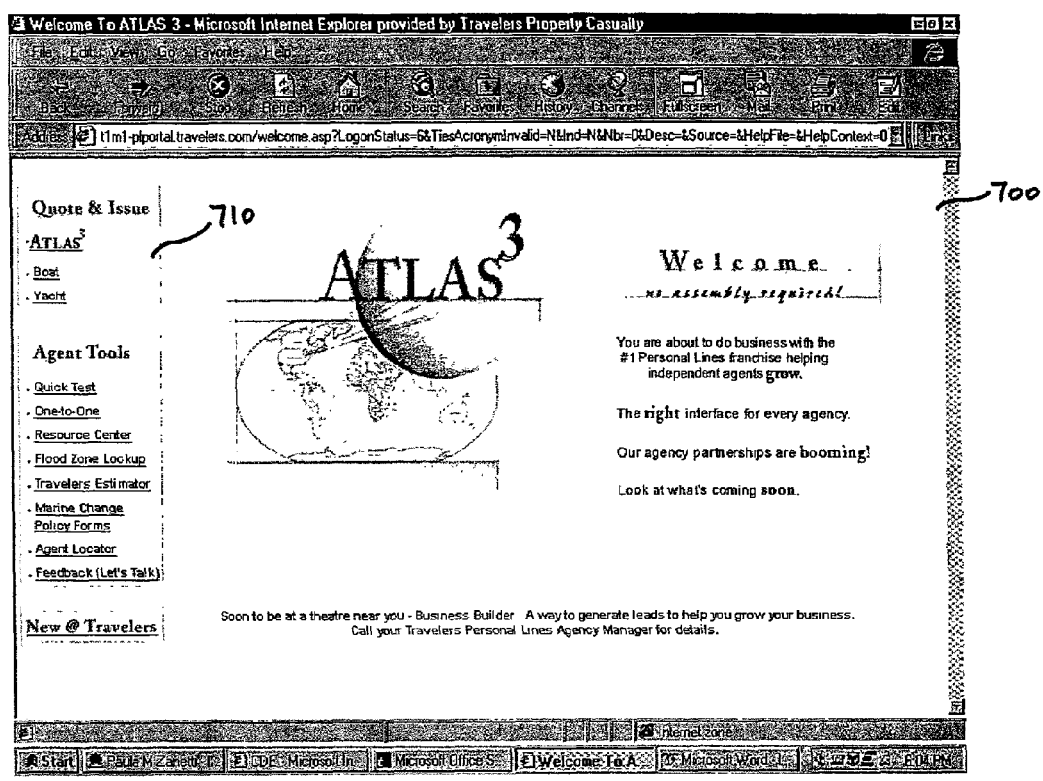
FIG. 7 depicts a GUI Welcome screen for an insurance quote process, in accordance with an embodiment of the present invention.

Once the user has successfully logged into a desired insurance application, such as the insurance quote, he or she is greeted with a Welcome screen, such as the screen 107 shown in FIG. 7 for the "Atlas III" insurance quote application. This is shown as S3 in FIG. 3A. The Welcome screen 700 includes hyperlinks in the left column 710 of the page as a quick navigation feature. As is understood by one skilled in the art, a hyperlink comprises a graphic or text that, when clicked, allows the user to open another page in the web browser window. Here, any item that is underlined acts as a hyperlink. However, an item can be identified as a hyperlink by any other method that distinguishes the look of the item from other plain text or graphical items in the screen 700. The hyperlinks represent the various insurance applications that a user can access using the web-based GUI. They are also used in different parts of the quote process to access and/or modify information previously entered. This saves the user from having to go backward page by page. According to an embodiment of the present invention, the user can access quotes for personal-lines insurance by clicking on the ATLAS$^3$ hyperlink in the Quote & Issue section of the left column 710, which will then display a customer information page such as the screen 800 shown in FIG. 8A.

Figure 9:
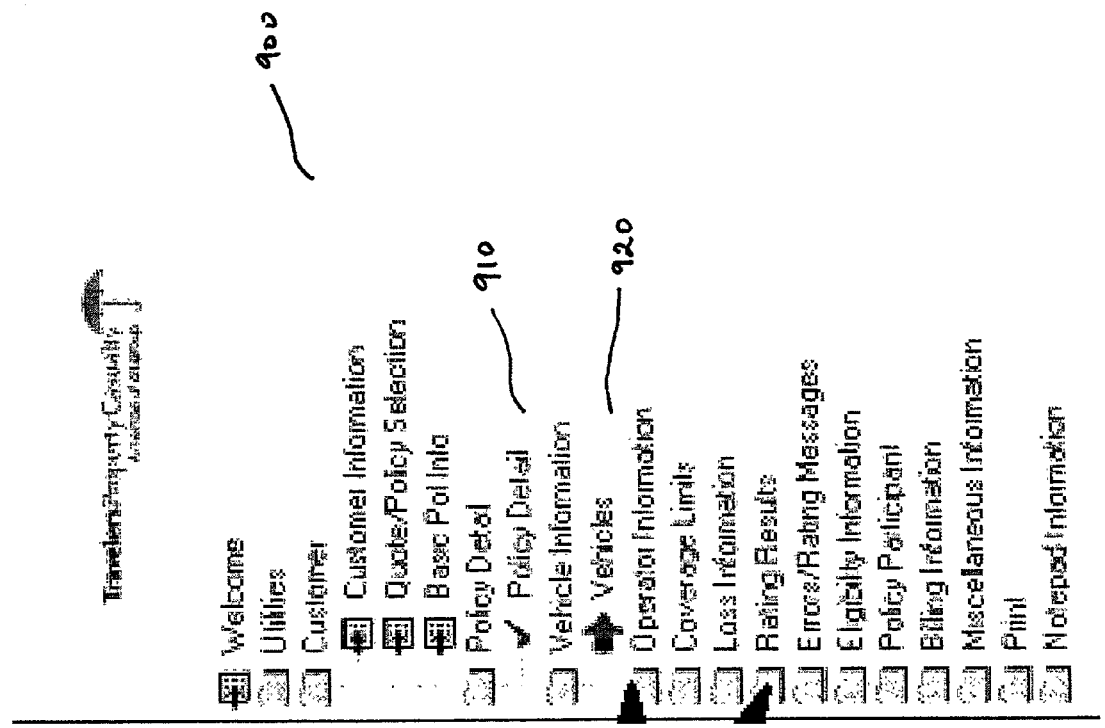
FIG. 9 depicts a navigation tree employed by the GUI, in accordance with an embodiment of the present invention.

According to one embodiment of the present invention, the layouts of the GUI screens for the hyperlink pages are the same throughout. Each screen includes a navigation tree 810, a navigation bar 820, and an action area 830. The navigation tree 810 is provided to help users move through the insurance quote and issue process. Its function is similar to that of a file cabinet, with the main category indicated by a specially marked folder icon; for example, a folder icon with a different color from the rest of the other folders in the navigation tree. Any folder can be activated by the user double clicking on it. Within each folder are additional icons that are "subcategories". Once the user opens a primary folder by double clicking on it, at least one secondary or subordinate folder is displayed. The secondary folders can be activated by a single click. The navigation tree 810 also provides users with the ability to see at a glance their position in the quote and issue process. FIG. 9 shows a navigation tree 900 of the present invention, wherein a special mark such as an arrow 920 indicates where a user is in the workflow, while another special mark such as a check mark 910 identifies which screens the user has completed.

Figure 8A:
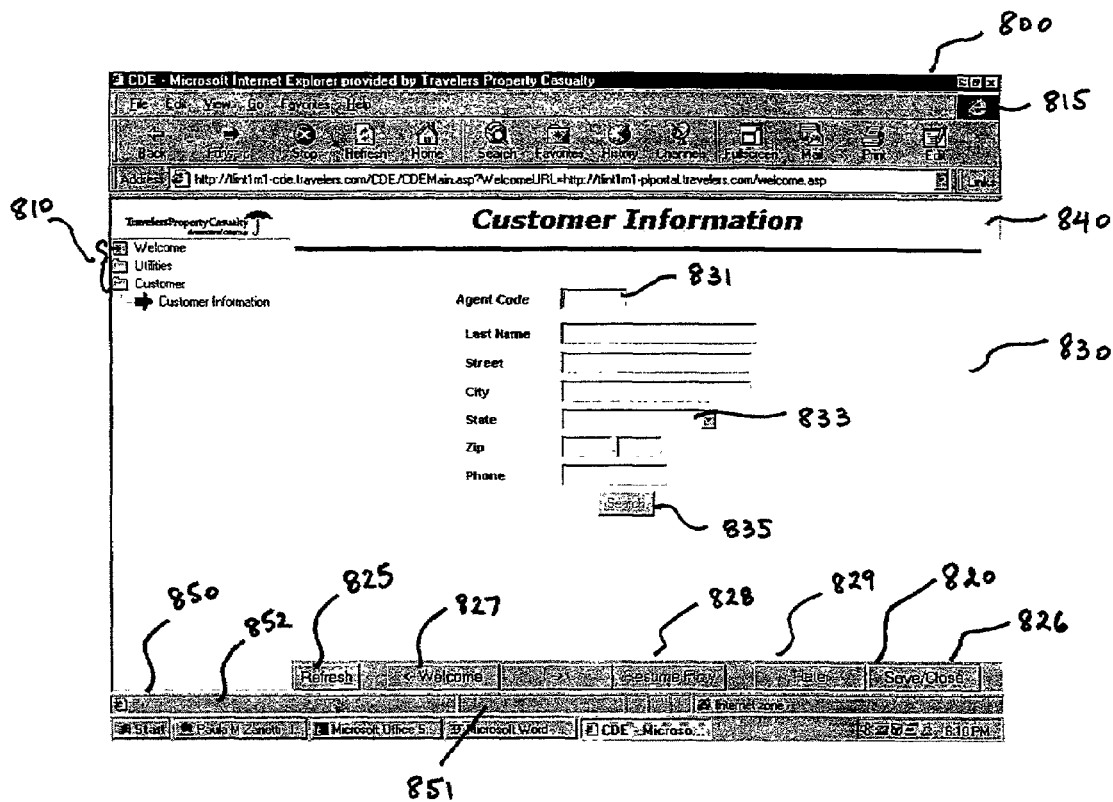

Referring back to FIG. 8A, the navigation bar 820 provides additional features to help users work their ways through the various insurance applications offered by the insurance system via the web-based GUI. For instance, the navigation buttons, such as the refresh button 825, on the navigation bar 820 will change dynamically as the users move through the quote or issue workflow. The navigation buttons help users to see what is next in the logical flow of the GUI screens. They also provide users with the means to go back to a previous screen, by clicking on a navigation button with at least the symbol "←", should they desire to do so for viewing and/or modification purposes. The available navigation buttons on the navigation bar 820 will be determined by whether the users have selected quote or issue. As indicated earlier, FIG. 8A shows the Customer Information screen, which is the first screen of the insurance quote process. Thus, based on where a user is in the quote process, the buttons may be enabled (available for use) or disabled (not available). This reduces the potential for errors. According to one embodiment of the present invention, the enabled buttons are graphically different from the disabled buttons. For instance, as shown in FIG. 8A, the enabled buttons have text that is distinguishable from text of the disabled buttons. The buttons are labeled to help users understand the exact functions they perform. For instance, the Search button 835 in the action area 830 searches for an existing customer; the Refresh button 825 in the navigation bar 820 erases information entered on the current screen or page; the Welcome button 827 returns the user to the Welcome screen 700 shown in FIG. 7; the Resume Flow button 828 in the navigation bar 820 allows re-entry to the quote process; the Rate button 829 in the navigation bar 820 is enabled or disabled depending on the position in the quote flow; and Save/Close button 826 saves information and returns to the Welcome screen 700 shown in FIG. 7.

Another aspect of the web-based GUI of the present invention is the use of "hot keys", which is actually a keyboard translation of a mouse click. On any button with an underlined letter, the user can press the Alt key on the keyboard and the underlined letter at the same time to imitate the particular command of the button. For example, on the Customer Information screen 800, the Alt and S key combination initiates the Search function as if the user has clicked on the Search button 835.

In addition, the web-based GUI employs certain symbols on its screens to help users know if a transaction is being processed. For instance, the e-globe icon 815 found in the top right corner of each GUI screen or page spins when the user's transaction is processing. The Progress Bar 851, which is located in the status bar 850 will slowly fill in a color from left to right when a new screen or page is being loaded. When the Progress Bar 851 is completely filled in with the particular color, a new page will display with its Progress Bar 851 becoming unfilled again. As for the text located at the left most bar 852 of the status bar 850, it indicates what the web-based GUI and insurance system are attempting to do.

Figure 8B:
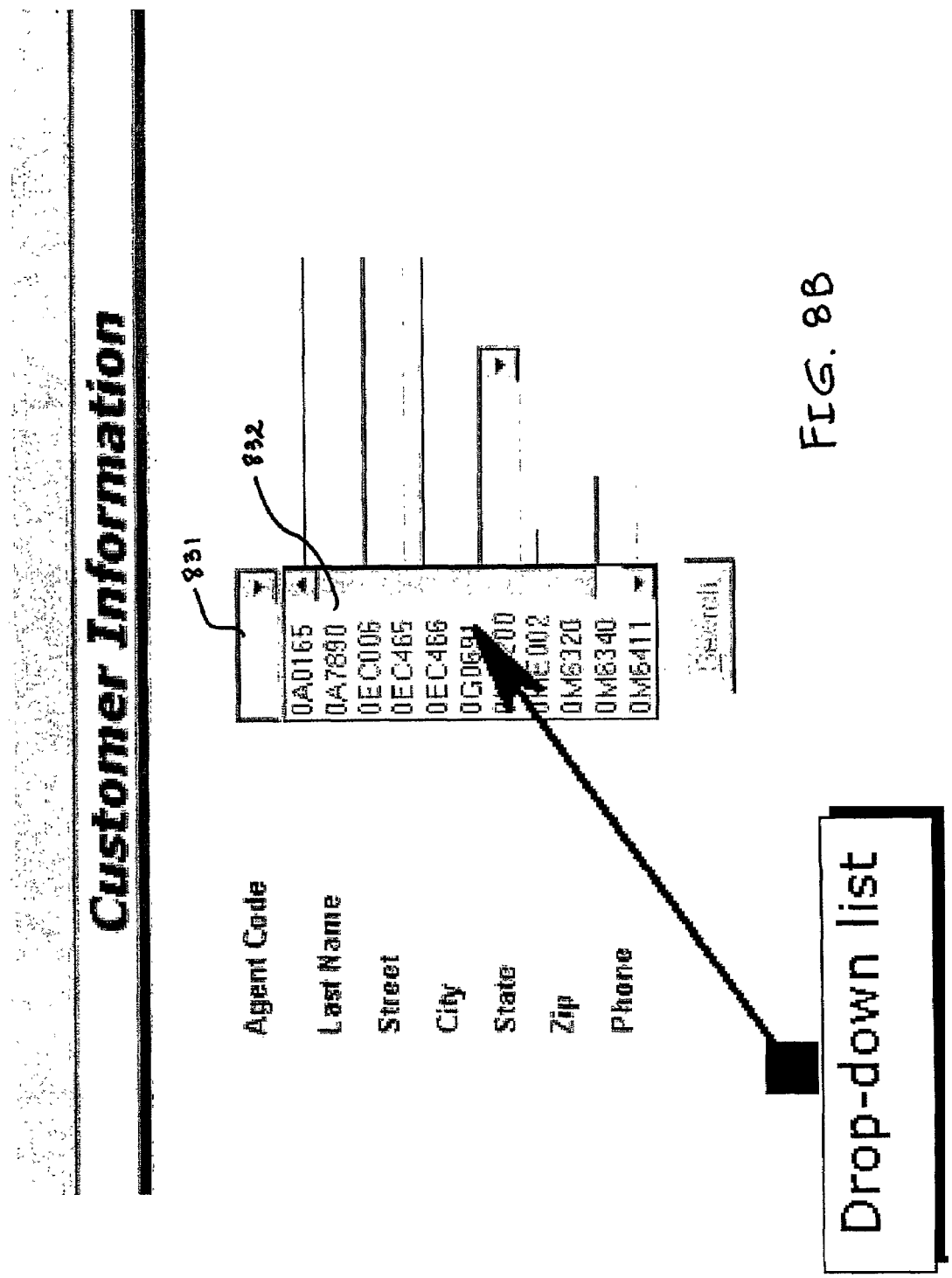

As indicated earlier, the center of the screen is the action area 830 or work space. This is where the user can enter information for a desired insurance quote or policy, with different information asked on each GUI screen or page. Above the active area 830 is the title area 840 of the page or screen. Each page has a unique title which is always found in the title area 840. To initiate a quote, the user who is an insurance agent inputs information on a customer into the Customer Information screen 800 shown in FIG. 8A. According to one embodiment of the present invention, the Agent Code field 831 may be pre-filled for the user. However, if the user has more than one agent code, the Agent Code field will present a drop down list 832, as shown in FIG. 8B. The user can use the down arrow on the right edge of the Agent Code field 831 to activate the drop down list 832 and highlight to select the desired agent code from the list.

Alternative to using a down arrow to access a drop down list in an input field, a user can quick pick an entry by typing in the first letter of the item the user needs to select. FIG. 8C shows the Customer Information screen 800 of FIG. 8A with a drop down list 834 for the State field 833. As seen, Connecticut ranks third from the first state, California, that starts with the alphabet letter C. Thus, for example, if the user selects Connecticut from the list of states in the Customer Information screen 800 of FIG. 8A, the user can click on the State field 833, the user can press the letter C on the keyboard three times to have Connecticut as the entry for the State field 833.

Referring back to the insurance quote process, starting with the initial Customer Information screen 800 of FIG. 8A, the user inputs customer information into the input fields of the action area 830 in the manner explained above. This is shown as S4 in FIG. 3A. Once the customer information has been entered, the user can then click the Search button 835 to search a customer database of the insurance system for a record of the customer, based on the input customer information, to determine whether the customer is a new or existing customer of the insurance system. After the search is done, additional elements will appear in screen 800. In other words, based on the actions taken in screen 800, the initial GUI web page shown in the screen will be dynamically modified to accommodate any additional elements. Specifically, a matching customer list resulting from the customer search, such as the customer list box 860 shown in FIG. 8D, will appear on the screen. If the search results in a hit on one or more existing customers, their names will be listed in the customer list box 860, and the user can pick a name from the customer hits that matches with the present customer, accesses the customer information from the customer record in the database, and continue the insurance quote process. The next screen to display would be a "Quote/Policy Selection" screen, which follows the "Customer Information" screen 800 (after S4 in FIG. 3a) and is only displayed when the customer is an existing customer or an existing customer with an outstanding quote. At the "Quote/Policy Selection" screen, the user has the option to modify the outstanding quote, begin a new quote, or issue a new insurance policy for the customer. For beginning a new quote, the user is shown the next screen in FIG. 10A and continues from there. For modifying an outstanding quote, the user is also shown the next screen in FIG. 10A and continues from there; however, the screen in FIG. 10A and subsequent screens in the insurance quote process would have input fields pre-filled, but changeable, to the extent of the information already embedded in the outstanding quote. For issuing a new insurance policy, the user is shown a next screen in FIG. 15 and continues from there, with input fields pre-filled, but changeable, to the extent of any outstanding quote for the insurance policy to be issued that the customer may already have in the host insurance system.

Figure 8D:
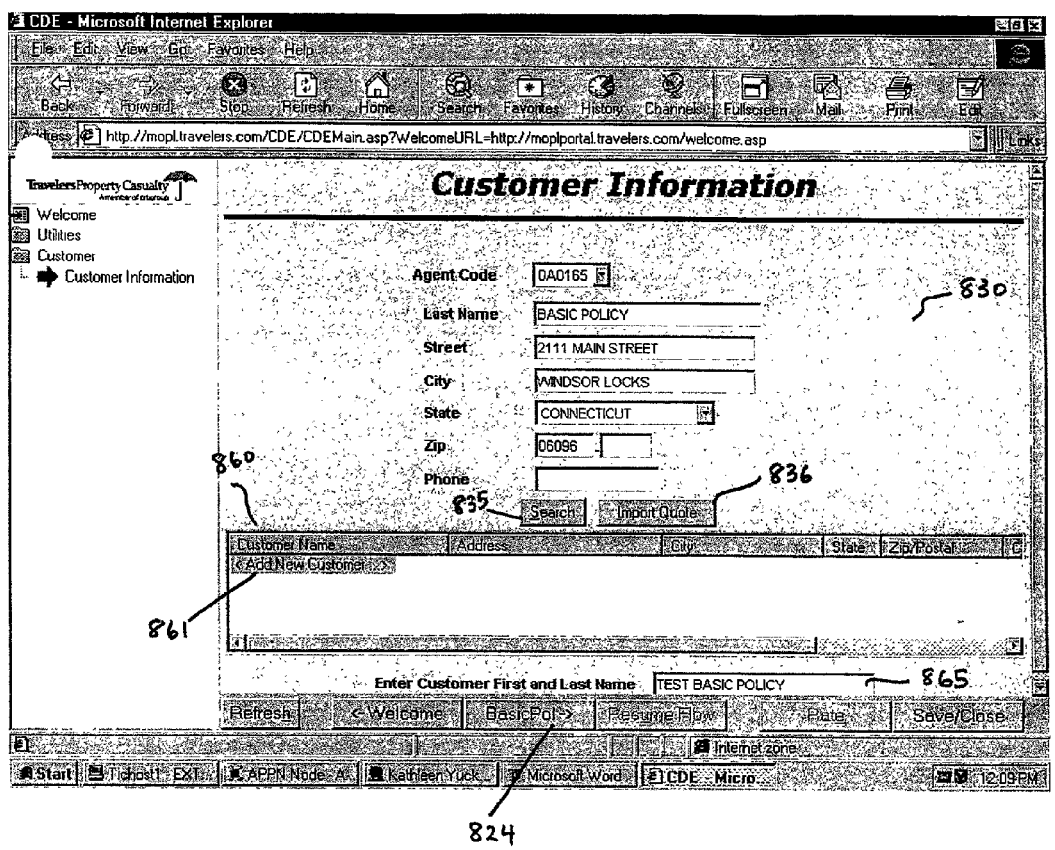

Referring back to FIG. 8D, if the user deems that none of the listed customers matches the present customer, the user has the option to add a record of the present customer into the customer database of the insurance system. On the other hand, if the search result comes up empty, an Import Quote button 836 will appear in the action area 830 along with the customer list box 860, as shown in FIG. 8D. However, no name will be listed in the customer list box 860, except for a prompt 861 to add a new customer. To add a new customer, the user is prompted to enter both the first and last name of the new customer in field 865. According to one embodiment of the present invention, if the user/insurance agent has already entered and saved other pertinent customer information relating to the insurance quote in progress on the user's machine or information database, the user has the option to import such information from the user's database into the database of the insurance system by clicking on the Import Quote button 836. Otherwise, the user will be prompted to enter in such information throughout the insurance quote process.

Figure 10A:
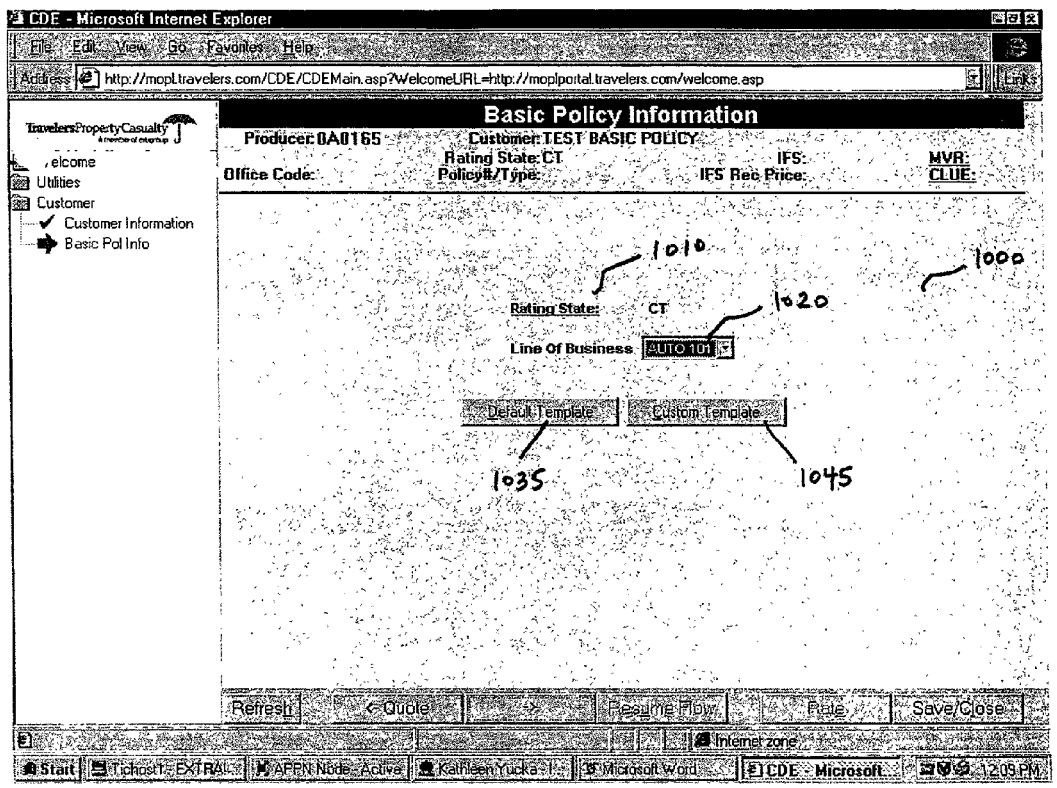

To continue the insurance quote process, the user can click on the BasicPol→navigation button 824. FIG. 10A shows the next screen 1000, which is entitled "Basic Policy Information". This is shown as S5 in FIG. 3A. The screen 1000 presents the user with the option to input additional information relating to the quote process. For instance, the user can choose the type of insurance that the user wishes to generate a quote in the line of business field 1020 and the jurisdiction or state for rating such quote in the field 1010. As shown in FIG. 10A, auto insurance is chosen for a quote. This is shown as S6 in FIG. 3A. FIG. 10A also shows that the rating state is set to "CT" or Connecticut. This is because the address of the present customer is in Connecticut, the insurance system automatically assumes that the user wishes to get an auto insurance quote in the same state. However, if the user wishes to change the rating state, he or she can do so by clicking on the RatingState hyperlink at field 1010.

Figure 10B:
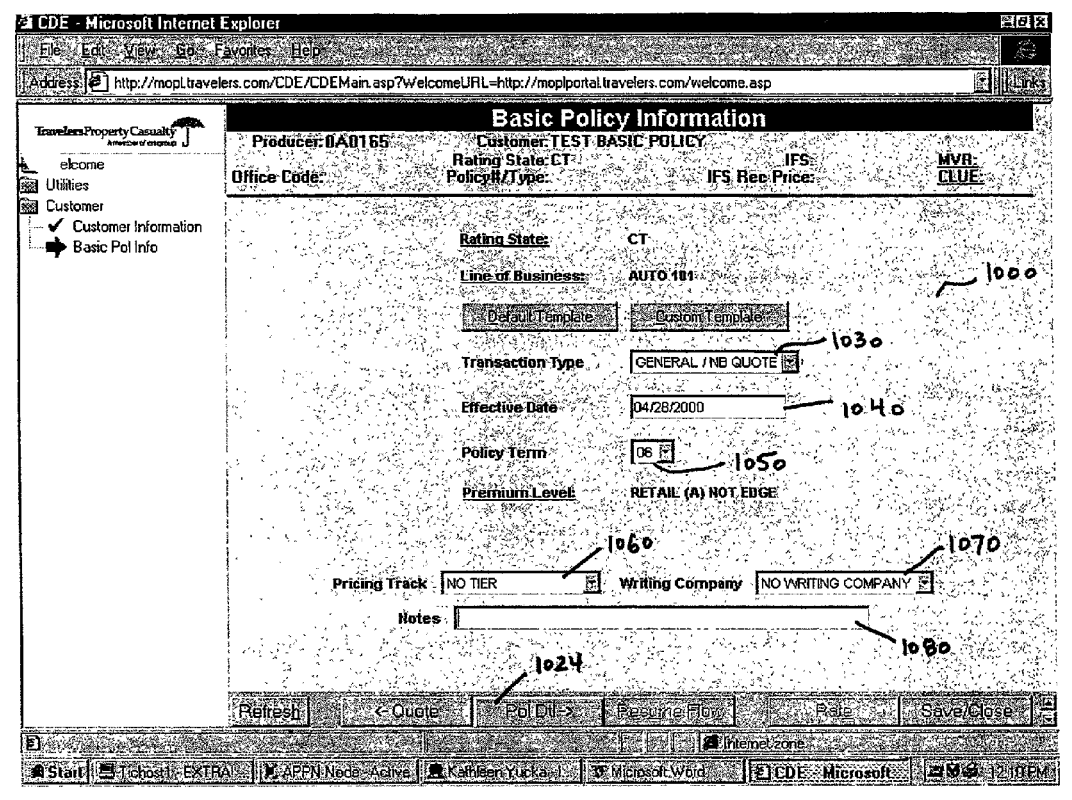

Whatever line of business is chosen for an insurance quote in field 1020, additional screen elements, including input fields 1030, 1040, and 1050, corresponding to the chosen line of business will appear on screen 1000 of FIG. 10A. For instance, when "AUTO 101" is chosen for field 1020, additional screen elements relating to AUTO 101 appear as shown in FIG. 10B when the user clicks on the Default Template button 1035. The additional screen elements provide prefill policy information based on market characteristics; thus, reducing the number of data items to be entered by the user to complete a quote. The user can also click on the Custom Template button 1045 to display additional screen elements that have been customized by either the user or the host insurance system. According to one embodiment of the present invention, the screens or pages throughout the insurance quote process may be pre-filled with information that the user has already entered or imported from his or her database (as mentioned earlier). For instance, on certain screens the user can see the pre-filling being performed as the screen begins to appear. The screen will "flash" when the pre-filling information appears in the input fields, and the flashing will stop when the screen is completely built, wherein the user can then add or modify information on the screen. The pre-fill feature helps to streamline the amount of user keystrokes required. Because the web-based GUI of the present invention is designed to only fill the screens with specific information required for each quote or policy, the user will only see the relevant fields in the quote or policy. An example of the pre-fill feature is seen in FIG. 10B in the Transaction Type field 1030, Effective Date field 1040, Policy Term field 1050, Pricing Track field 1060, and Writing Company 1070. In this instance, the Transaction Type field is pre-filled to General/NB Quote because an insurance quote process is being performed, where NB denotes New Business; the Effective Date may be pre-filled or preset to the date on which the insurance quote is performed; the Policy Term field 1050 is set to six (06) months because that is the usual policy term for an auto insurance quote; the Pricing Track field 1060 is set to "NO TIER" because there is not enough information for the system to self determine the tier at this point in the insurance quote process. Here, the tier indicates the value of the customer for a particular insurance quote or policy. For instance, a bad driver would have a different tier number from a good driver when applying as a customer for an auto insurance quote or policy. The Writing Company 1070 is set to "NO WRITING COMPANY" also because there is not enough information for the system to self determine the WRITING COMPANY at this point in the insurance quote process. In screen 1000, the user has the option to enter notes for the quote in Notes field 1080.

Figure 11A:
Figure 11B:
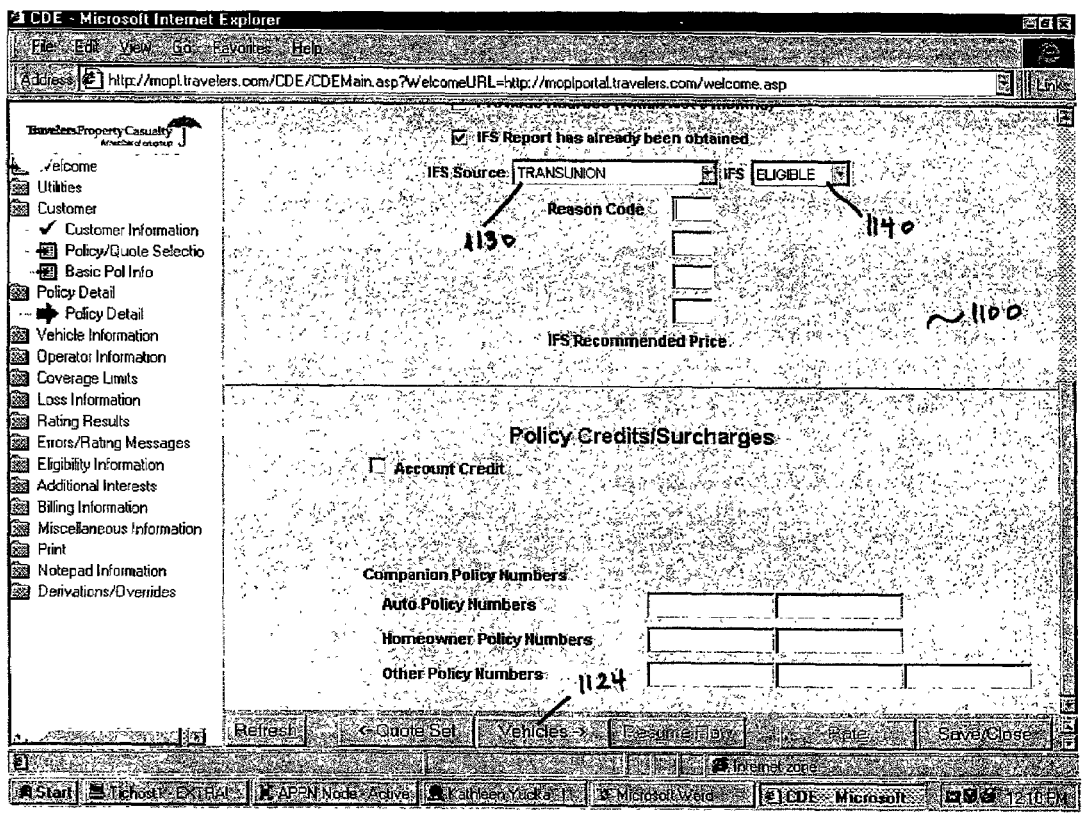

To continue onto the next screen for the insurance quote process, the user can click on the Pol Dtl→ navigation button 1024. The resulting screen is the "Policy Detail" screen 1100, which is shown in FIGS. 11A-B, with FIG. 11A showing the top half of the screen 1100 and FIG. 11B showing the bottom half of the screen 1100 when it is scrolled down. This is shown as S62 in FIG. 3B. The screen 1100 presents the user with detailed customer information and detailed customer information and information about any other companion insurance policies. Again, some of the input fields are pre-filled with information that the user has already entered or imported from his or her database. For instance, the customer's name and address are pre-filled with data from FIG. 8D. Furthermore, if an Individual Financial Score (IFS) Report (i.e., credit history) information of the customer has been imported from the user's database or the database of the insurance system, then the input field 1120 is automatically checked and the input fields 1130 and 1140 are pre-filled with the source of the IFS Report and where the customer is eligible for the type of insurance being quoted based on the IFS Report. The user then has the option to enter data into any other input fields in screen 1100 that have not been pre-filled.

Figure 4A:
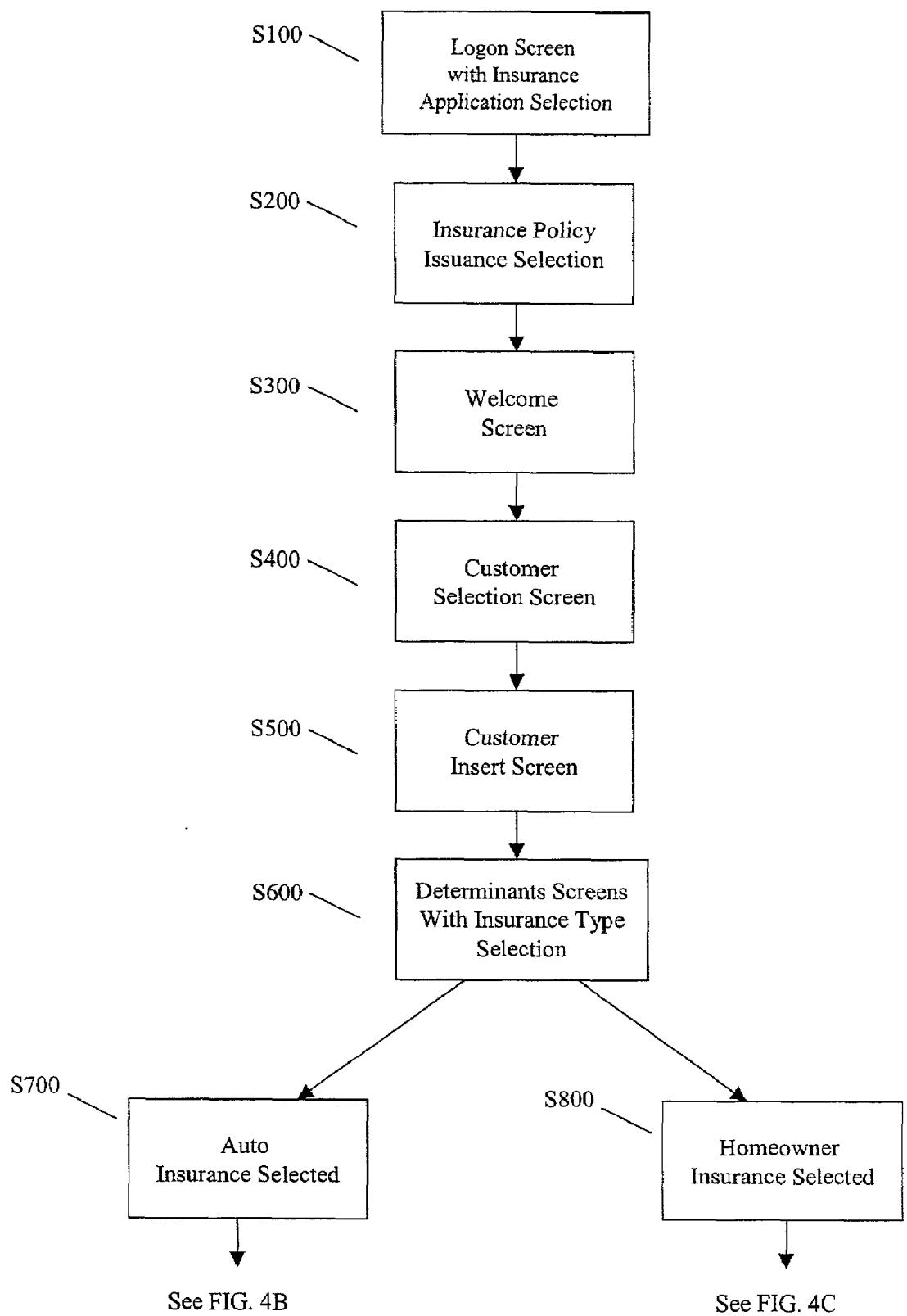
FIGS. 4A-C depict flowcharts for a process to issue an insurance policy, in accordance with an embodiment of the present invention.
Figure 4B:
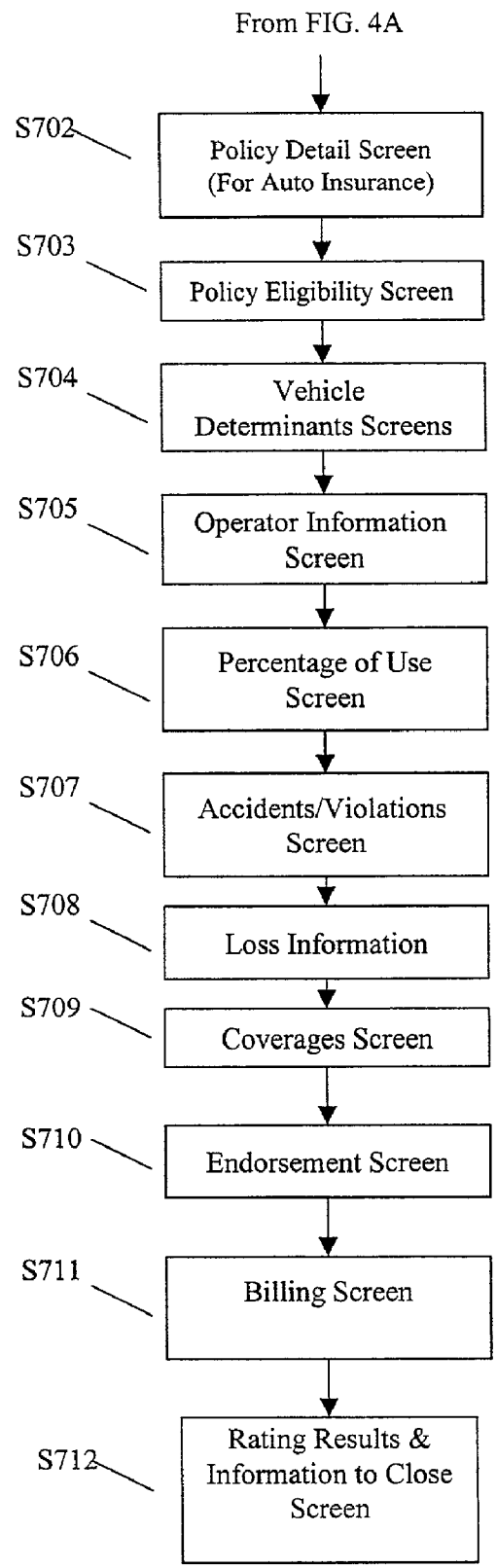

To continue the auto insurance quote process, the user can click on the Vehicles→navigation button 1124 to move to the next screen where information for the vehicle to be insured can be viewed and entered. The continuance of the auto insurance quote process are shown in S63-S67 of FIG. 3B and will be explained later with respect to FIGS. 21-25 and 27 and S704-S709 and S712 of FIG. 4B. It should be noted that billing information and endorsement, as shown in S710 and S711 of FIG. 4B, are not considered in an auto insurance quote; thus, billing is not shown in FIG. 3B.

Figure 4C:
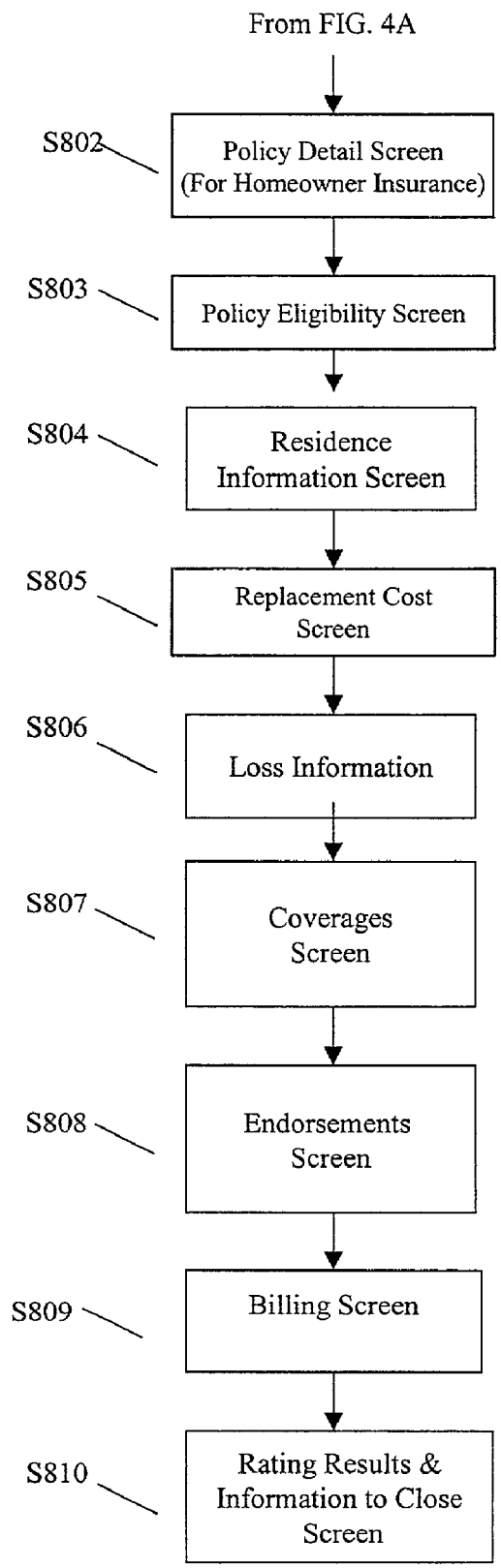
Figure 38:
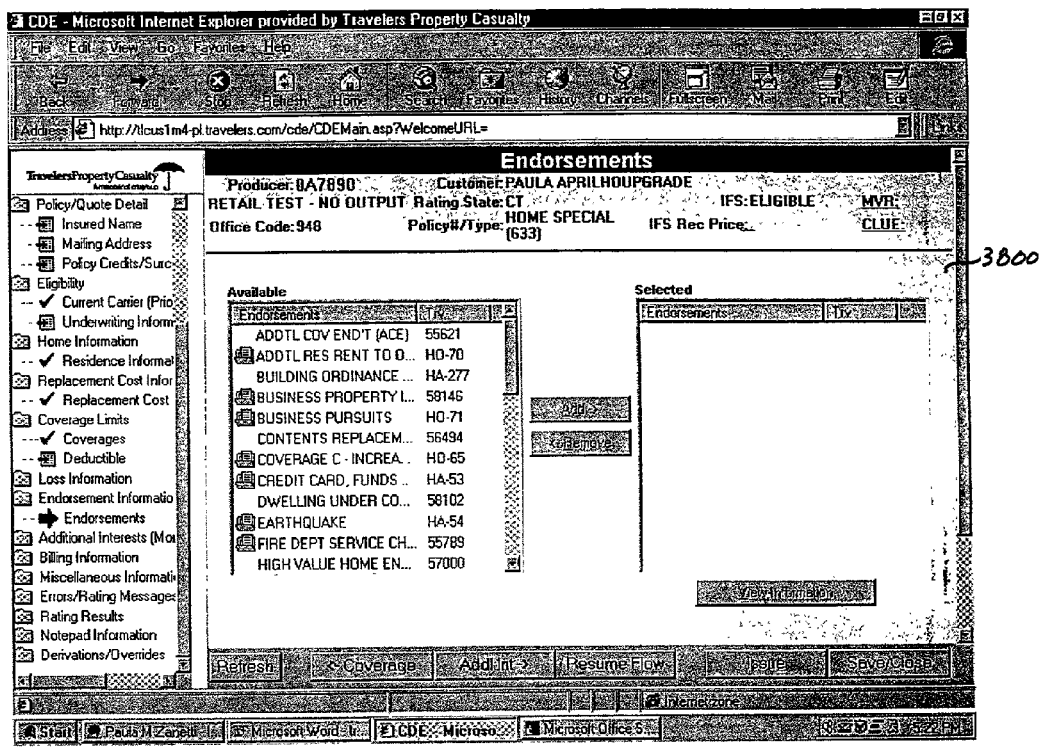
FIG. 38 depicts an Endorsements web page of the GUI for a process to issue a homeowner insurance policy, in accordance with an embodiment of the present invention.
Figure 39:
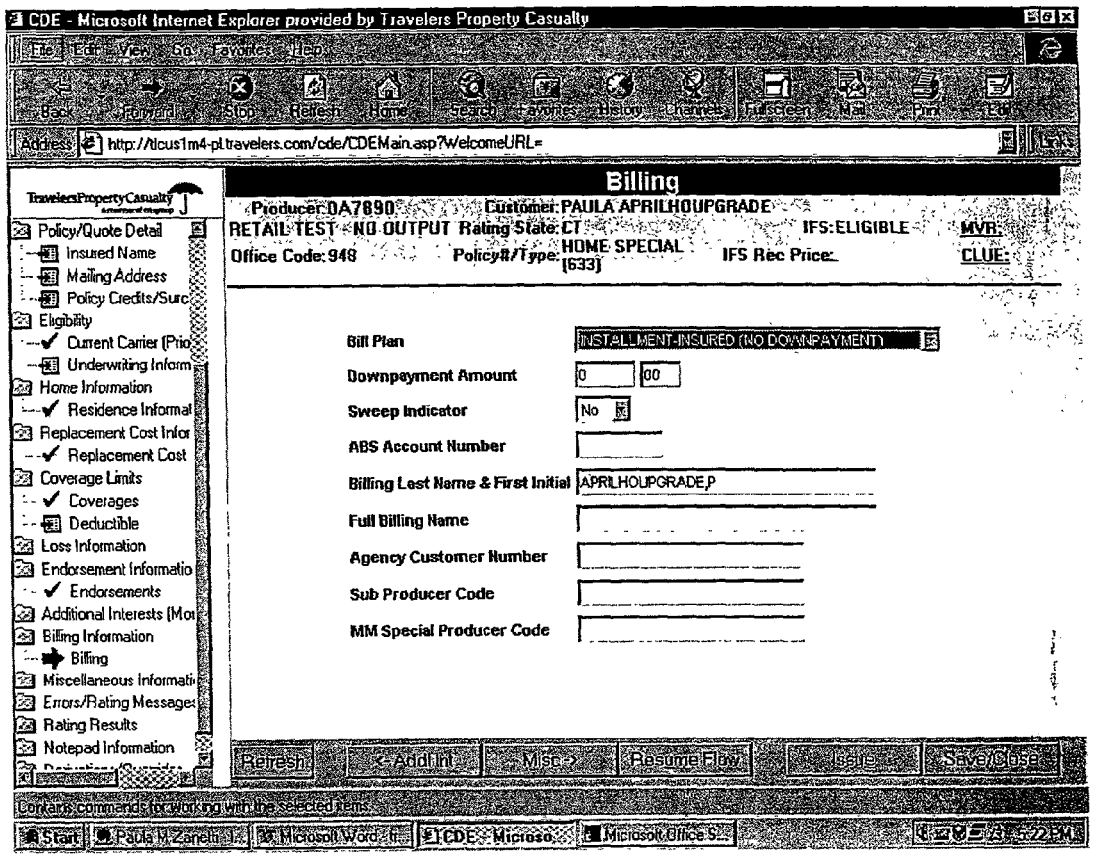
FIG. 39 depicts a Billing web page of the GUI for a process to issue a homeowner insurance policy, in accordance with an embodiment of the present invention.

According to an embodiment of the present invention, the user can issue insurance quotes for other types of insurance other than auto insurance. Referring back to FIG. 10A, the user can change the type of insurance for an insurance quote by modifying the information in the Line of Business field 1020. For instance, if the user wishes to obtain an insurance quote for a homeowner insurance, the user can click on the arrow to the right of the input field 1020 to obtain a drop down box with a list of available types of insurance for a quote (not shown). The user can then select, for example, "HOMEOWNERS" and proceed from there. This is shown as S7 in FIG. 3A. The continuance of a homeowner insurance quote process are shown in S72-S77 of FIG. 3C and will be explained later with respect to FIGS. 33, 35-37, and 40 and S802, S804-S807, and S810 in FIG. 4C. It should be noted that policy eligibility, endorsements, and billing, as shown in FIGS. 34, 38-39 and S803, S808, and S809 are not considered in an insurance quote for a homeowner insurance. Thus, they are not shown in FIG. 3C.

Referring back to FIGS. 6A-B, according to another embodiment of the present invention, the user can access applications for issuing insurance policies (rather than insurance quotes) by highlighting an appropriate name, in this instance, "CDE"(Common Data Entry), from the listed applications in the pop up box 610 as shown in FIG. 6B. The process for issuing an insurance policy is now explained with reference to the flowcharts shown in FIGS. 4A-C, with S100 and S200 in FIG. 4A showing the logon screen and the selection of insurance policy issuance, respectively.

Figure 12:
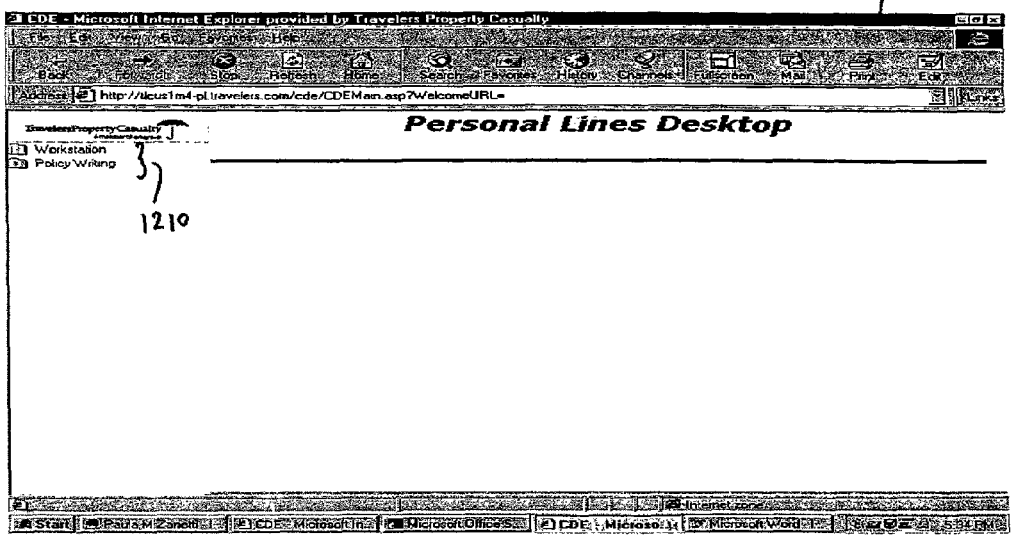
FIG. 12 depicts an initial web page of the GUI for a process to issue an auto insurance policy, in accordance with an embodiment of the present invention.
Figure 13A:
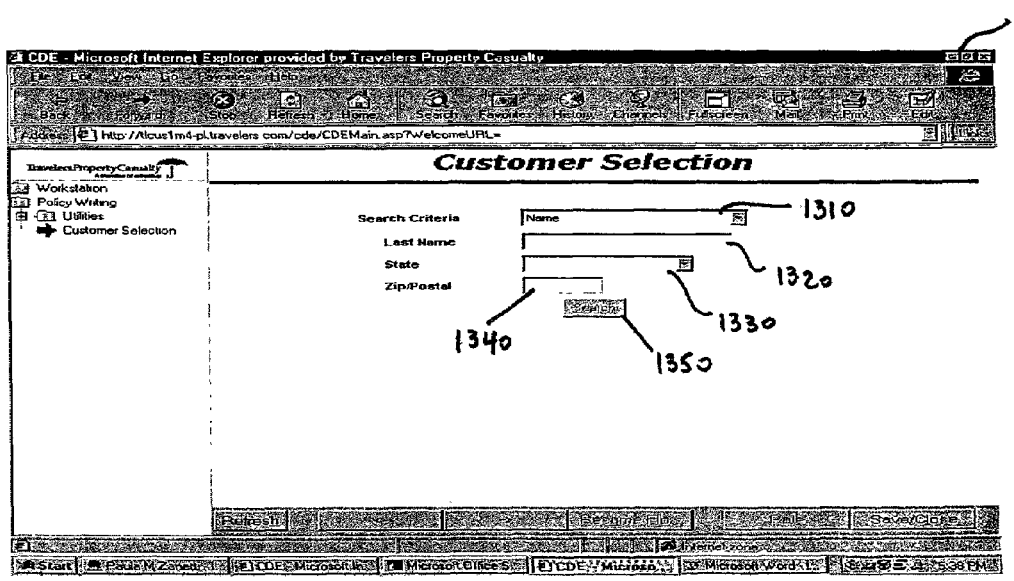
FIGS. 13A-B depict a Customer Selection web page of the GUI for a process to issue an auto insurance policy, in accordance with an embodiment of the present invention.
Figure 13B:
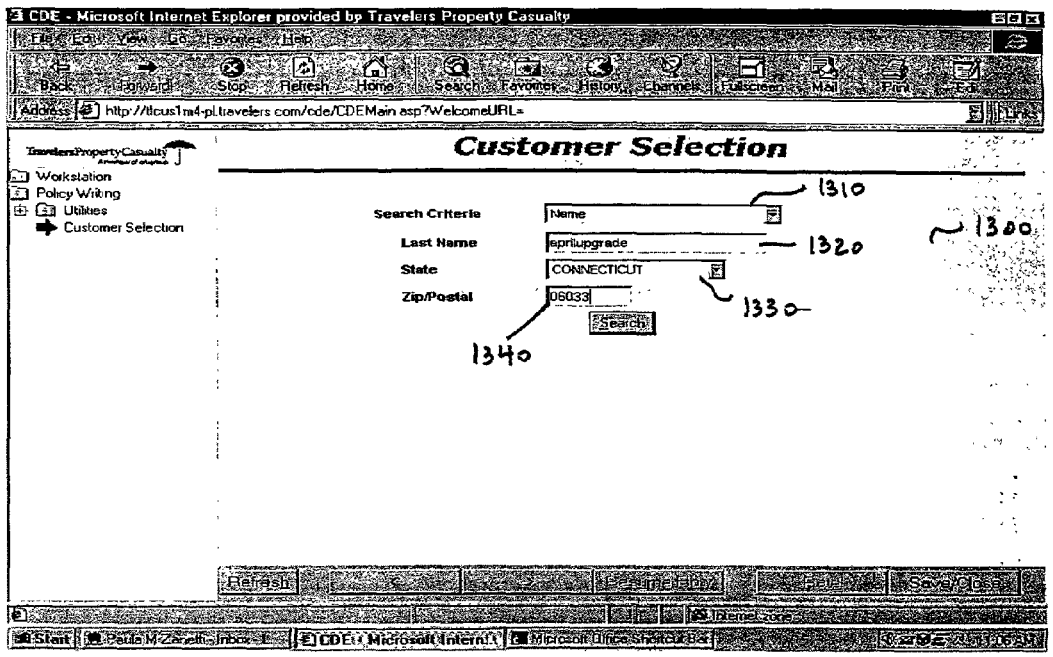

Once the user has successfully logged into CDE, he or she is greeted with a first or welcoming screen 1200 that may be entitled "Personal Lines Desktop" as shown in FIG. 12. This is shown as S300 in FIG. 4A. To begin the insurance policy issuance process, the user can double click on the Policy Writing folder in the navigation tree 1210 to display a second screen 1300 entitled "Customer Selection" as shown in FIG. 13A. Here, the user can enter the information about the customer that is interested in obtaining an insurance policy for a record search in the database of the insurance system. This is shown as S400 in FIG. 4A. Using the search criteria field, the user has various search criteria, such as name or address, that he or she can use to search for the customer record. FIG. 13A shows that a name search is to be conducted, wherein the user can enter the customer's last name in the Last Name field 1320. The user also has the option to enter information in the State field 1330 and Zip Code field 1340 to narrow down the search. Once information is entered into fields 1320, 1330, and/or 1340, the search button 1350 is enabled, and the user can begin the search by clicking on the button. FIG. 13B shows an example of the "Customer Selection" screen of FIG. 13A being filled with information in its input fields 1310, 1320, 1330, and 1340. If the customer search is successful, a matching customer list similar to the customer list box 860 shown in FIG. 8D will be displayed on the screen 1300. Thus, the user can pick a name from the customer list that matches with the present customer, access the customer information from the customer record in the customer database of the insurance system, and continue with the process of issuing an insurance policy to the customer. The next screen to display would be a "Quote/Policy Selection" screen. As with the insurance quote process, the "Quote/Policy Selection" screen is displayed after the "Customer Selection" screen 1300 only when the present customer is an existing customer or an existing customer with an outstanding quote. At the "Quote/Policy Selection" screen, the user has the option to issue a new insurance policy to the customer based on new information to be gathered from the user. For this option, the user is shown the next screen in FIG. 15 and subsequent screens as will be described later. At the "Quote/Policy Selection" screen, the user also has the option to modify or use an outstanding quote of the customer to issue a new insurance policy for the customer. For this option, the user is also shown the next screen in FIG. 15 and continues from there; however, the screen in FIG. 15 and subsequent screens will have input fields pre-filled, but changeable, to the extent of the information already embedded in the outstanding quote.

Referring back to FIG. 13B, if the customer search is unsuccessful, the GUI will display the "Customer Insert" screen 1400 with blank input fields, except for the information that the user has already entered. This is shown as S500 in FIG. 4A. For instance, the Name input field will only have the customer's last name, and the State field 1440 and the Zip code field 1450 are pre-filled with the same entries shown in FIG. 13B. The user can then enter additional information into the Name filed 1410, Street field 1420, City field 1430, and phone field 1460. The Insert Customer button 1470 will also be enabled to allow the user to click on it and insert information of the new customer into the database of the insurance system to create a new record for the customer. Now, the user can proceed with the insurance policy issuance process by gathering and compiling the factors or determinants desired for the calculation and issuance of an insurance policy. The screens shown in FIGS. 15-18 are next provided to the user for this purpose. The user can proceed to the next screen by clicking on the Determ→ navigation button 1480.

Figure 15:
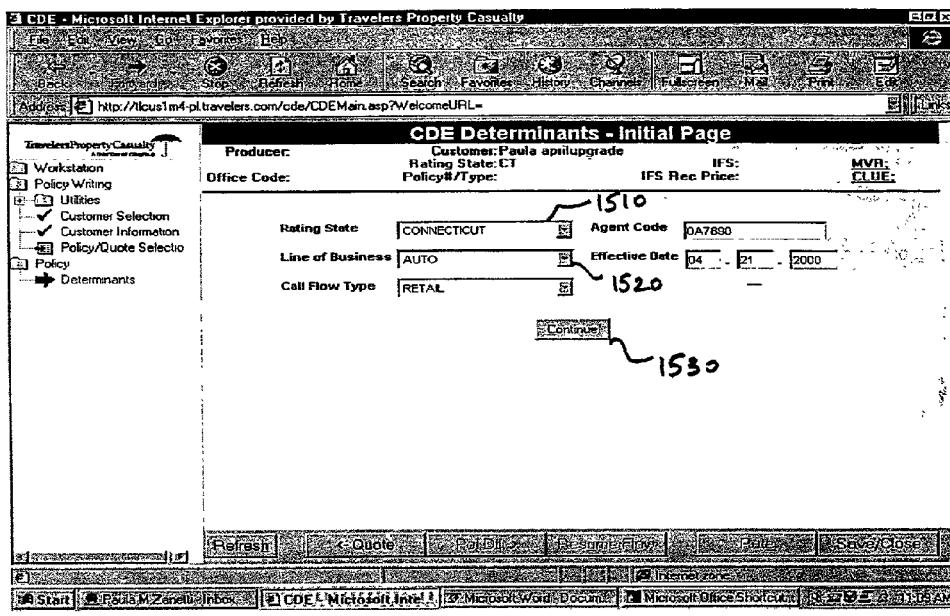
FIG. 15 depicts a Determinants—Initial Page of the GUI for a process to issue an auto insurance policy, in accordance with an embodiment of the present invention.
Figure 16:
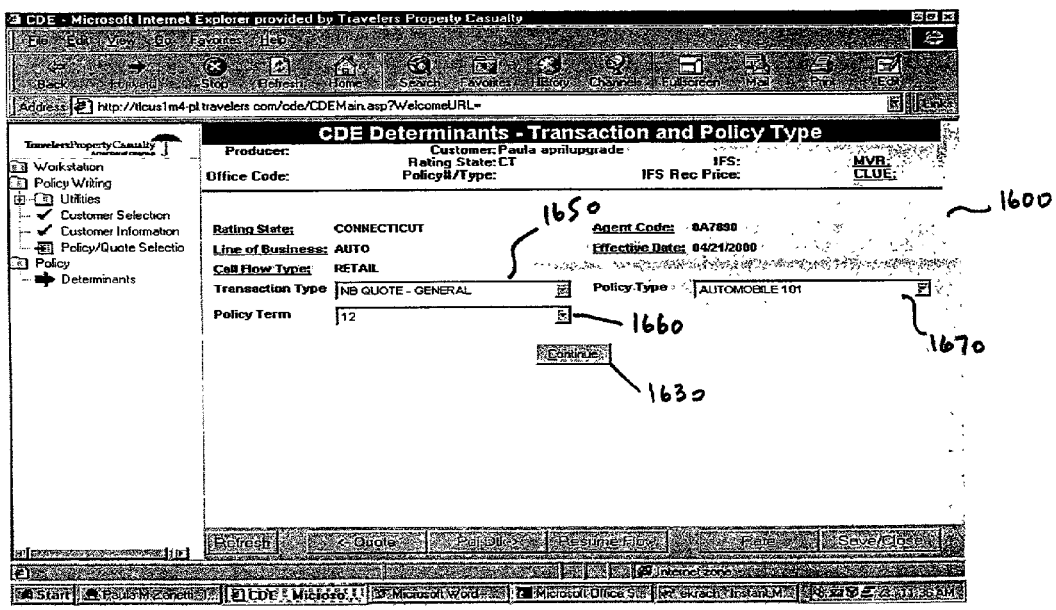
FIG. 16 depicts a Determinants—Transaction and Policy Type web page of the GUI for a process to issue an auto insurance policy, in accordance with an embodiment of the present invention.

FIG. 15 shows the next screen 1500, entitled "CDE Determinants—Initial Page". Again, screen 1500 includes some input fields that have been pre-filled and some that require entry by the user. For instance, the Rating State field 1510 may be pre-filled while the other input fields are entered by the user. FIG. 16 shows the next screen 1600, entitled "CDE Determinants—Transaction and Policy Type," that the user can access by clicking on the Continue button 1530 in screen 1500 of FIG. 15. In screen 1600, the input fields of screen 1500 appear as hyperlinks, indicated by underlined text, with the pre-filled or entered information next to them. Thus, the pre-filled and entered information in screen 1500 can be modified by clicking on the hyperlinks in screen 1600. Screen 1600 further displays additional input fields 1650, 1660, and 1670 with pre-filled information that can be modified by the user.

Figure 17:
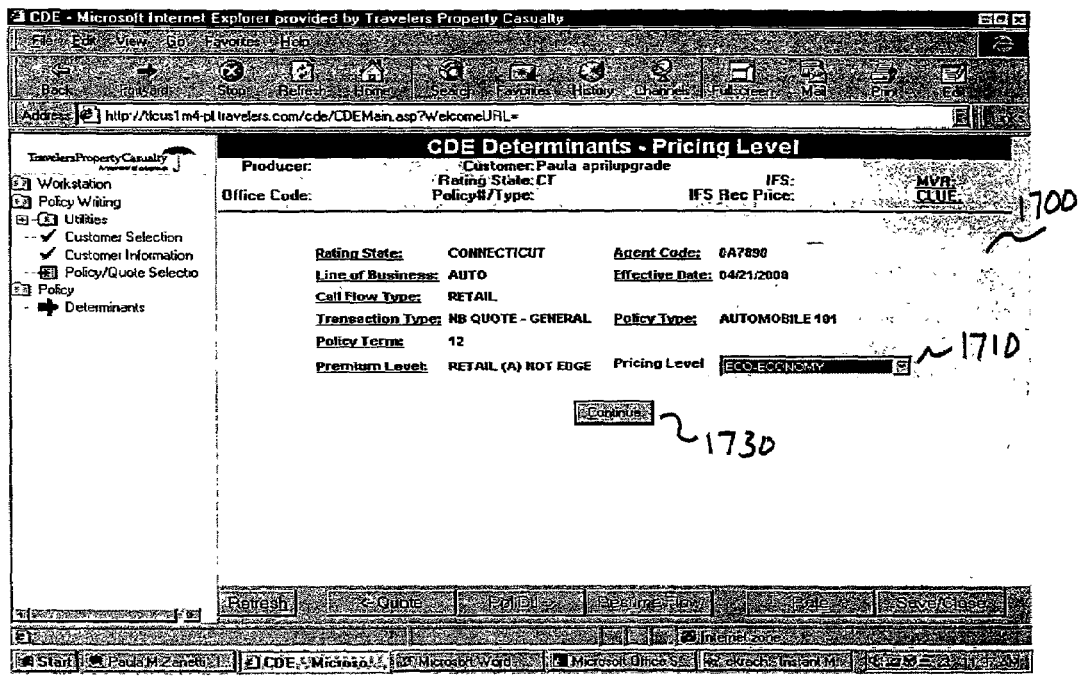
FIG. 17 depicts a Determinants—Pricing Level web page of the GUI for a process to issue an auto insurance policy, in accordance with an embodiment of the present invention.

FIG. 17 shows the next screen 1700, entitled "CDE Determinants—Pricing Level," that the user can access by clicking on the Continue button 1630 in screen 1600 of FIG. 16. Again, the cumulative input fields found in screens 1500 and 1600 also appear in screen 1700 as hyperlinks, indicated by underlined text, with the associated pre-filled and entered information. Thus, such information can be modified by clicking on the hyperlinks. Screen 1700 further displays an additional Pricing Level field 1710 for entry by the user.

Figure 18A:
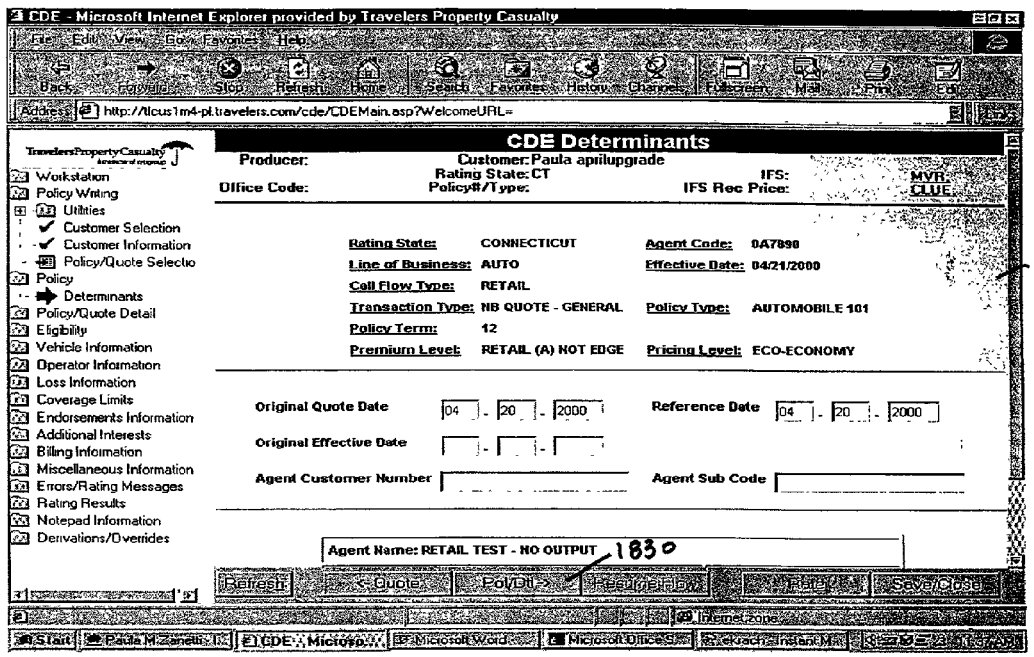
FIGS. 18A-B depict a Determinants web page of the GUI for a process to issue an auto insurance policy, in accordance with an embodiment of the present invention.
Figure 18B:
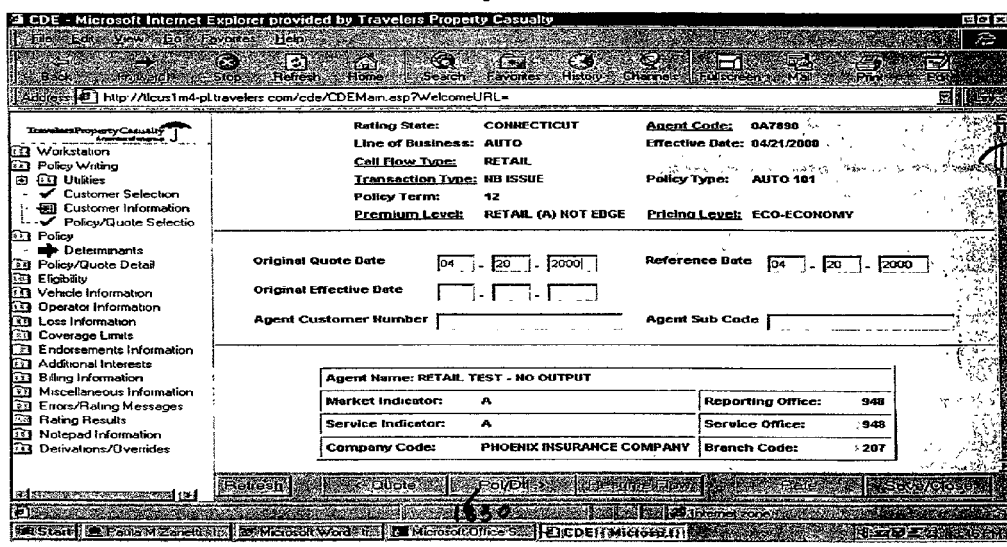

FIGS. 18A-B show the next screen 1800, entitled "CDE Determinants" that the user can access by clicking the Continue button 1730 in screen 1700 of FIG. 17. Screen 1800 includes the hyperlinks and associated information displayed in screen 1700 and an additional hyperlink for the Pricing Level field 1710. Furthermore, screen 1800 includes additional input fields for user input of information relating to the issuance of the insurance policy. The aforementioned determinant screens are shown as S600 in FIG. 4A. Because the insurance type selected in input field 1520 of FIG. 15 is auto insurance, the process to issue an insurance policy continues through S700 of FIG. 4A and onto FIG. 4B.

Figure 14:
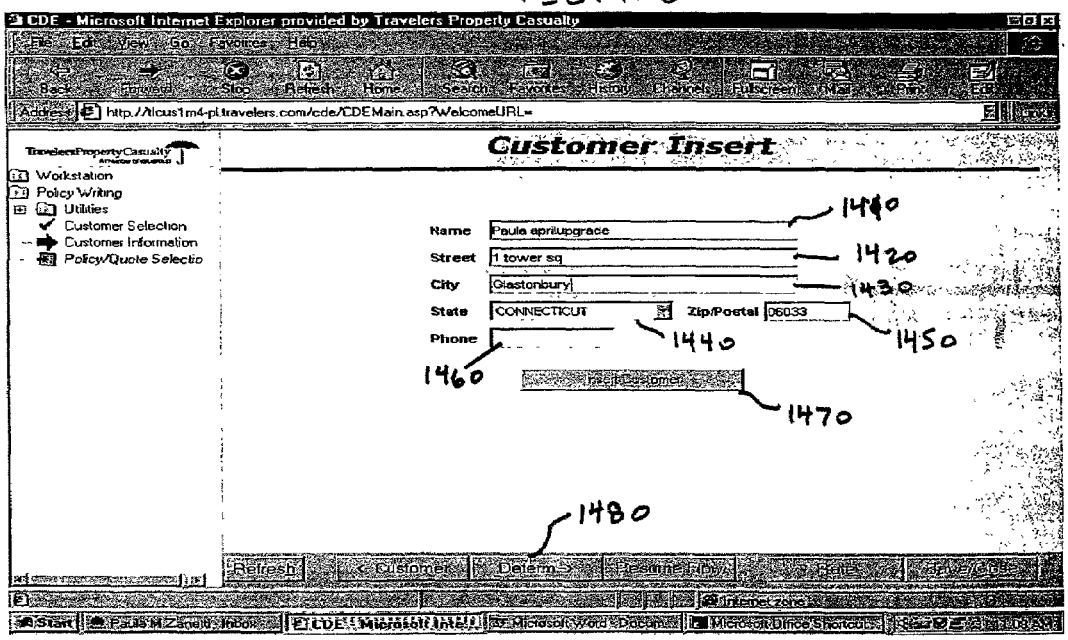
FIG. 14 depicts a Customer Insert web page of the GUI for a process to issue an auto insurance policy, in accordance with an embodiment of the present invention.
Figure 19A:
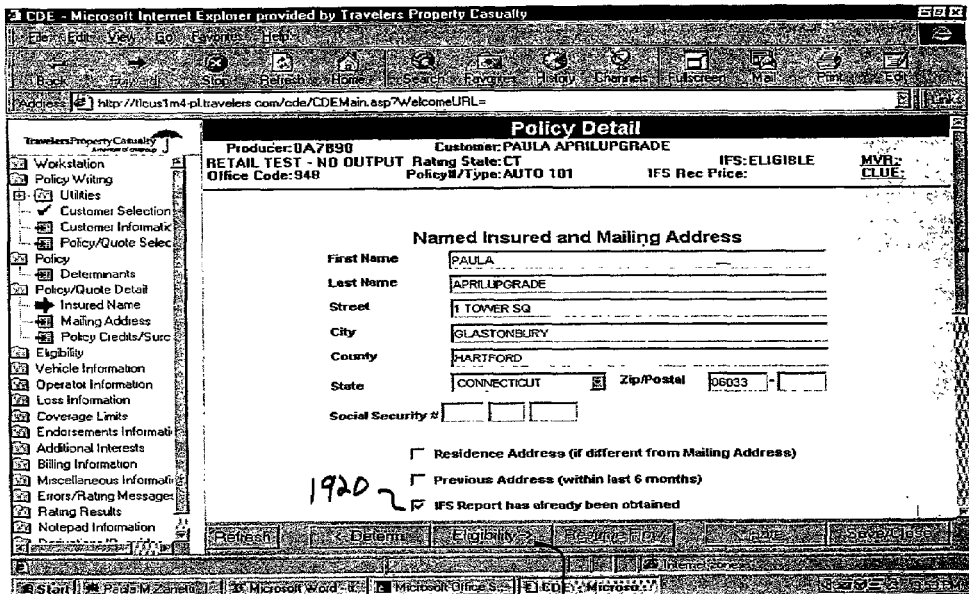
FIGS. 19A-C depict a Policy Detail web page of the GUI for a process to issue an auto insurance policy, in accordance with an embodiment of the present invention.
Figure 19B:
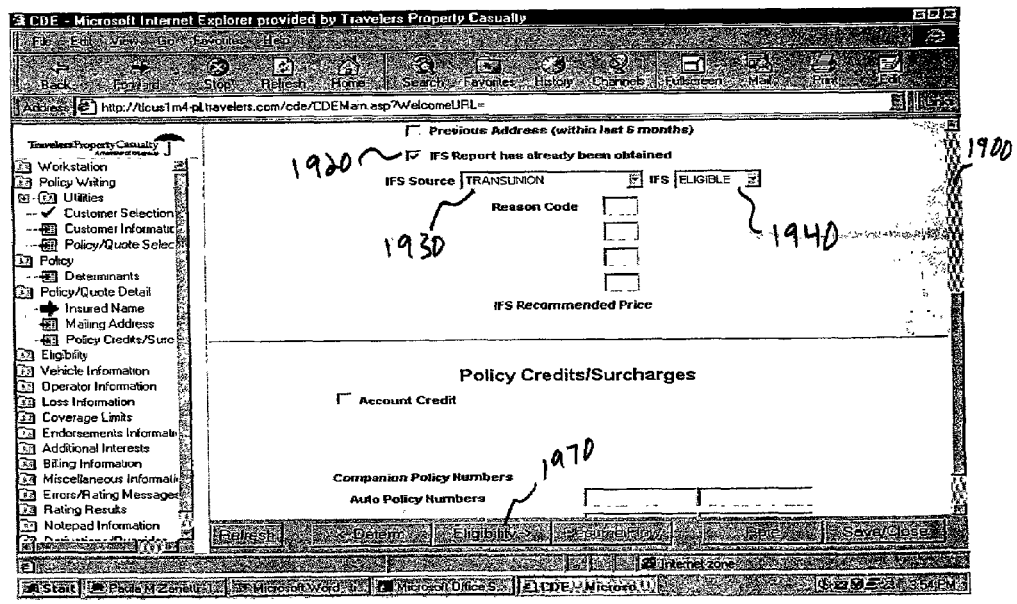
Figure 19C:
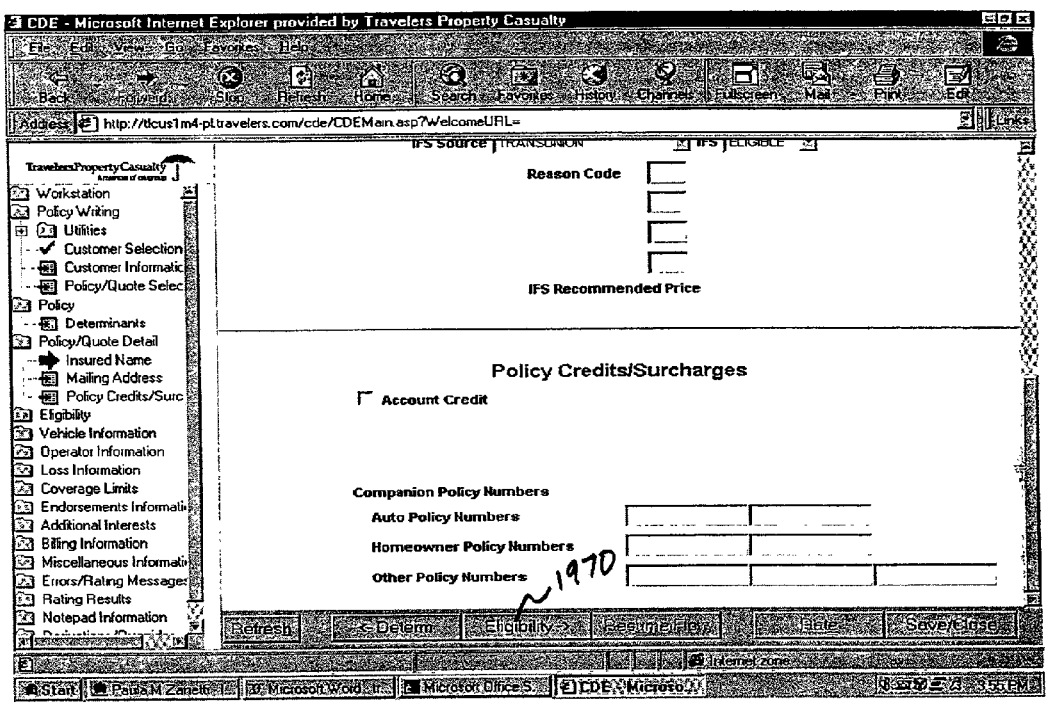

Now that information for the CDE determinants have been gathered for a selected insurance type in the previous screens, the user can proceed to the policy detail section of the insurance policy issuance process to verify the customer information and enter additional information relating the insurance policy to be issued. This is shown as S702 in FIG. 4B. FIGS. 19A-C show various sections of a "Policy Detail" screen 1900 as it is scrolled down, which the user can access by clicking on the Pol/Dtl→ navigation button 1830 found in screen 1800 of FIGS. 18A-B. Screen 1900 is similar in appearance to the "Policy Detail" screen 1100 of FIGS. 11A-B for the insurance quote process described earlier. As with screen 1100, screen 1900 displays detailed customer information and information about any other companion insurance policies. Again, some of the input fields are pre-filled with information that the user has already entered and/or received from the insurance system database. For instance, the customer's name and address are pre-filled with data from screen 1400 in FIG. 14. If the user check any of the boxes for Residence Address and Previous address, additional input fields (not shown) will be displayed on the same screen for the user to enter in such information. Furthermore, if an IFS Report information of the customer has been imported from the user's database or the database of the insurance system, then the input field 1920 is automatically checked and the input fields 1930 and 1940 are pre-filled with the source of the IFS Report and where the customer is eligible for the type of insurance being quoted based on the IFS Report. The user then has the option to enter data into any other input fields in screen 1400 that have not been pre-filled.

Figures 20A, 20B:
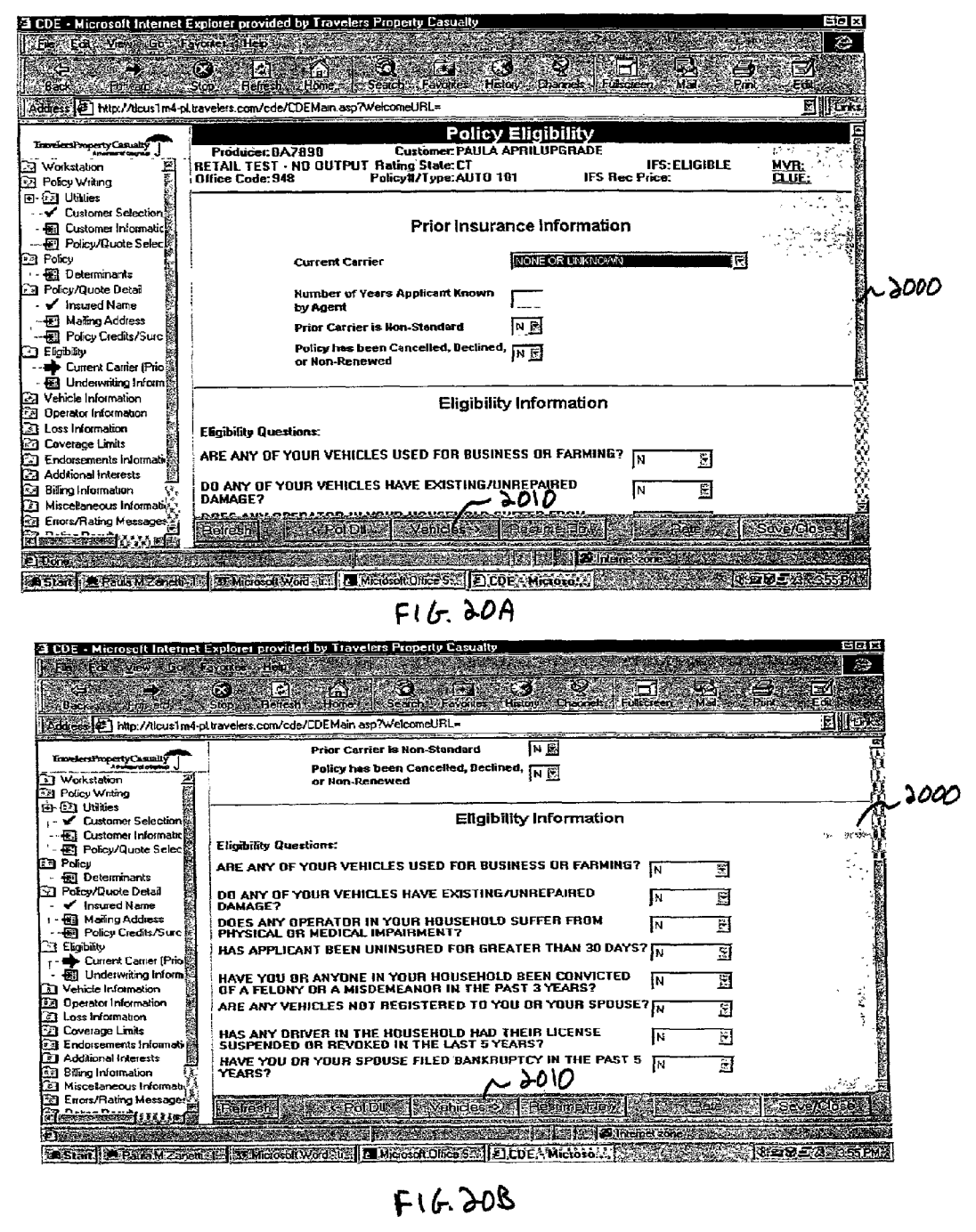

The user can now perform a determination on the eligibility of the customer for the insurance policy being issued. This is shown as S703 in FIG. 4B. FIGS. 20A-B show the various sections of a "Policy Eligibility" screen 2000 as it is scrolled down. The user can access the screen 2000 by clicking on the Eligibility→ navigation button 1970 found in screen 1900 of FIGS. 19A-C. Screen 2000 displays a number of input fields relating to information desired for the determination of policy eligibility, and these input fields are self explanatory.

Figure 21:
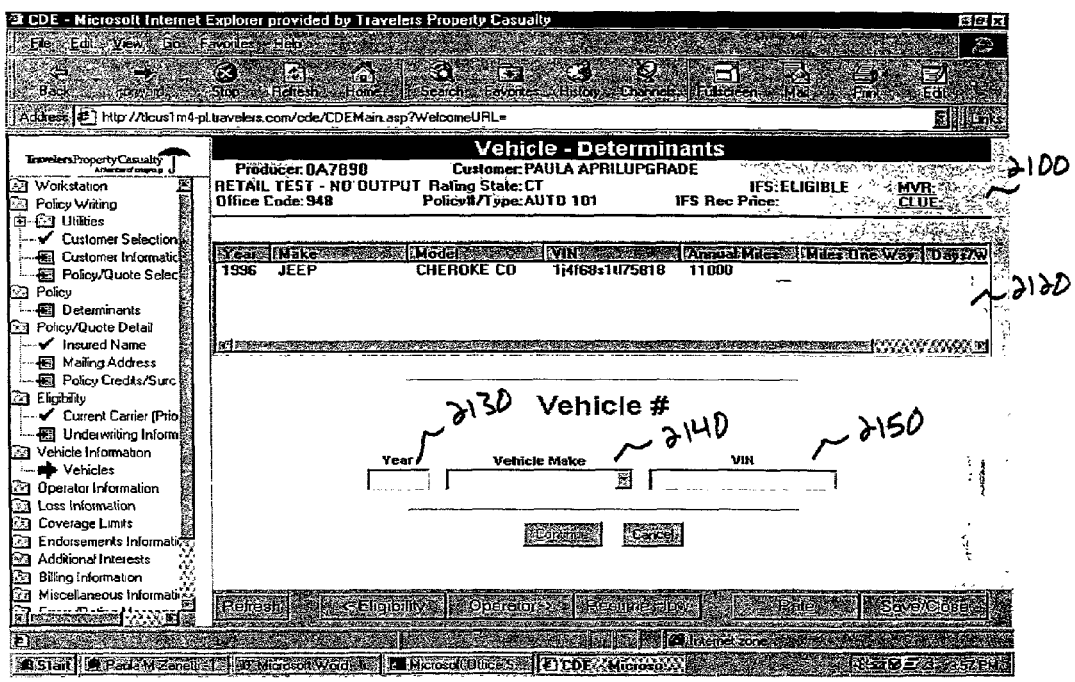
FIG. 21 depicts a Vehicle—Determinants web page of the GUI for a process to issue an auto insurance policy, in accordance with an embodiment of the present invention.
Figures 22A, 22B:
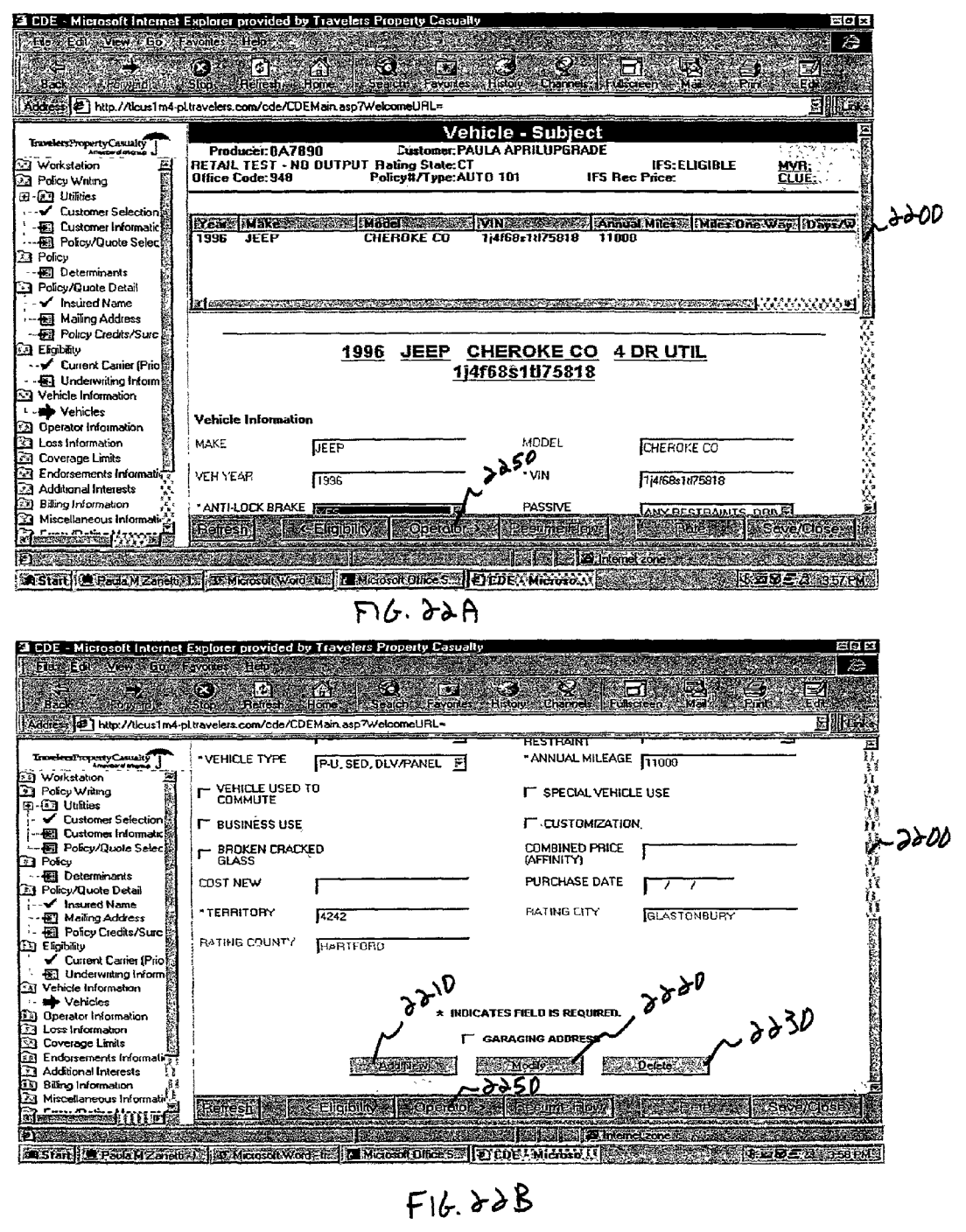

Because an auto insurance policy has been selected for issuance in screen 1500 of FIG. 15, a Vehicle→ navigation button 2010 appears in the "Policy Eligibility" screen 2000. The user can now proceed with the insurance policy issuance process by clicking on button 2010, which will display the "Vehicle—Determinants" screen 2100 as shown in FIG. 21. This is shown as S704 in FIG. 4B. The screen 2100 displays a table 2120 that lists all vehicles, with the necessary identification, associated with the customer and the insurance policy to be issued. This list may be part of the customer information retrieved from the insurance system database when the user successfully found the customer records in the database. For instance, the table 2120 shows that a 1996 Jeep Cherokee with VIN4f68sltl75818 with estimated annual mileage of 11,000 miles is listed for the customer. The user can highlight the row listing the 1996 Jeep Cherokee vehicle and click on it to activate the record of that particular vehicle for additional information and modification. When that is done, a new screen 2200 entitled "Vehicle—Subject" is displayed. FIGS. 22A-B show the various sections of screen 2200 as it is scrolled down. As seen, the selected vehicle along with the highlighted text in the vehicle row are now in placed in the center of the action area of screen 2200. Furthermore, there are also displayed a number of input fields, some are blank and some with pre-filled information relating to the selected vehicle. Here, the user has the option to modify the pre-filled information and to enter additional information into the blank input fields.

Referring back to FIG. 21, if there are more than one vehicle listed in table 2120, the user can highlight each row and modify and add information as needed. If there is no vehicle listed in table 2120, the user can add vehicle information via the input fields 2130, 2140, and 2150 and go through the process described earlier with regard to FIGS. 22A-B and clicking on buttons 2210, 2220, and 2230.

Figures 23A, 23B:
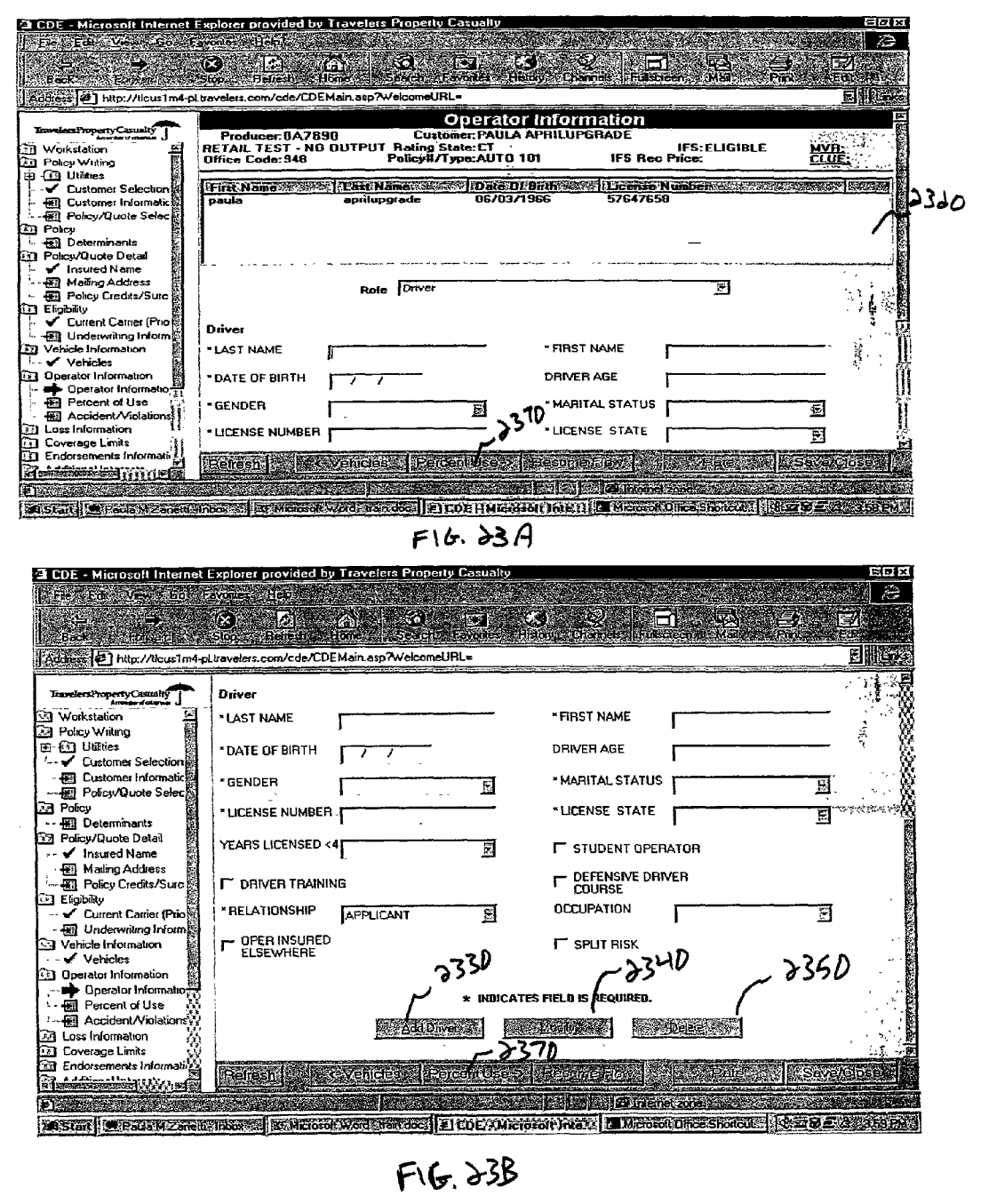

With the vehicle determinants obtained from the previous screens, the user can now move on to information about operators of the vehicle. This is done by the user clicking on Operator→ navigation button 2250 in screen 2200 of FIGS. 22A-B. The resulting "Operator Information" screen 2300 is shown in FIGS. 23A-B as it is scrolled down. This is shown as S705 in FIG. 4B. The screen 2300 includes a table 2320 listing the users or operators, with the necessary identification, of the particular vehicle identified in screen 2200 of FIGS. 22A-B (in this case, a 1996 Jeep Cherokee). This list may be part of the customer information retrieved from the insurance system database when the user successfully found the customer records in the database. For instance, table 2320 shows that Paula Aprilupgrade with date of birth of Jun. 3, 1966 and license number 57647658 is listed as the operator of the 1996 Jeep Cherokee. If the user wishes to add additional drivers to the list of operators in table 2320, the user can enter operator's information into the input fields displayed below table 2320 and click on the Add Driver button 2330. Likewise, if the user wishes to remove an operator's name from the list in table 2320, the user can highlight the name and click on the Delete button 2350. If the user wishes to modify information about an operator from the list in table 2320, the user can highlight on the operator's name in the list and double click on the highlighting row. The operator's information would then be pre-filled in the input fields displayed below table 2320, and the user can go into each input field and modify the information. Once the modification is complete, the user can click on the Modify button 2340 to save the modification.

Figure 24:
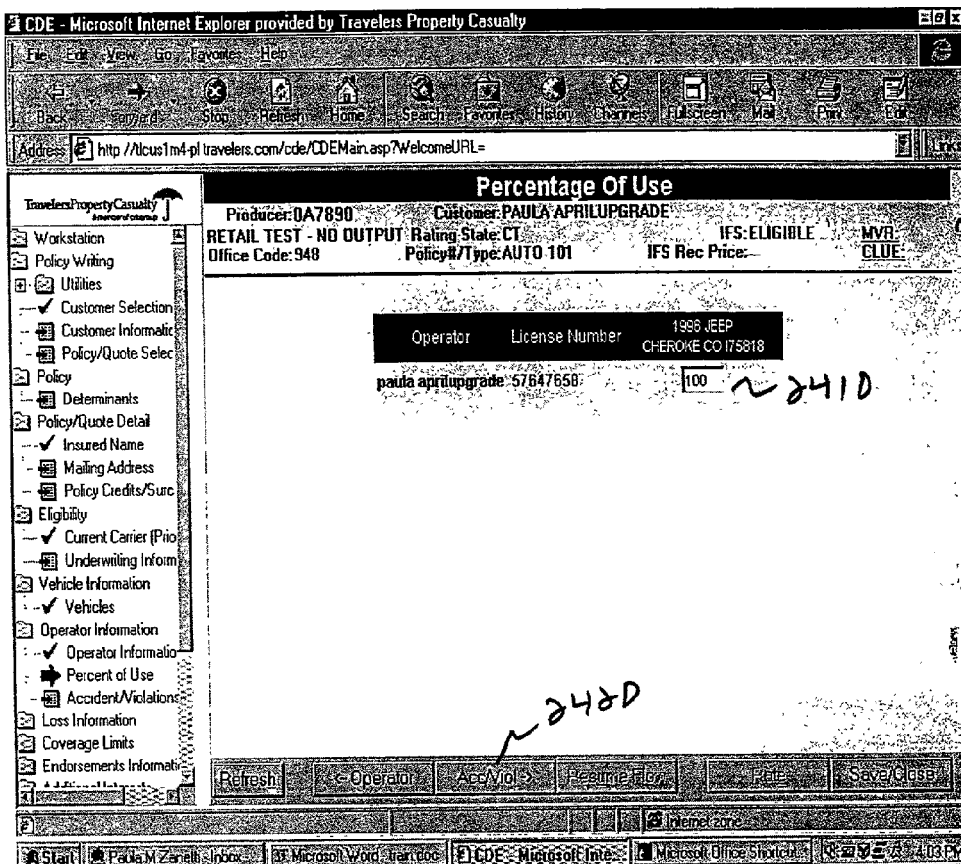
FIG. 24 depicts a Percentage of Use web page of the GUI for a process to issue an auto insurance policy or an insurance quote, in accordance with an embodiment of the present invention.

The next screen that the user accesses is the "Percentage of Use" screen 2400 shown in FIG. 24, which will be displayed upon the user clicking on the Percent Use→navigation button 2370 in screen 2300 of FIG. 23. This is shown as S706 in FIG. 4B. Screen 2400 shows the percentage of use of each of the operators listed in table 2320 of screen 2300. If there is only one operator listed in table 2320, the percentage of use for that sole operator is pre-filled with the number 100 in input field 2410 because it is assumed that the operator has 100% use of the vehicle. If there are two operators listed in table 2320, two names will be listed with two input fields 2410, and the pre-filled percentage of use for each operator is cut in half to 50, and so on. Of course, the user has the option to modify the percentage value in any one of the input field 2410.

Figure 51:
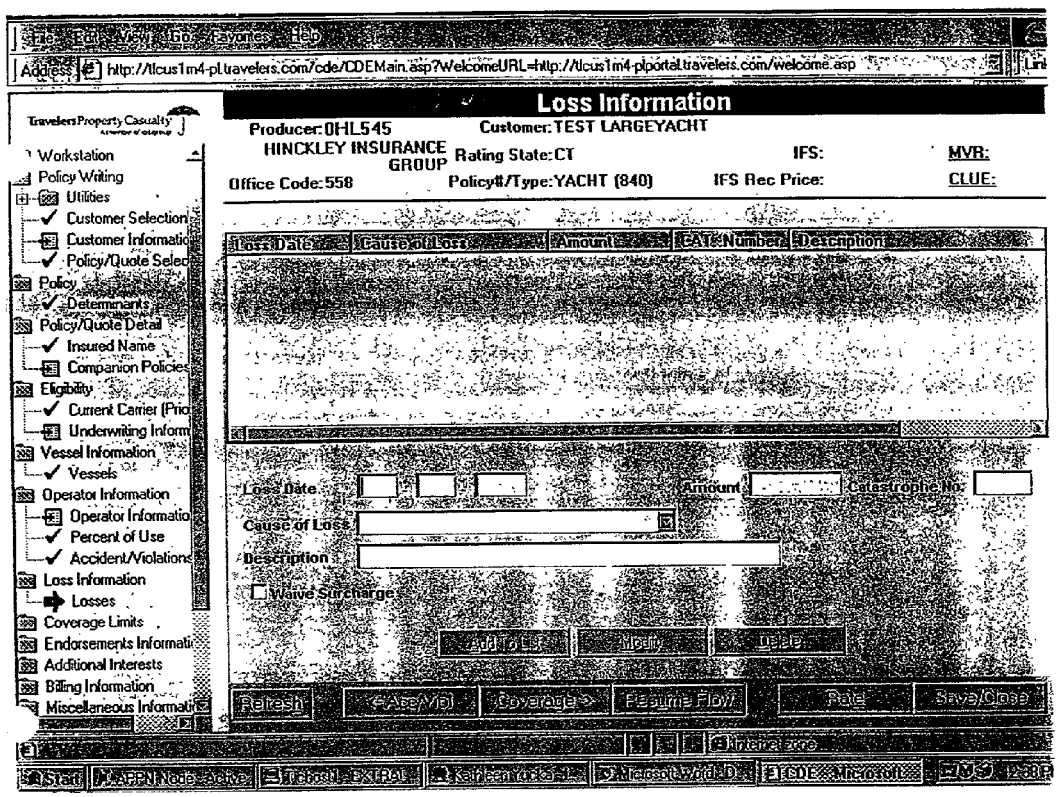
FIG. 51 depicts a Loss Information page of the GUI for a process to issue an insurance policy for a water vessel, in accordance with an embodiment of the present invention.

The next screen for the user to access is the "Accidents/Violations and Inexperience" screen, like that shown in FIG. 50 for a water vessel insurance policy, by clicking on the Acc/Viol→ navigation button 2420. This screen provides entry and display of information relating to any accidents and/or traffic violations in which the listed vehicle operators in FIG. 24 have been involved. This is shown as S707 in FIG. 4B. The next screen, which the user may access by clicking on the Loss → navigation button on the "Accidents/Violations and Inexperience" screen, is the "Loss Information" screen, like that shown in FIG. 51 for a water vessel insurance policy. This is shown as S708 in FIG. 4B. This screen provides entry and display of information relating to any loss that was incurred as the result of the accidents and/or traffic violations listed in the previous "Accidents/Violations and Inexperience" screen.

Figure 25A:
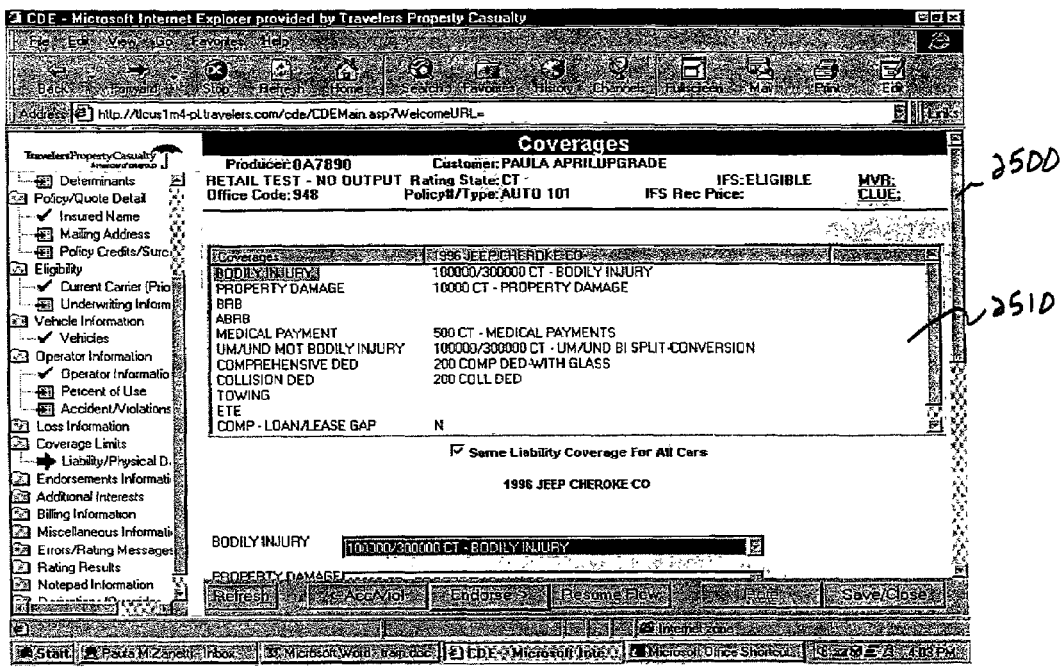
FIGS. 25A-B depict a Coverages web page of the GUI for a process to issue an auto insurance policy or an insurance quote, in accordance with an embodiment of the present invention.
Figure 25B:
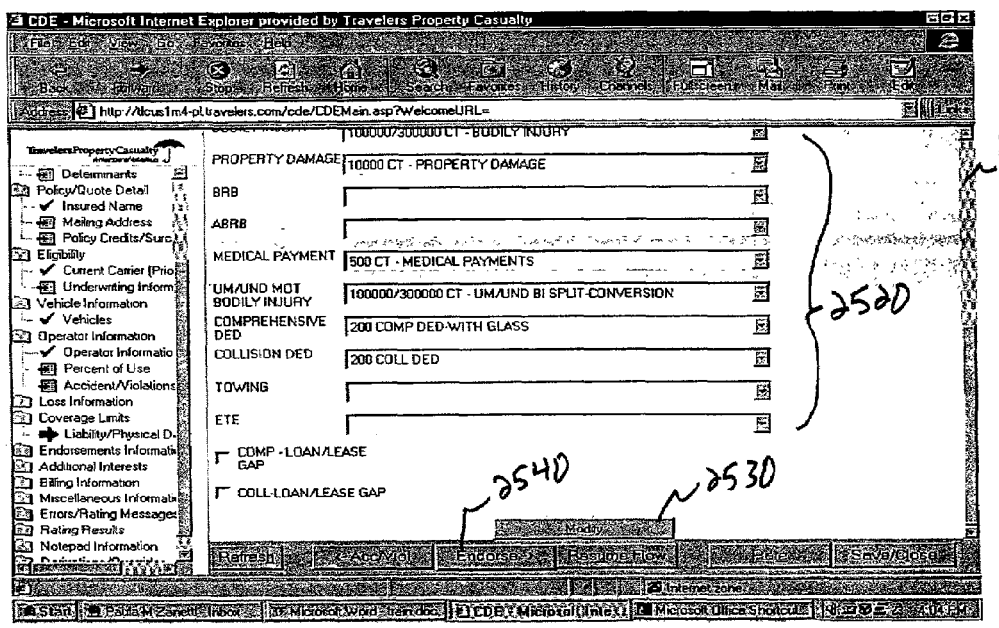

The next screen for the user to access is the "Coverages" screen 2500 shown in FIGS. 25A-B, as it is scrolled down. This is shown as S709 in FIG. 4B. This screen can be accessed by the user clicking on the. The screen 2500 includes a table 2510 listing the coverages set for the insurance policy being issued. The user can modify the listed insurance coverages via the input fields 2520 displayed below the table 2510 and click on the Modify button 2530. Once the user is satisfied with the coverages listed in table 2510, the user can proceed to an "Endorsement" screen by clicking on the Endorse →navigation button 2540, like that shown in FIG. 38 for a homeowner insurance policy and described later. This is shown as S710 in FIG. 4B.

Figure 26:
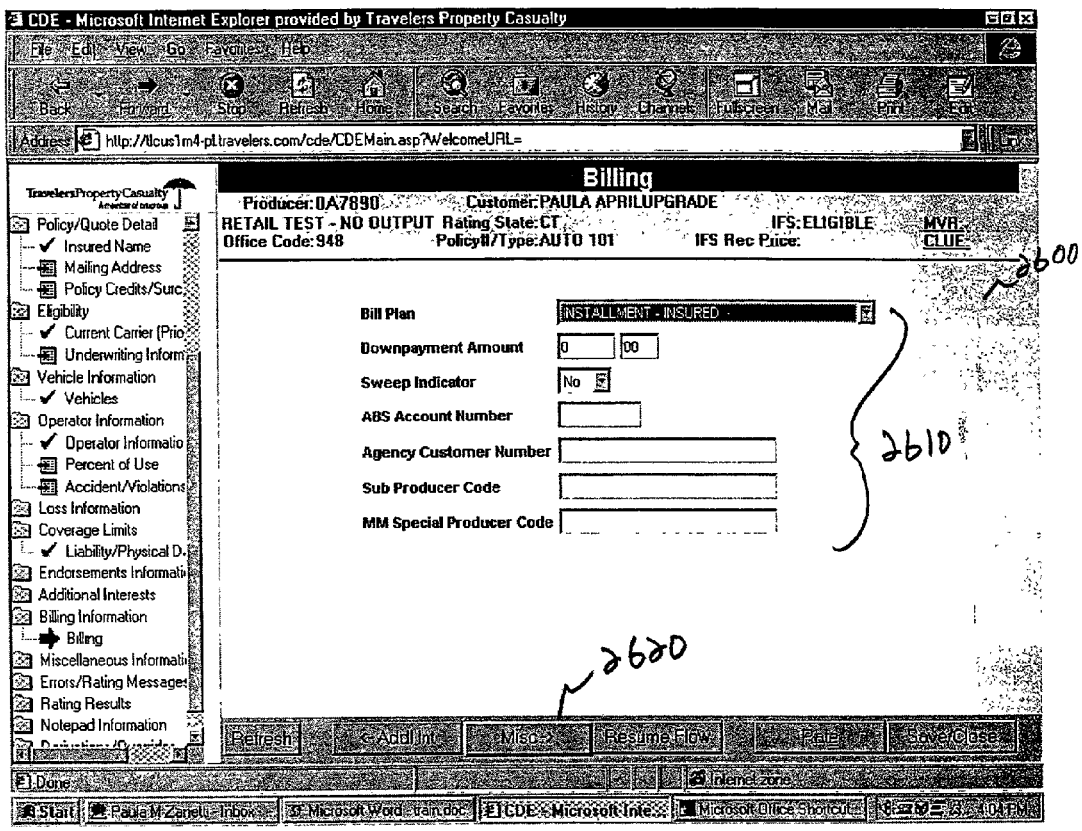
FIG. 26 depicts a Billing web page of the GUI for a process to issue an auto insurance policy, in accordance with an embodiment of the present invention.

Next, the user can proceed to the billing information by clicking on the Resume Flow navigation button on the "Endorsement" screen. FIG. 26 shows the resulting "Billing" screen 2600, wherein the user can enter into the various input fields billing information such as billing plan, downpayment amount, customer account number, etc. This is shown as S711 in FIG. 4B. It should be noted that unlike the insurance policy issuance process, the insurance quote process does not include the billing screen 2600. Once billing information is completed in the various input fields 2610, the user can access the next screen by clicking on the Misc→ navigation button 2620. FIGS. 27A-B shows the resulting "Rating Results" screen 2700 as it is scrolled down. This is shown as S712 in FIG. 4B. The screen 2700 displays a summary of the coverages for the insurance policy to be issued and the insurance premium for such coverages in the top half of the screen. The bottom half of the screen 2700 displays Information to close, which includes other self-explained information relating to the insurance policy, with input fields for the user to modify and/or add information. Here, the user also has the option to view IFS Information via button 2710, view pricing details of the insurance policy via button 2720, or proceed to issuance of the insurance policy via button 2730. A IFS Information screen comprises a credit report on the customer. A pricing details screen is similar to the "Rating Results" screen 2700, but with additional information such as insurance policy number. An issuance screen provides standard information relevant to the issuance of an insurance policy. It should be noted that screen 2700 is also included in the insurance quote process; however, unlike the insurance policy issuance process, the information to close in the bottom half of screen 2700 does not appear in the insurance quote process.

Figure 28:
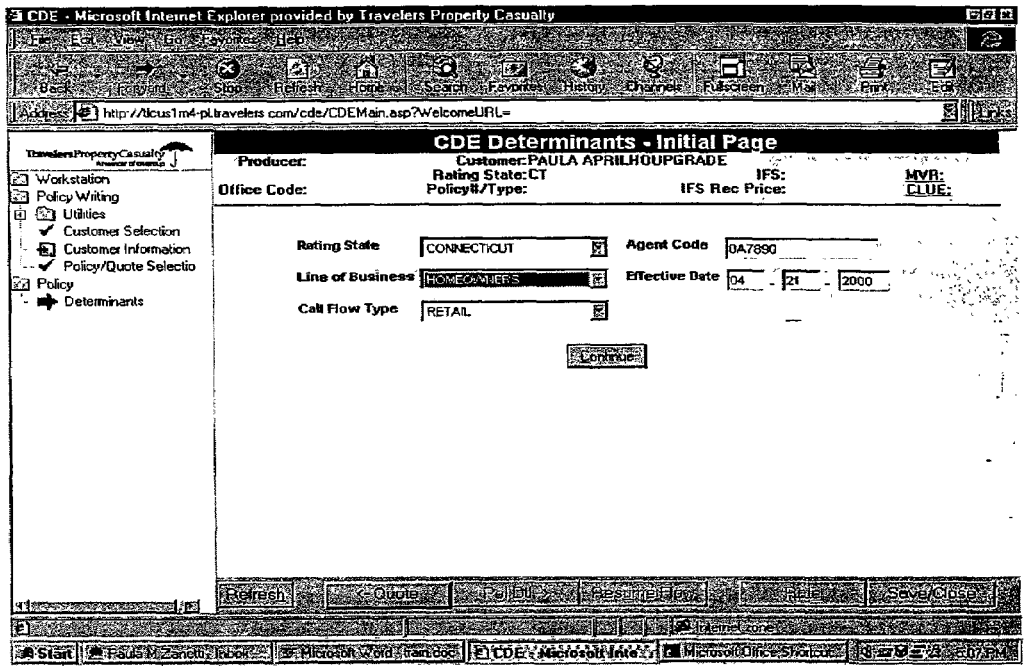
FIG. 28 depicts a Determinants—Initial Page of the GUI for a process to issue homeowner auto insurance policy, in accordance with an embodiment of the present invention.
Figure 29:
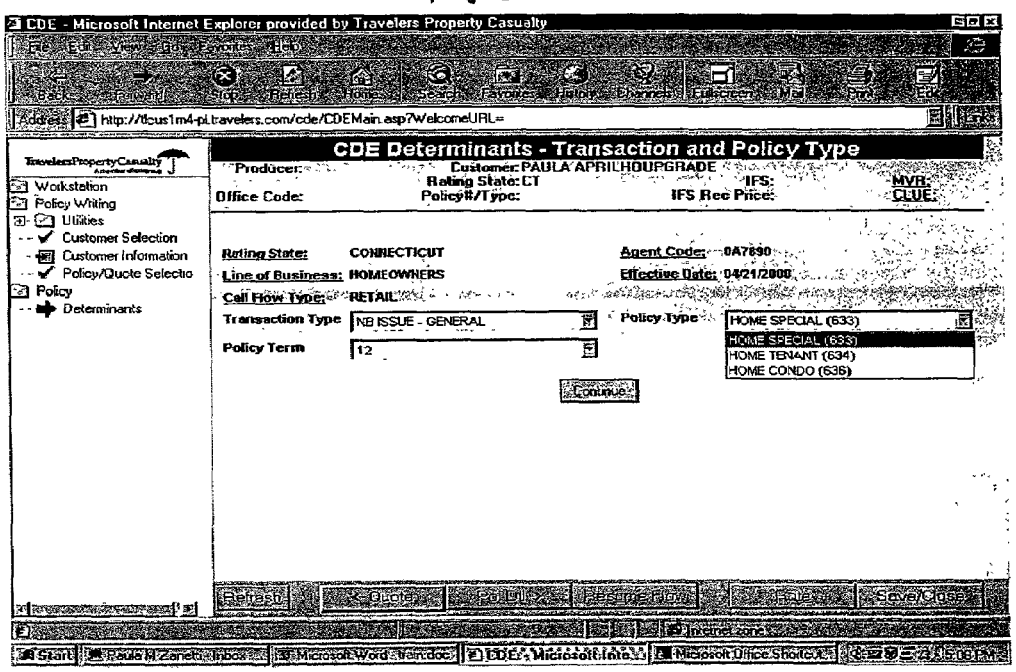
FIG. 29 depicts a Determinants—Transaction and Policy Type web page of the GUI for a process to issue a homeowner insurance policy, in accordance with an embodiment of the present invention.
Figure 3D:
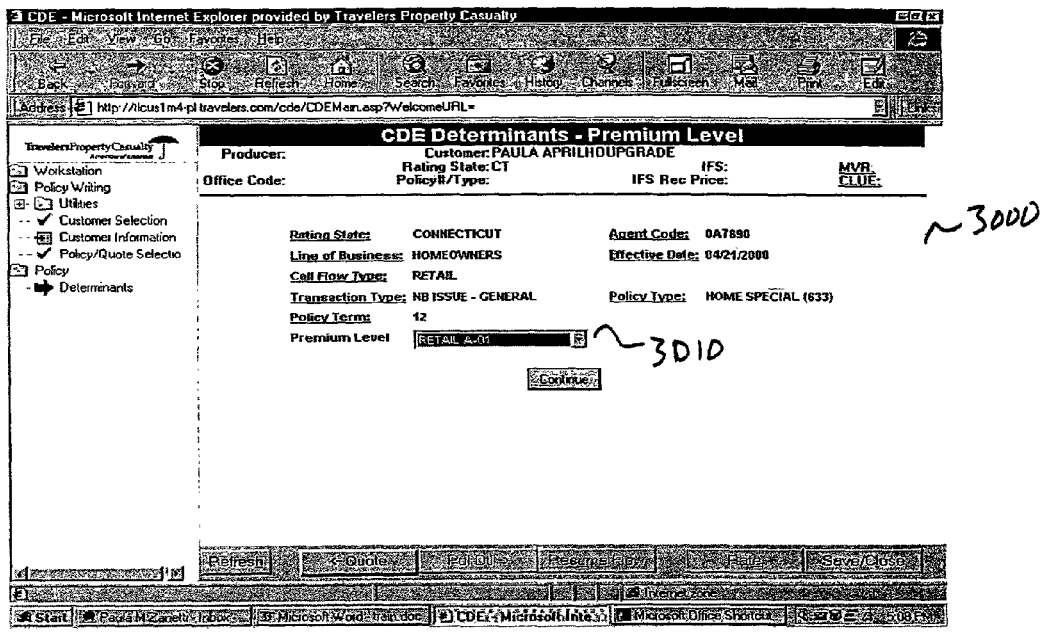
Figure 3I:
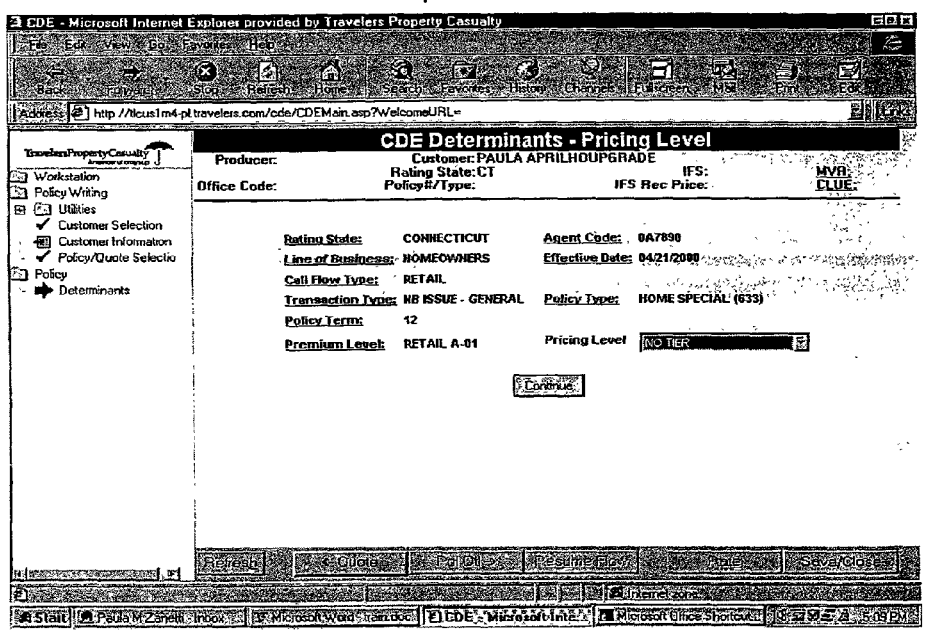
Figure 33C:
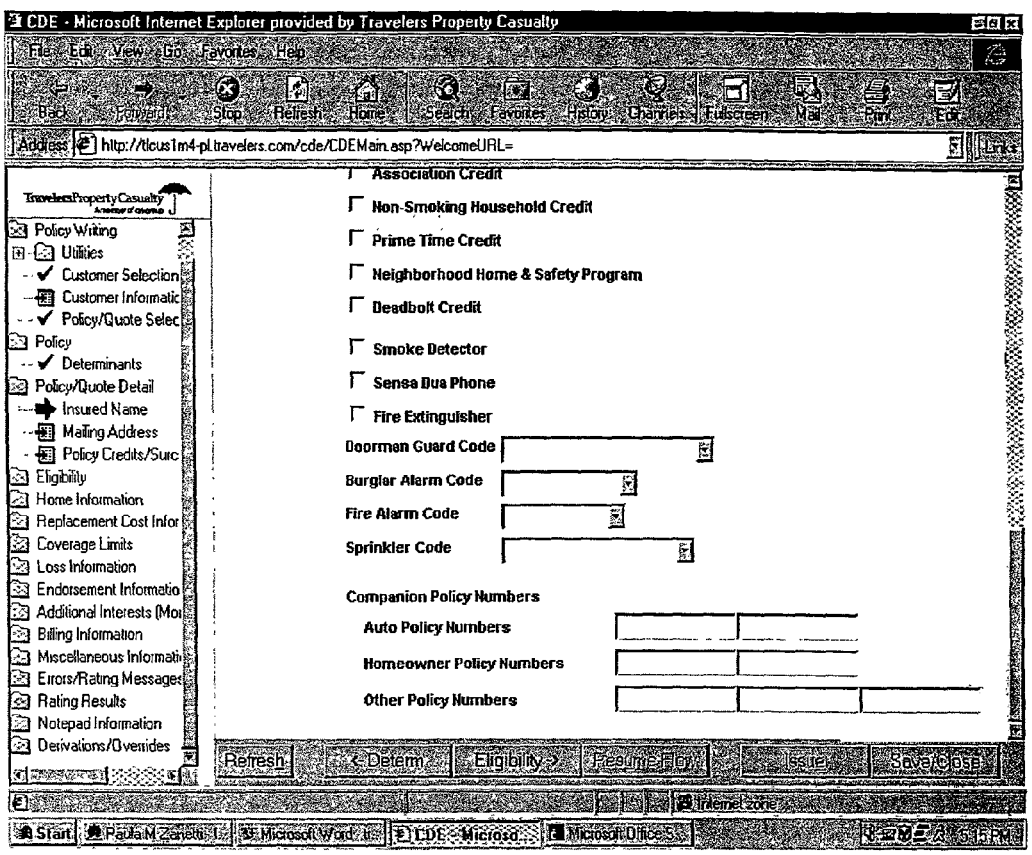

What has been described thus far with regard to FIGS. 15-27 was an example of a process for issuing an automobile insurance policy based on a selection in the input field 1520 of FIG. 15, in accordance one embodiment of the present invention. The process for issuing a personal-lines insurance policy other than an auto insurance policy is also similar. For instance, a process for issuing a homeowner insurance policy is shown in FIGS. 28-40 with reference to the flowcharts shown in FIGS. 4A and 4C. The screens in FIGS. 28 and 29 are similar to those in FIGS. 15 and 16 and described likewise. This juncture is shown as S600 and S800 in FIG. 3A. Additionally, the homeowner insurance policy includes a "CDE Determinants—Premium Level" screen 3000 shown in FIG. 30. This screen enables the user to set the premium level 3010 for the insurance policy. The screens in FIGS. 31-34 are similar to those FIGS. 17-20 and described likewise. This juncture is shown as S802 and S803 in FIG. 3C.

Figures 35A, 35B:
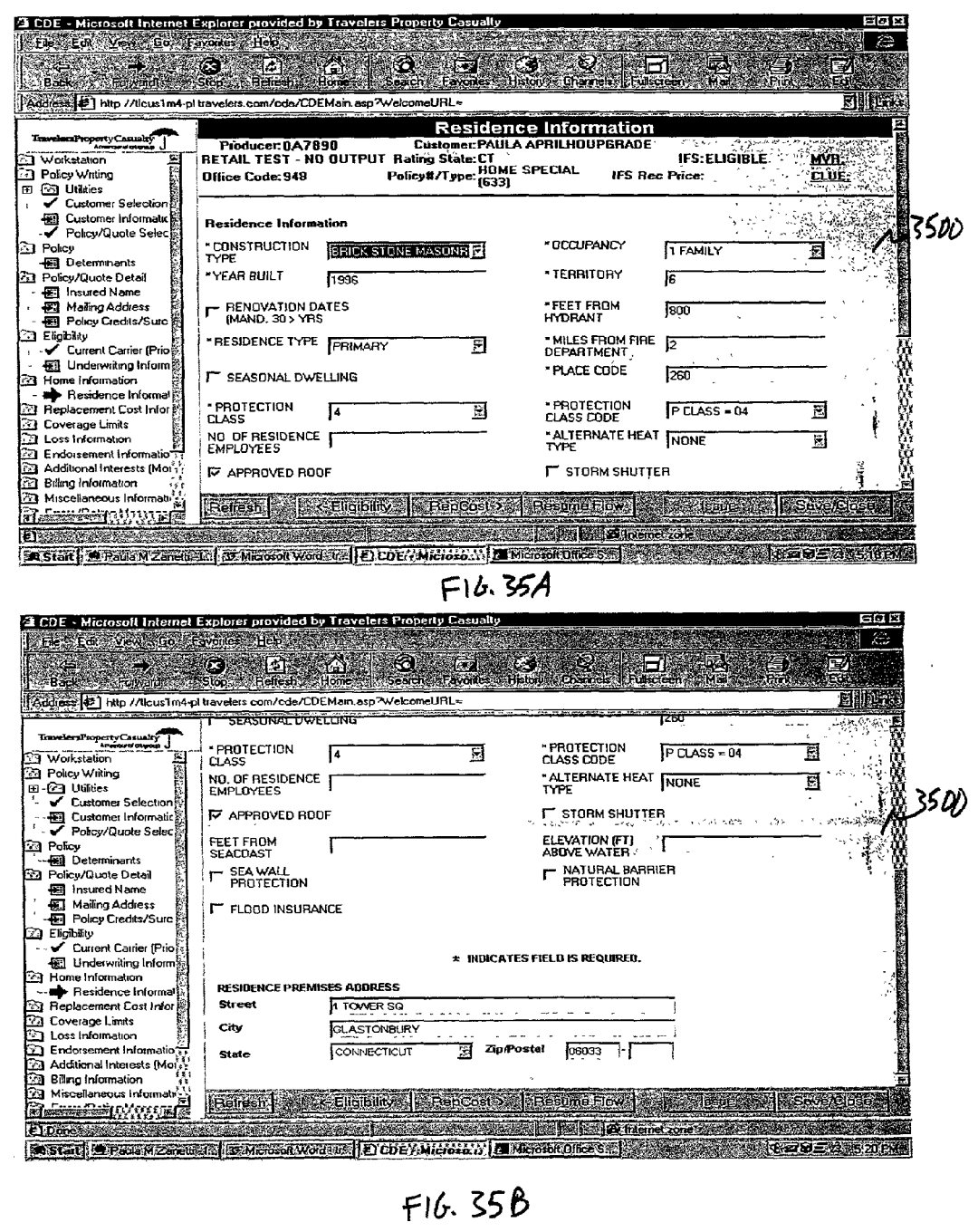
Figure 36:
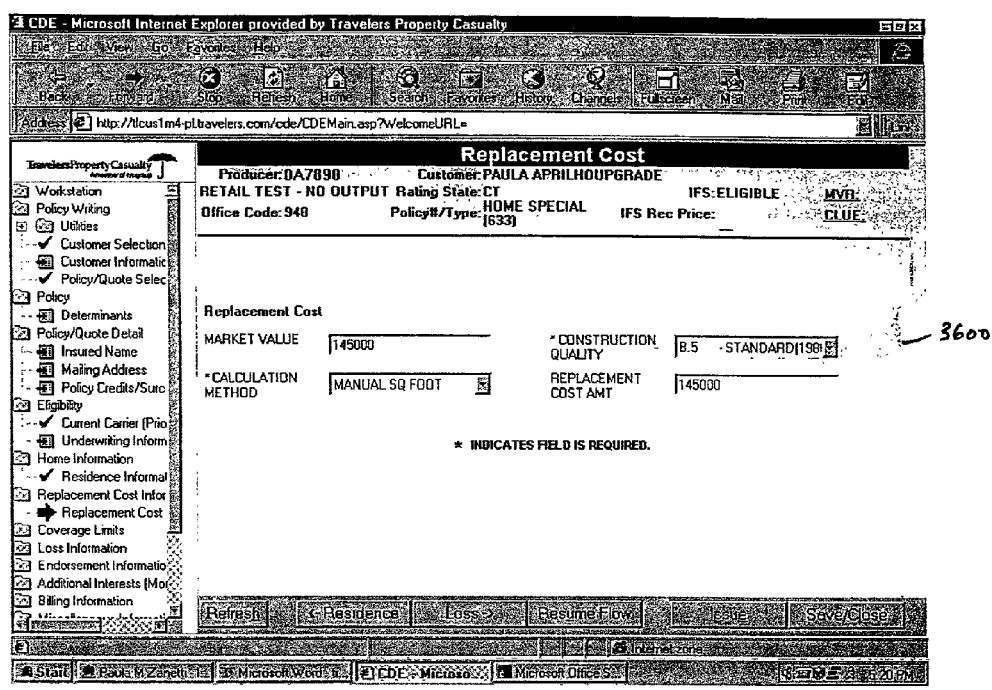
FIG. 36 depicts a Replacement cost web page of the GUI for a process to issue a homeowner insurance policy, in accordance with an embodiment of the present invention.

The next screen for the homeowner insurance policy is the "Residence Information" screen 3500 shown in FIGS. 35A-B as it is scrolled down. This is shown as S804 in FIG. 4C. This screen is similar to the "Vehicle—Subject" screen 2200 shown in FIGS. 22A-B for the auto insurance policy, except screen 3500 is for information relating to the residence to be included in a homeowner insurance policy whereas screen 2200 is for information relating to the vehicle to be included in an auto insurance policy. In place of FIGS. 23 and 24, the homeowner insurance policy includes a "Replacement Cost" screen 3600 as shown in FIG. 36. This is shown as S805 in FIG. 4C. Here, the user has the option to input information relating to the cost of replacement for a home in the event the insured home is to be replaced under the homeowner insurance policy being issued. The next screen that the user accesses is a "Loss Information" screen, like that shown in FIG. 51 for a water vessel insurance policy, by clicking on the Loss →navigation button on the "Replacement Cost" screen. This is shown as S806 in FIG. 4C. The "Loss Information" screen provides entry and display of information relating to any loss that the customer has incurred at the residence listed in FIGS. 35A-B.

Figures 37A, 37B:
FIGS. 37A-B depict a Coverages web page of the GUI for a process to issue a homeowner insurance policy, in accordance with an embodiment of the present invention.
Figure 40A:
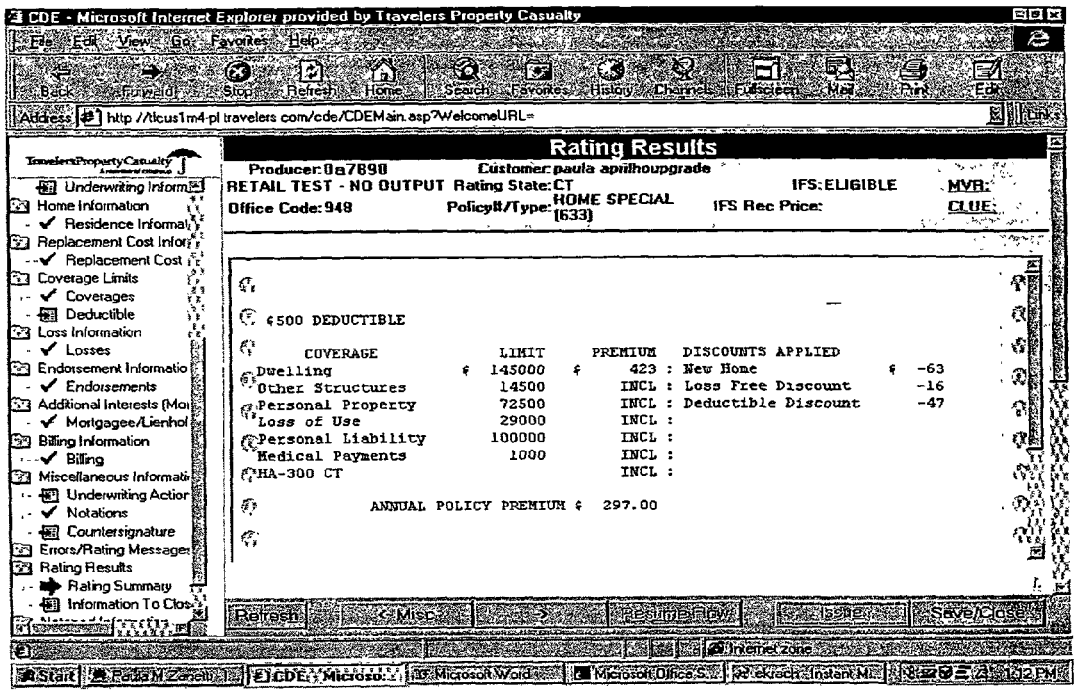
FIGS. 40A-B depict a Rating Results web page of the GUI for a process to issue a homeowner insurance policy, in accordance with an embodiment of the present invention.
Figure 40B:
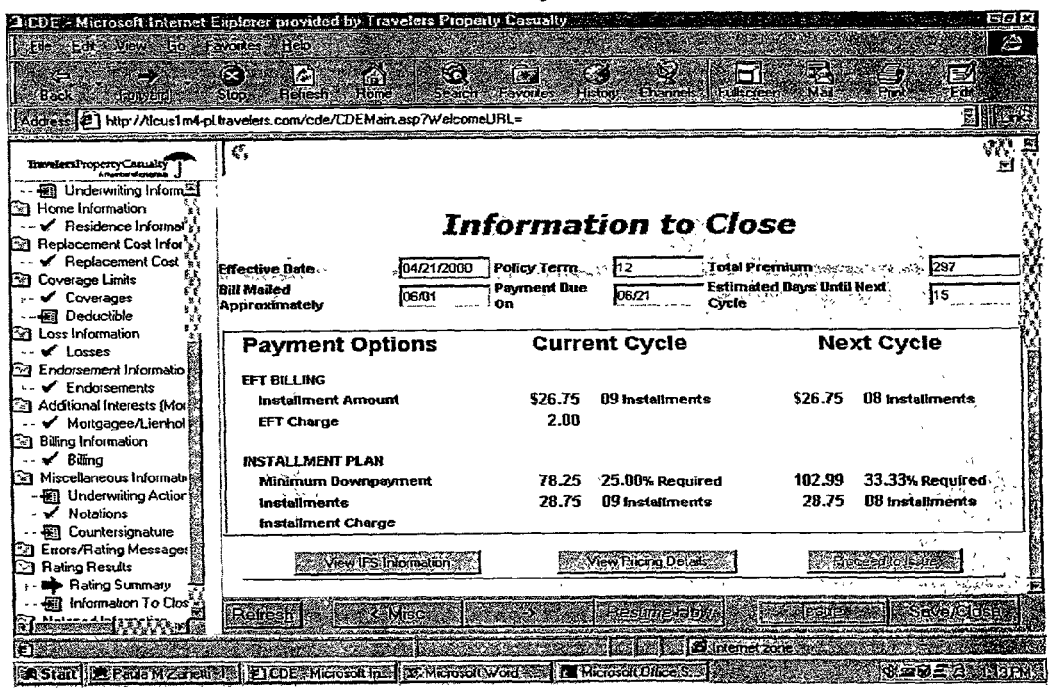

The next screens that the user accesses are shown in FIGS. 37A-B, which are similar to those in FIGS. 25A-B and described likewise. This is shown as S807 in FIG. 4C. The homeowner insurance policy also includes an "Endorsements" screen 3800 shown in FIG. 38, where the user has the option to add endorsements to the policy. This is shown as S808 in FIG. 4C. The next screens in FIGS. 39-40 are similar to FIGS. 26-27 and described likewise. This juncture is shown as S809 and S810.

Figure 43:
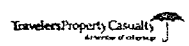
FIG. 43 depicts a CDE Determinants page of the GUI for a process to issue an insurance policy for a water vessel, in accordance with an embodiment of the present invention.
Figure 44:
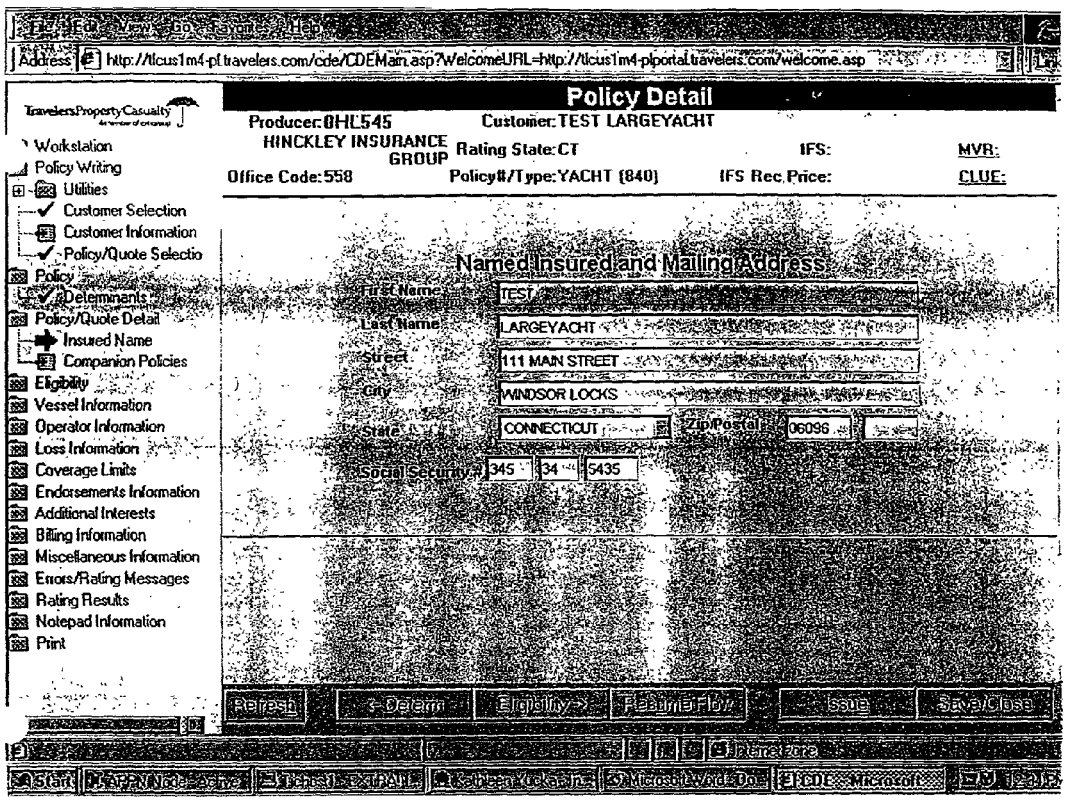
FIG. 44 depicts a Policy Detail page of the GUI for a process to issue an insurance policy for a water vessel, in accordance with an embodiment of the present invention.
Figure 46:
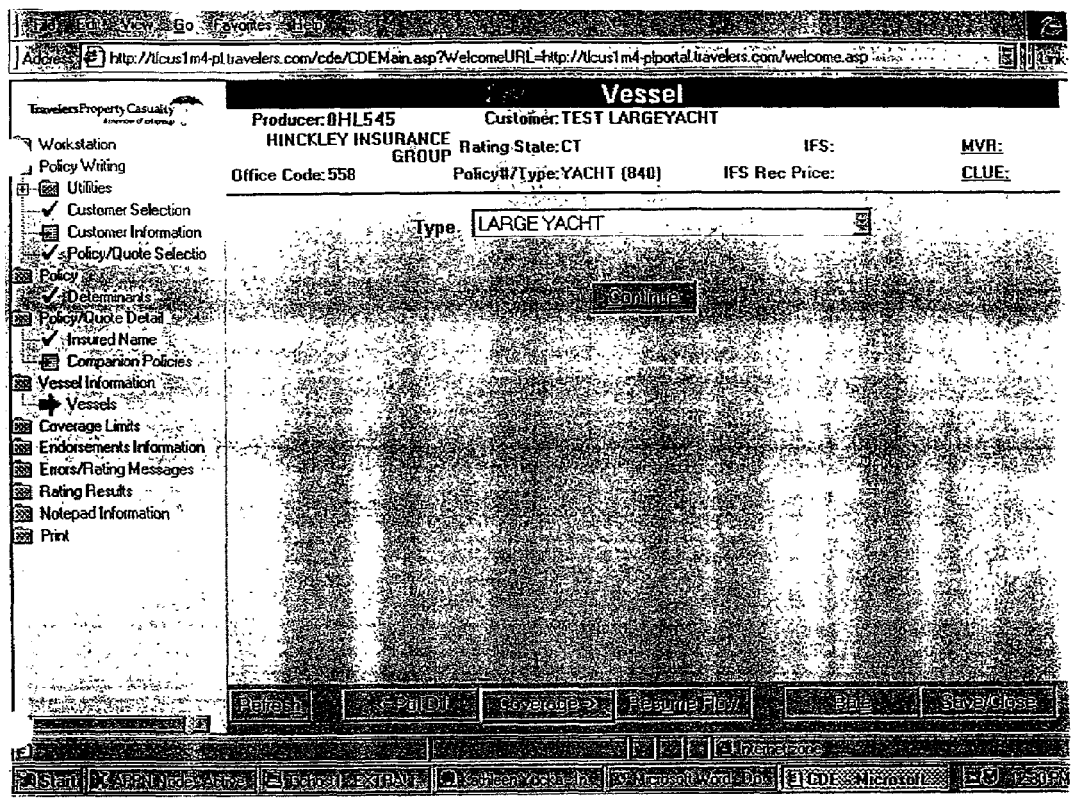
Figure 48A:
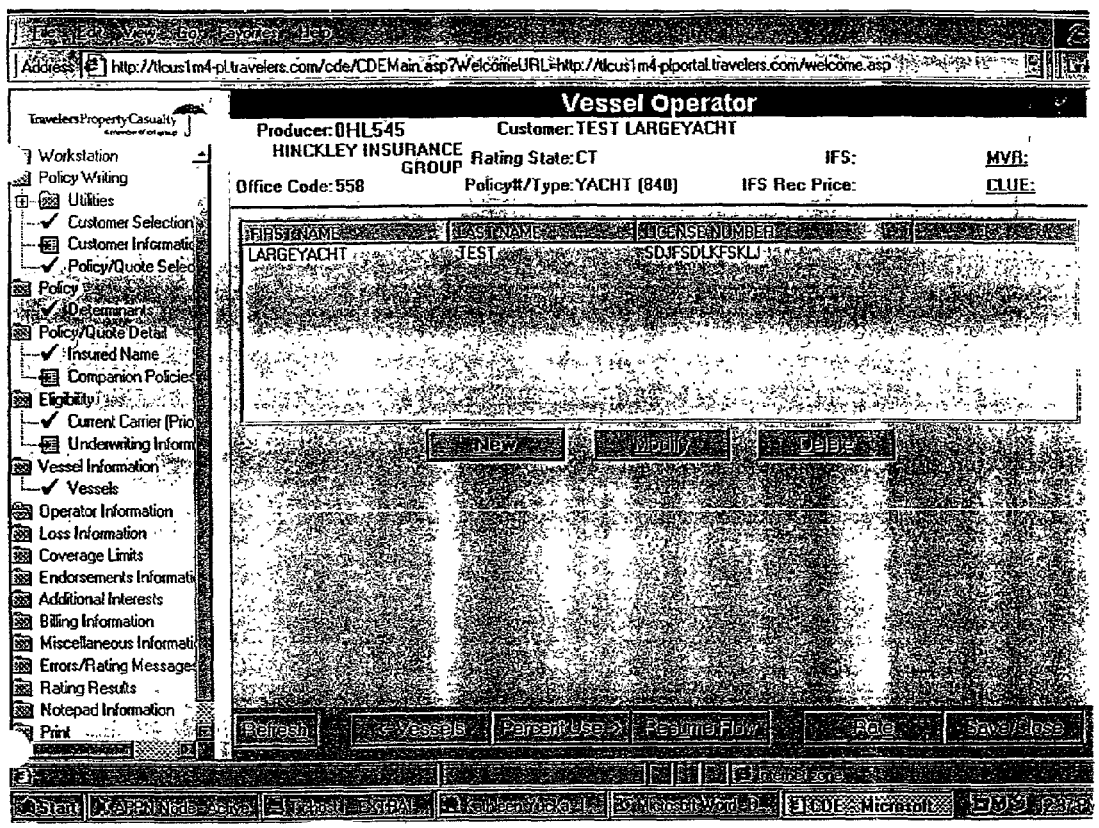
Figure 49:
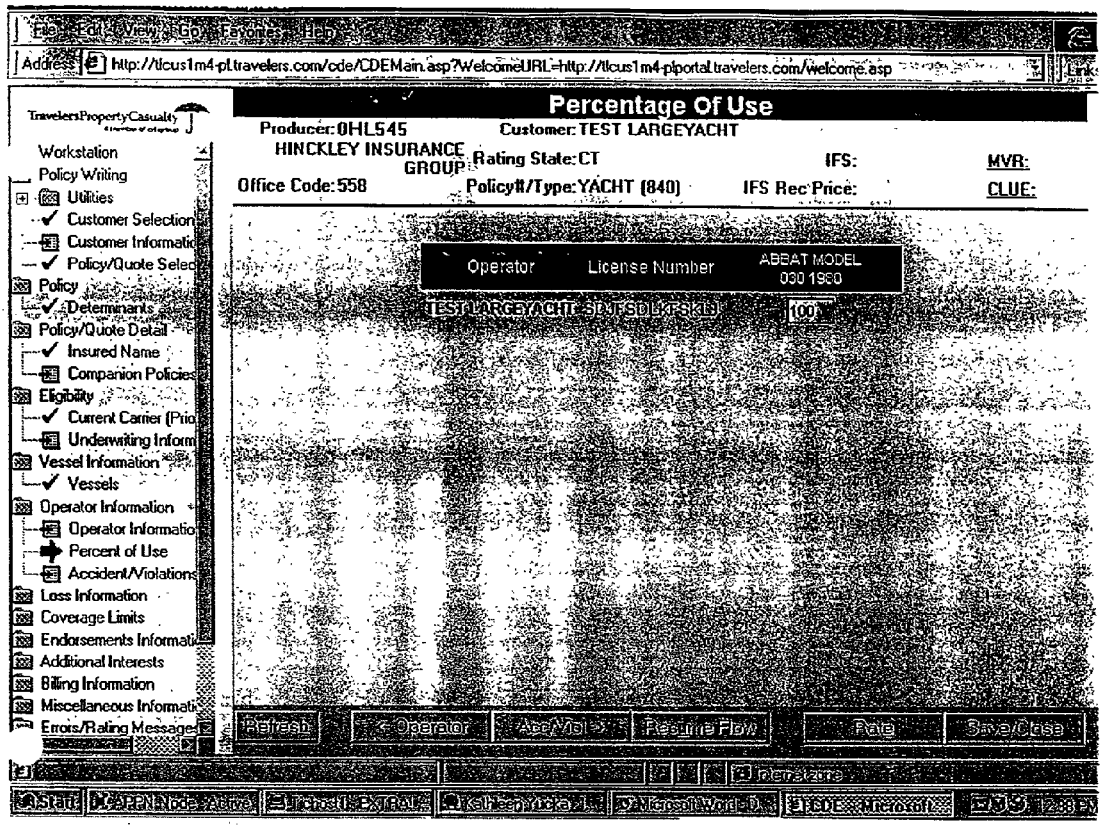
FIG. 49 depicts a Percentage of Use page of the GUI for a process to issue an insurance policy for a water vessel, in accordance with an embodiment of the present invention.
Figure 5O:
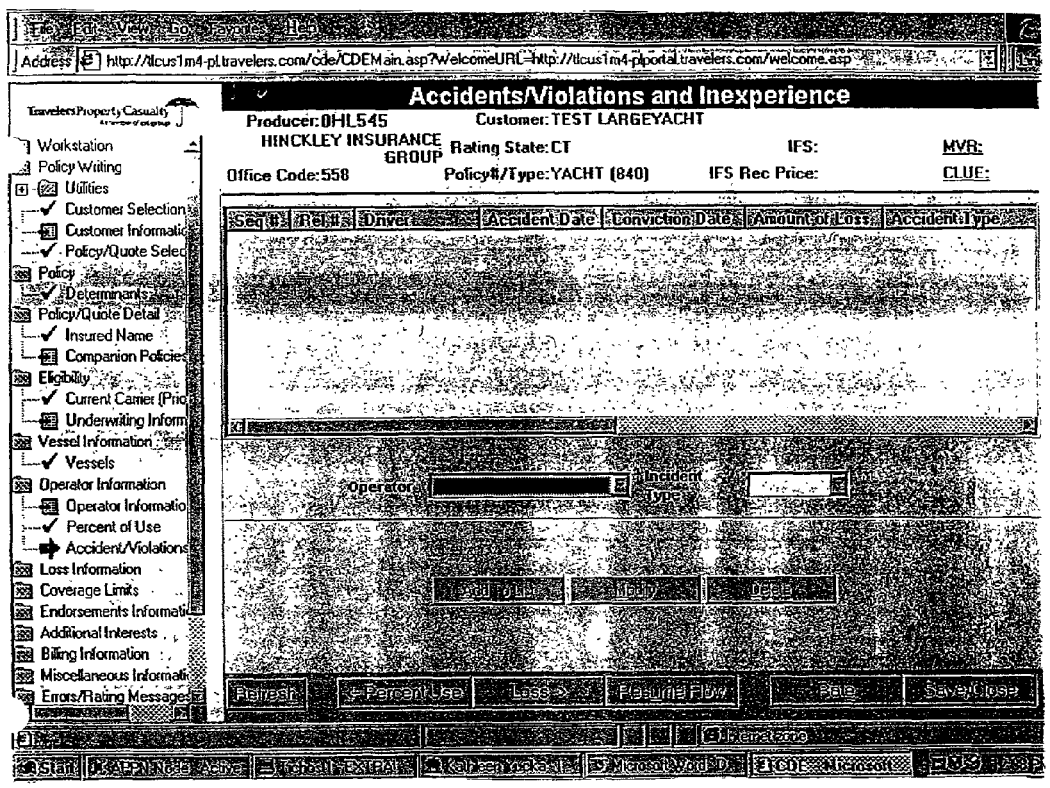
Figure 52:
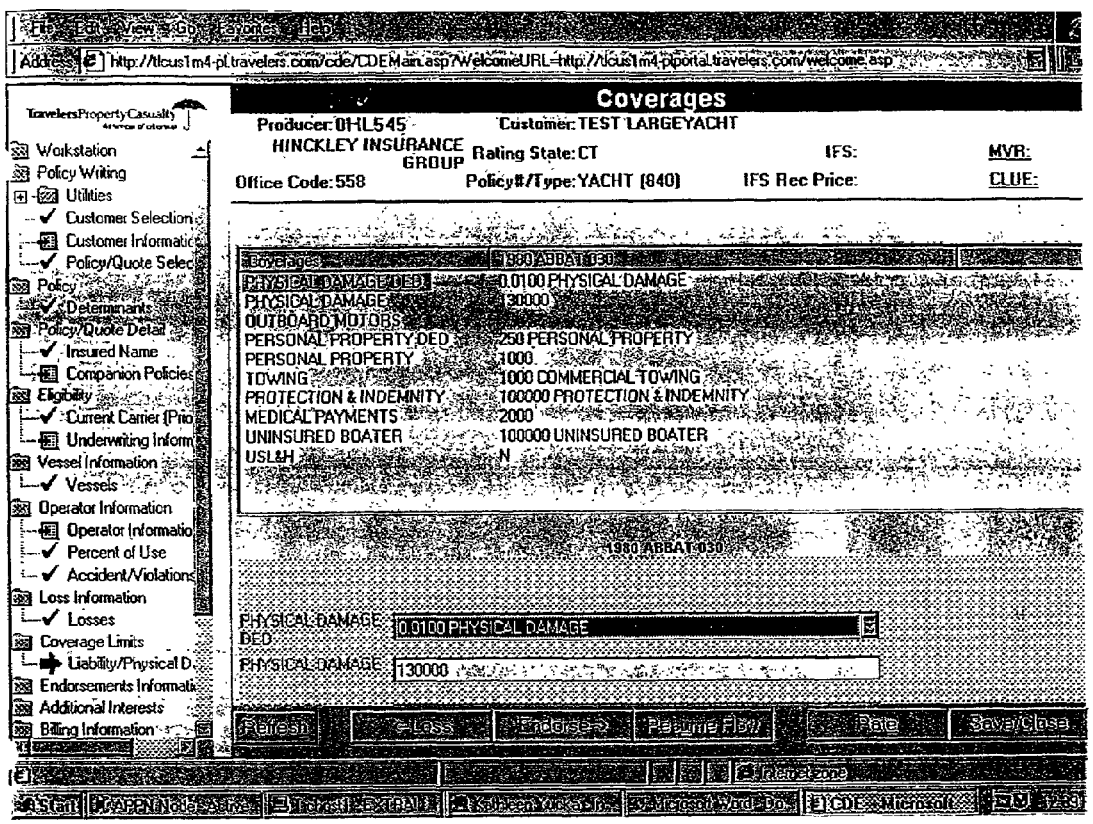
FIG. 52 depicts a Coverages page of the GUI for a process to issue an insurance policy for a water vessel, in accordance with an embodiment of the present invention.
Figure 53:
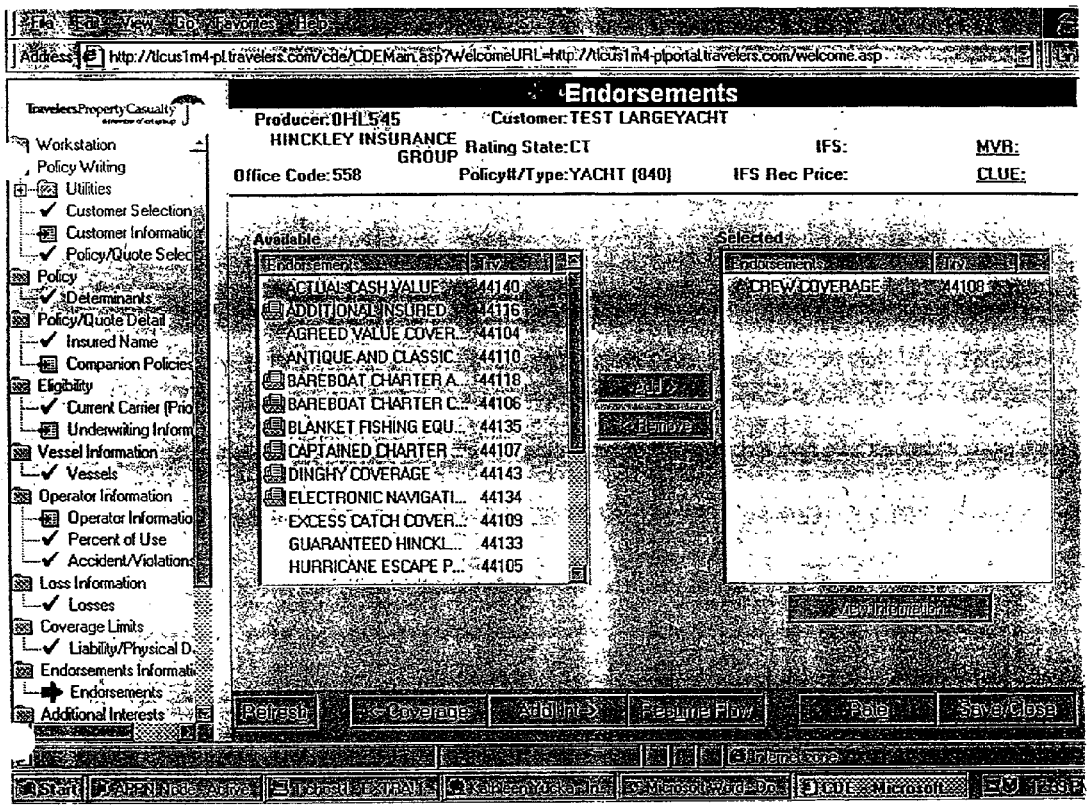
FIG. 53 depicts an Endorsements page of the GUI for a process to issue an insurance policy for a water vessel, in accordance with an embodiment of the present invention.
Figure 54:
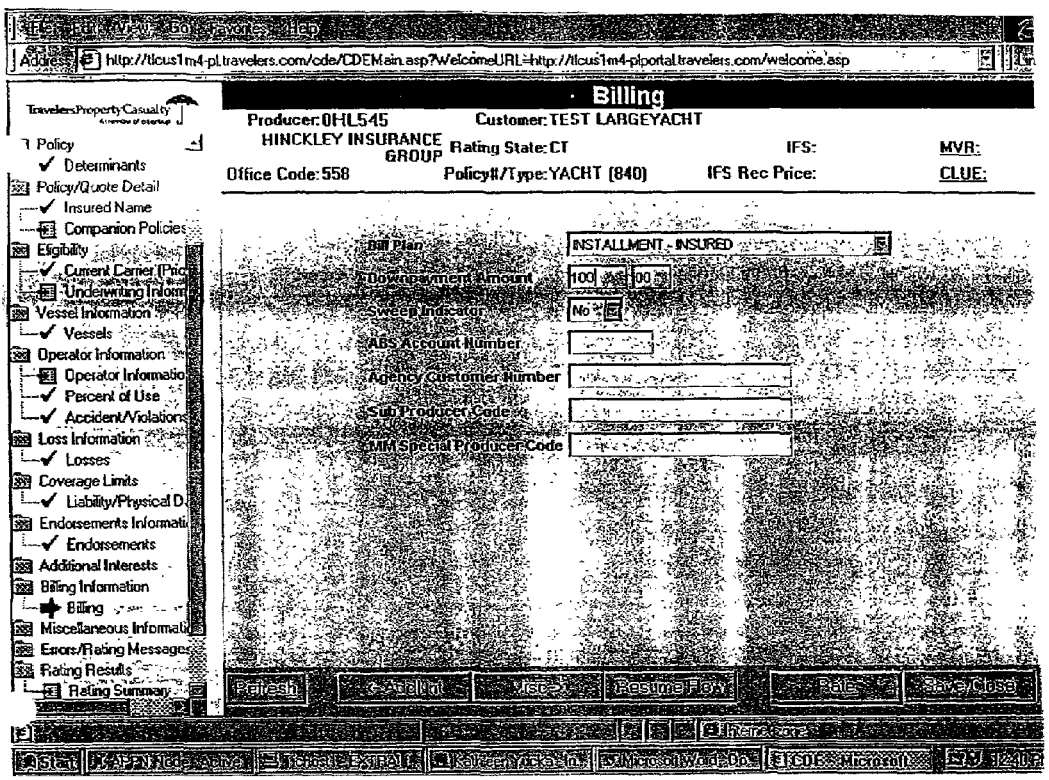
FIG. 54 depicts a Billing page of the GUI for a process to issue an insurance policy for a water vessel, in accordance with an embodiment of the present invention.
Figure 55D:
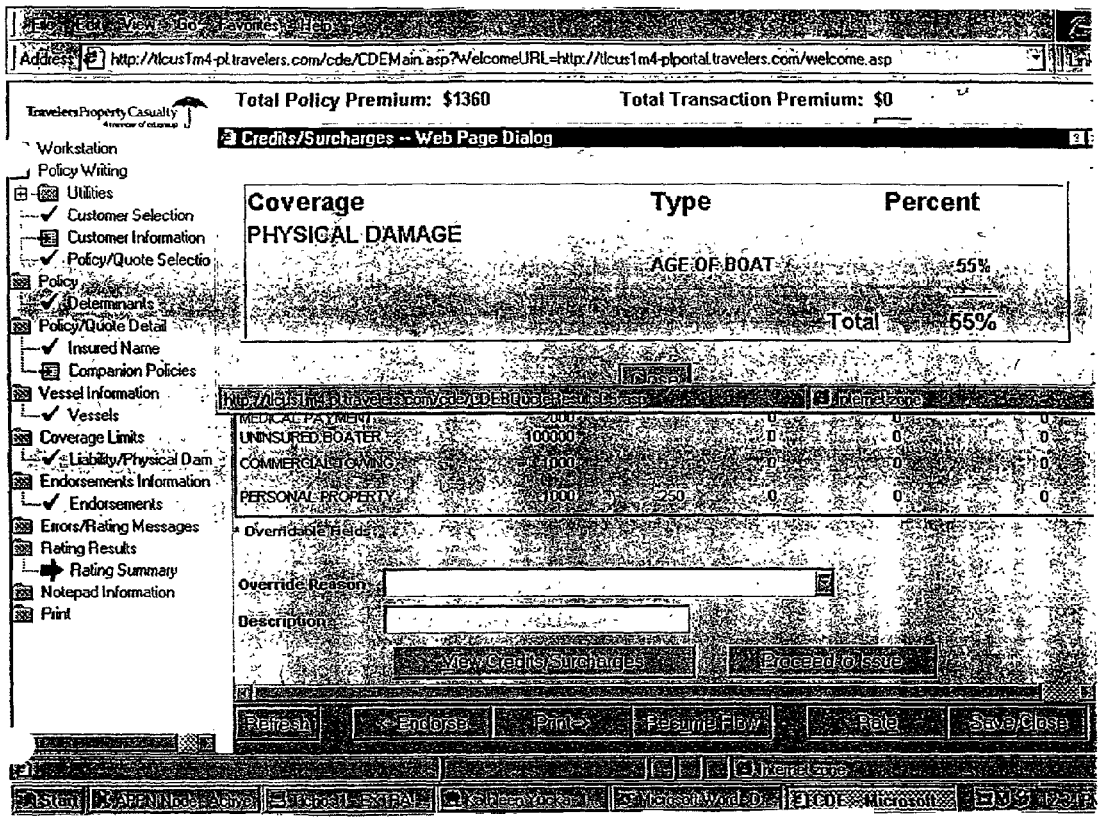

The process for issuing an insurance policy for a water vessel is also similar to the process for issuing an auto insurance policy or a homeowner insurance policy, as shown in FIGS. 41-55. For instance, the screens in FIGS. 41 and 42 are similar to those in FIGS. 15 and 16 and described likewise. The screens in FIGS. 43-45 are similar to those shown in FIGS. 18-21 and described likewise. The next screens for an inssuance of a water vessel insurancy policy are the "Vessel" screens shown in FIGS. 46-47. These screens are function similarly to the "Vehicle—Determinants" and "Vehicle—Subject" screens shown in FIGS. 21-22 for an auto insurance policy in that they are used to collect information on the vessel to be insured. The screens shown in FIGS. 48-49 function similarly to the screens in FIGS. 23-24 and described likewise. Additionally, there is an "Accidents/Violations and Inexperience" screen in shown in FIG. 50 and a "Loss Information" screen in FIG. 51 relating to the vessel operators listed in the screen shown in FIGS. 48A-B. The screen shown in FIG. 52 is similar to the screen shown in FIGS. 25A-B and described likewise. The screen shown in FIG. 53 is similar to the one shown in FIG. 38 and described likewise. The screens in FIGS. 54-55 are similar to those shown in FIGS. 26-27 and described likewise.

Figure 56A:
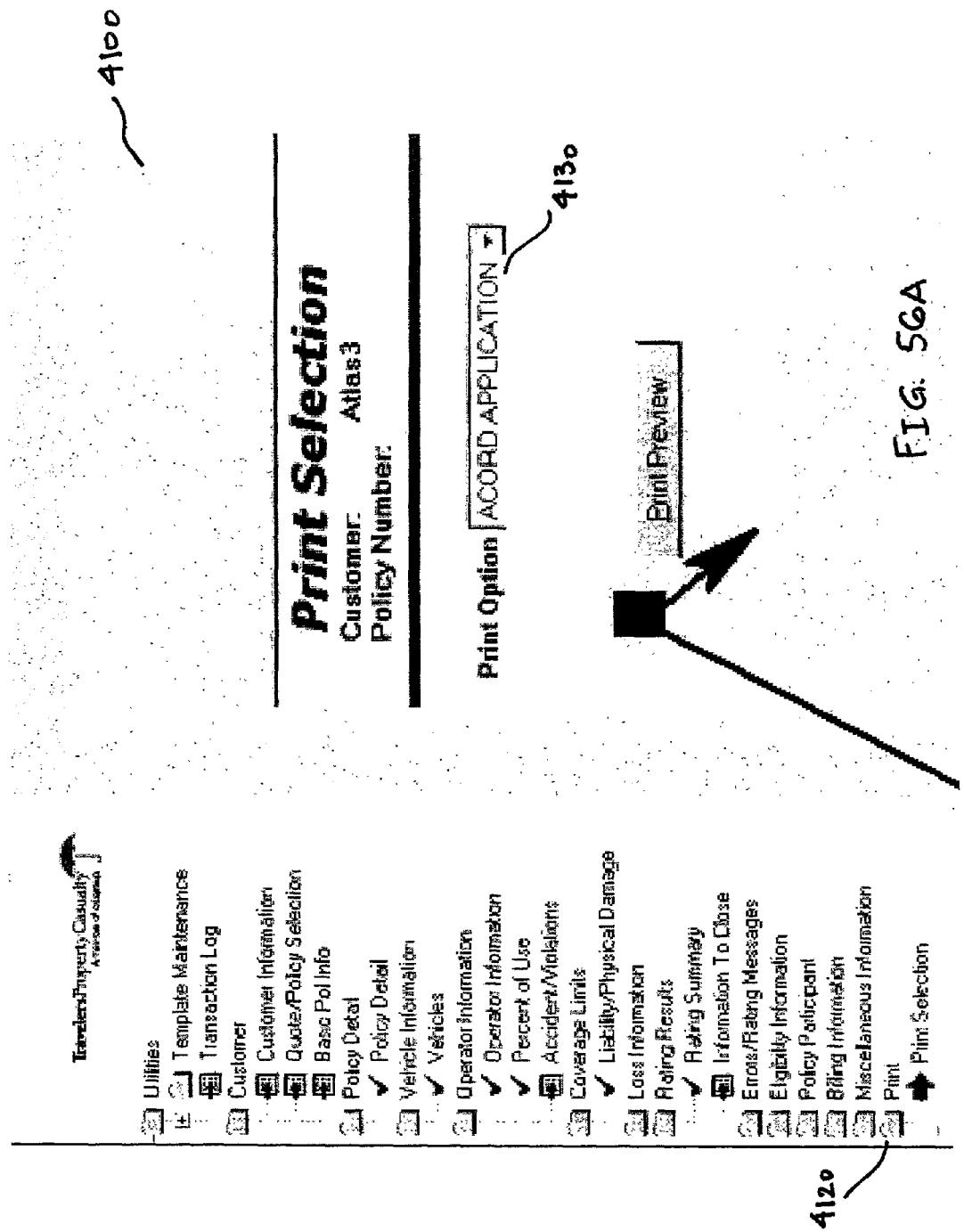
FIGS. 56A-B depict the Printing option web page of the GUI for the insurance quote and issue processes.
Figure 56B:
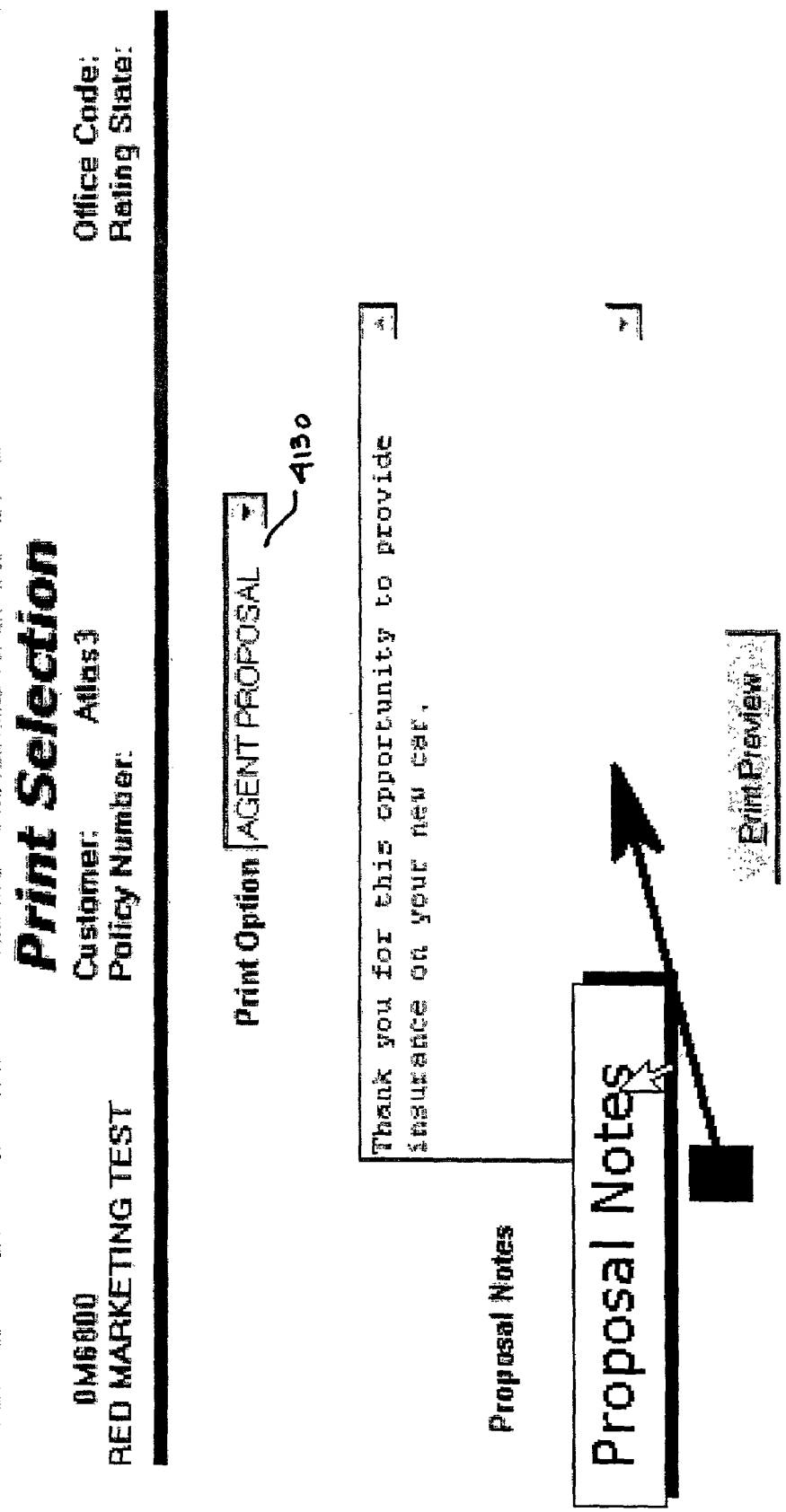

According to one embodiment of the present invention, the web-based GUI provides users with the ability to print insurance industry forms for insurance policies wherever the user can access the GUI. To print a form, a user can select Print from either the Quote/Policy Selection page mentioned earlier or from a Print folder 4120 in the navigation tree as shown in FIG. 56A. The resulting screen is a "Print Selection" screen 4100. This screen also allows the user to print personalized proposals for his or her customers. This is done by selecting Agent Proposal from the Print option dropdown list in the input field 4130, as shown in FIG. 56B. The user can even type additional information about the proposal directly into the text box that will also print on the forms. Professional quality documents may then be printed to an office printer where the user is situated, and the user has the ability to edit and personalize the form accordingly.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. Furthermore, any means-plus-function clauses in the claims (invoked only if expressly recited) are intended to cover the structures described herein as performing the recited function and all equivalents thereto, including, but not limited to, structural equivalents, equivalent structures, and other equivalents.

The invention claimed is:

1. A method for providing remote access to insurance applications from a mainframe insurance data processing system (mainframe system) via a web-based graphical user interface (GUI), comprising:
providing a web-based logon screen for accessing the insurance applications, wherein the logon screen includes a list of insurance applications that are accessible;
prompting entry of a user identification (ID), a user password, and a selection of one of the insurance applications from the list to access at the logon screen;
accepting, at the logon screen, entry of the user ID, the user password, and a selected insurance application;
verifying the entered user ID and password;
upon successful verification, communicating with the mainframe system by the web-based graphical user interface to access the selected insurance application and providing a web-based first screen for the selected insurance application, wherein the web-based GUI includes GUI applications, and the insurance applications from the mainframe system are accessed through the GUI applications, and wherein the web-based GUI includes a wrapper functionality around an insurance application such that the user accesses the mainframe insurance application using the GUI without the user utilizing a mainframe interface associated with the mainframe insurance application; and
providing a price quote based at least on the selected type of insurance, user information, and information on desired coverages.

2. The method of claim 1, wherein the logon screen and the first screen for the selected insurance application are web pages provided by the web-based GUI at a designated website.

3. The method of claim 2, wherein the web-based GUI website is provided by at least one web server farm, wherein the web server farm comprises at least one web server.

4. The method of claim 1, wherein the logon screen comprises a pop-up box in which the list of available applications is provided, and wherein the insurance application is selected by choosing one of the insurance applications listed in the application pop-up box.

5. The method of claim 1, wherein the logon screen may be accessed through the Internet or a private communication network or within an intranet.

6. The method of claim 1, wherein the logon screen is serviced by a first web server farm when it is accessed through the Internet, a second web server farm when it is accessed through the private communication network, and a third web server farm when it is accessed within the intranet.

7. The method of claim 6, wherein the first, second and third web server farms serve as backups to one another.

8. The method of claim 1, wherein the GUI applications comprise components and services, wherein each of the components includes one or more services and represents an insurance subject or product offered by the insurance applications; and wherein each of the services represents an action that can be performed on the insurance subject or product.

9. A method for providing remote access to insurance applications from an insurance data processing system (insurance system) via a graphical user interface (GUI), comprising:
providing a logon screen for accessing the insurance applications, wherein the insurance applications include an insurance policy quote application and an insurance policy issuance application;
prompting, at the logon screen, entry of a user identification (ID), a user password, and a selection of one of the insurance applications to access;
accepting, at the logon screen, entry of the user ID, the user password, and a selected insurance application;
verifying the entered user ID and password;
upon successful verification, communicating with the insurance system by the web-based graphical user interface to access the selected insurance application and providing a first screen for the selected insurance application, wherein the web-based GUI includes GUI applications, and the insurance applications from the mainframe system are accessed through the GUI applications, and wherein the web-based GUI includes a wrapper functionality around an insurance application such that the user accesses the mainframe insurance application using the GUI without the user utilizing a mainframe interface associated with the mainframe insurance application; and
providing a price quote based at least on the selected type of insurance, user information, and information on desired coverages.

10. The method of claim 9, wherein the logon screen includes an option to display an application pop-up box that lists insurance applications that can be selected.

11. The method of claim 9, wherein the selected insurance application comprises the insurance policy quote application, and the first screen comprises a welcome screen.

12. The method of claim 9, further comprising:
providing a second screen to gather information about an insurance customer for which the insurance policy quote is selected;
prompting entry of an agent code of the user at the second screen;
requesting the customer information by further prompting entry of the customer's name, the customer's address, the customer's telephone number at the second screen; prompting a search for a record of the customer in the insurance system based on the entry of the customer information at the second screen; and
searching the insurance system for the customer record.

13. The method of claim 12, further comprising:
if the searching for the customer record results in one or more possible records for the customer, providing a list of the one or more possible records on a third screen;
if the searching of the customer record is unsuccessful, providing a prompt to add a new record of the customer in the insurance system and providing a prompt to import a record of the customer from outside of the insurance system into the insurance system; and
receiving either a selection of one of the possible records from the list or a command to add a record for the customer into the insurance system.

14. The method of claim 13, further comprising:
providing a fourth screen with a prompt for selecting a type of insurance for the insurance policy quote;
providing a fifth screen with prompts for entry of basic policy information relating to the selected type of insurance for the insurance policy quote;
providing a sixth screen with prompts for entry of policy detail information relating to the customer information and the selected type of insurance for the insurance policy quote;

providing a seventh screen with prompts for entry of information about a subject to be insured by the selected type of insurance for the insurance policy quote;
providing an eighth screen with prompts for entry of information on coverages desired for the selected type of insurance; and
providing a ninth screen that shows a price quote based at least on the selected type of insurance, the subject information, and the information on the desired coverages.

15. The method of claim 13, wherein the GUI is a web-based GUI, the second screen displays a web page of the web-based GUI, and the third screen displays the web page having been modified.

16. The method of claim 9, wherein the selected insurance application comprises the insurance policy issuance application.

17. The method of claim 16, further comprising:
providing a first screen to gather information a bout an insurance customer for which the insurance policy issuance is selected;
prompting entry of first information about the customer and search criteria;
prompting a search for a record of the customer in the insurance system based on the entry of the customer information and the search criteria; and
searching the insurance system for the customer record.

18. The method of claim 17, further comprising:
if the searching for the customer record is successful, providing a second screen that displays second information about the customer, wherein the second information about the customer is more comprehensive than the first information about the customer; and
if the searching for the customer record is unsuccessful, prompting the user to enter additional information about the customer and prompting the user to create a new record in the insurance system for the customer.

19. The method of claim 18, wherein the second information about the customer is retrieved from the customer record found in the insurance system from the searching.

20. The method of claim 18, further comprising:
providing at least one screen that prompts for selection of a type of insurance for the insurance policy issuance and entry of information about determinants for the selected insurance type.

21. The method of claim 20, further comprising:
providing a screen with prompts for entry of policy detail information relating to the customer information and the selected insurance type;
providing a screen with prompts for entry of policy eligibility information relating to the selected insurance type for issuance;
providing a screen with prompts for entry of information about a subject to be insured by the selected insurance type for issuance;
providing a screen with prompts for entry of information on coverages desired for the selected insurance type for issuance;
providing a screen with prompts for billing information relating to the selected insurance type for issuance; and
providing a screen showing a price quote based at least on the selected insurance type, the subject information, and the information on the desired coverages.

22. The method of claim 20, wherein providing at least one screen that prompts for entry of determinants for the selected insurance type comprises:

providing an initial screen for the entry of the determinants for the selected insurance type, wherein the initial screen prompts for the selection of the type of insurance;
providing a second screen for the entry of determinants for the selected insurance type, wherein the second screen prompts for entry of a transaction type and a policy type; and
providing a third screen for the entry of determinants for the selected insurance type, wherein the third screen prompts for entry of a pricing level.

23. The method of claim 21, wherein the selected insurance type for issuance is an automobile insurance, and wherein providing a screen with prompts for information about the subject to be insured includes providing a screen with prompts for information about a vehicle to be insured.

24. The method of claim 23, further comprising: providing a screen with prompts for information about an operator of the vehicle to be insured.

25. The method of claim 24, wherein the prompts for information about the operator of the vehicle to be insured includes a prompt for entry of a percentage of the use of the vehicle to be insured by the operator.

26. The method of claim 21, wherein the selected insurance type for issuance is a homeowner insurance, and wherein providing a screen with prompts for entry of information about the subject to be insured includes providing a screen with prompts entry of for residence information about a home to be insured.

27. The method of claim 26, further comprising: providing a screen with prompts for entry of information about replacement cost for the home to be insured.

28. The method of claim 27, further comprising: providing a screen with a prompt for entry of endorsements.

29. The method of claim 9, further comprising: providing an option to print out forms, applications or binders relating to the selected insurance application.

30. The method of claim 29 wherein the forms, applications, or binders are printed at the user's location.

31. The method of claim 12 wherein the second screen to gather information presents a subset of questions pertinent to the form, jurisdiction, and market of the user responsive to the customer information entered by the customer.

32. The method of claim 14 wherein the prompts for entry contain embedded business logic replacing business logic embedded into legacy screens.

33. The method of claim 9 wherein the insurance system further comprises a presentation services tier linking the remotely accessed insurance applications and the graphical user interface (GUI), the presentation services tier comprising:
web browsers;
a load balancer; and
web servers linked to a Structured Query Language (SQL) server for maintaining the users' states in said web browsers.

34. The method of claim 9 wherein the insurance system further comprises a business services tier linking the remotely accessed insurance applications and the graphical user interface (GUI), the business services tier comprising business events and business rules.

35. The method of claim 9 wherein the insurance system further comprises a data services tier comprising:
report ordering, work management, product, work in progress, and policy databases for storing, retrieving, maintaining, and assuring the integrity of data;

legacy interfaces and a legacy database for providing access to the legacy insurance applications.

36. The method of claim 9 wherein the insurance system further comprises a multiple virtual storage mainframe with a CICS/IMS environment.

37. The method of claim 36 wherein the CICS/IMS environment further comprises a remote hub for accessing the business events and business rules functions for the business services tier and the databases for the data services tier.

38. The method of claim 37 wherein the business events and business rules and the databases trigger access to the legacy applications via an External Action Block wrapping the legacy application.

39. The method of claim 34 wherein the business events and business rules are set up in a component and services architecture, wherein each component comprises one or more services.

40. The method of claim 33 wherein the web servers are made identical through server site replication, and further have their states maintained by the SQL server so as to provide redundancy.

41. The method of claim 40 further comprising the steps of:
allowing the user to access the web browser on his or her machine;
the load balancer receiving a communication from this machine, determines which of the identical web servers will handle the communication;
the selected web server of said identical web servers accesses a configuration file contained on said web server to determine transmission type and location of the communication;
based on the transmission type and location of the communication, the selected web server accesses a channel table residing on the web server to determine which of multiple message queue (MQ) managers to communicate with the host insurance system.

42. The method of claim 12, further comprising:
if the searching for the customer record results in one or more possible records for the customer, dynamically updating the screen providing a list of the one or more possible records;
if the searching of the customer record is unsuccessful, providing a prompt to add a new record of the customer in the insurance system and providing a prompt to import a record of the customer from outside of the insurance system into the insurance system; and
receiving either a selection of one of the possible records from the list or a command to add a record for the customer into the insurance system.

43. A method for providing remote access to insurance applications from legacy insurance data processing systems via a web-based graphical user interface (GUI) implemented by a computer system, comprising:
providing a web-based interface comprising wrapper functionality to access a legacy insurance application such that the user accesses the legacy insurance application using the GUI without utilizing a legacy interface associated with the legacy insurance application for accessing the insurance applications;
displaying a list of insurance applications that are accessible via the interface; prompting entry of a user identification (ID), a user password, and a selection of one of the insurance applications from the list to access at least one of the legacy insurance applications from the legacy insurance data processing systems using the interface;
accepting, using the interface, entry of the user ID, the user password, and a selected insurance application;
verifying the entered user ID and password;
upon successful verification, automatically communicating by the computer system with the legacy application using data retrieved from the interface to access the selected insurance application and determine data required from the customer;
providing the customer a web-based first screen for the selected insurance application responsive to said automatically communicating with the legacy application, and prompting the customer for type of insurance for the insurance policy quote, basic policy information relating to the selected type of insurance, policy detail information relating to the customer information, subject to be insured, and information on coverage for the selected type of insurance for the insurance policy quote;
providing a price quote based at least on the selected type of insurance, the subject information, and the information on the desired coverages.

44. The method of claim 43, wherein said automatically communicating by the computer system with the legacy application using data retrieved from the interface to access the selected insurance application and determine data required from the customer, further comprises:
embedding business logic when communicating with the customer via the interface, thereby replacing business logic embedded into legacy screens, to interface with the legacy insurance application; and
linking the remotely accessed insurance applications and the interface using a business services tier comprising business events and business rules using the embedded business logic; and
triggering access to the legacy applications responsive to the business events and the business rules via the legacy application wrapper and the business services tier.

45. The method of claim 43, wherein the insurance system further comprises a data services tier comprising:
report ordering, work management, product, work in progress, and policy databases for storing, retrieving, maintaining, and assuring the integrity of data;
legacy interfaces and a legacy database for providing access to the legacy insurance applications.

46. The method of claim 43 wherein the insurance system further comprises a multiple virtual storage mainframe with a CICS/IMS environment.

47. The method of claim 46, wherein the CICS/IMS environment further comprises a remote hub for accessing the business events and business rules functions for the business services tier and the databases for the data services tier.

48. The method of claim 43, wherein the business events and business rules and the databases trigger access to the legacy applications via an External Action Block wrapping the legacy application.

49. The method of claim 43, wherein the business events and business rules are set up in a component and services architecture, wherein each component comprises one or more services.

50. A method for providing remote access to insurance applications from legacy insurance data processing systems via a web-based graphical user interface (GUI) implemented by a computer system, comprising:

providing a web-based interface comprising wrapper functionality to access a legacy insurance application such that the user accesses the legacy insurance application using the GUI without utilizing a legacy interface associated with the legacy insurance application for accessing the insurance applications;

displaying a list of insurance applications that are accessible via the interface; prompting entry of a user identification (ID), a user password, and a selection of one of the insurance applications from the list to access at least one of the legacy insurance applications from the legacy insurance data processing systems using the interface;

accepting, using the interface, entry of the user ID, the user password, and a selected insurance application;

verifying the entered user ID and password;

upon successful verification, automatically communicating by the computer system with the legacy application using data retrieved from the interface to access the selected insurance application and determine data required from the customer;

providing the customer a web-based first screen for the selected insurance application responsive to said automatically communicating with the legacy application, and prompting the customer for type of insurance for the insurance policy quote, basic policy information relating to the selected type of insurance, policy detail information relating to the customer information, subject to be insured, and information on coverage for the selected type of insurance for the insurance policy quote;

providing a price quote based at least on the selected type of insurance, the subject information, and the information on the desired coverages.

51. The method of claim 50, wherein said automatically communicating by the computer system with the legacy application using data retrieved from the interface to access the selected insurance application and determine data required from the customer, further comprises:

embedding business logic when communicating with the customer via the interface, thereby replacing business logic embedded into legacy screens, to interface with the legacy insurance application; and linking the remotely accessed insurance applications and the interface using a business services tier comprising business events and business rules using the embedded business logic; and triggering access to the legacy applications responsive to the business events and the business rules via the legacy application wrapper and the business services tier.

52. The method of claim 51, wherein the insurance system further comprises a data services tier comprising:

report ordering, work management, product, work in progress, and policy databases for storing, retrieving, maintaining, and assuring the integrity of data;

legacy interfaces and a legacy database for providing access to the legacy insurance applications.

53. The method of claim 52 wherein the insurance system further comprises a multiple virtual storage mainframe with a CICS/IMS environment.

54. The method of claim 53, wherein the CICS/IMS environment further comprises a remote hub for accessing the business events and business rules functions for the business services tier and the databases for the data services tier.

55. The method of claim 52, wherein the business events and business rules and the databases trigger access to the legacy applications via an External Action Block wrapping the legacy application.

56. The method of claim 55, wherein the business events and business rules are set up in a component and services architecture, wherein each component comprises one or more services.

57. The method of claim 12, wherein after the searching the insurance system for the customer record, said method further comprises dynamically modifying the screen to accommodate additional data elements based on the actions taken on the search screen, said additional data elements including a matching customer list resulting from the customer search.

58. The method of claim 57, further comprising, after the dynamically modifying of the additional data elements, displaying a Quote/Policy Selection screen incorporating the customer information corresponding to an entry from the matching customer list resulting from the customer search selected by the user.

59. The method of claim 12, further comprising dynamically modifying navigation buttons to show the user's progress or provide the user a path to return to a previous step, with the availability of said navigation buttons dynamically modified in response to whether the user has selected quote or issue.

60. The method of claim 12, dynamically modifying a subsequent screen to prompt only for questions pertinent to data captured on a previous screen.

* * * * *